(12) United States Patent
Manula

(10) Patent No.: US 11,010,208 B1
(45) Date of Patent: May 18, 2021

(54) SYNC GROUPINGS

(71) Applicant: Graphcore Limited, Bristol (GB)

(72) Inventor: Brian Manula, Stockholm (SE)

(73) Assignee: GRAPHCORE LIMITED, Bristol (GB)

( * ) Notice: Subject to any disclaimer, the term of this patent is extended or adjusted under 35 U.S.C. 154(b) by 28 days.

(21) Appl. No.: 16/663,562

(22) Filed: Oct. 25, 2019

(51) Int. Cl.
*G06F 9/46* (2006.01)
*G06F 9/52* (2006.01)

(52) U.S. Cl.
CPC ................... *G06F 9/52* (2013.01)

(58) Field of Classification Search
CPC ........................................................ G06F 9/52
See application file for complete search history.

*Primary Examiner* — Gregory A Kessler
(74) *Attorney, Agent, or Firm* — Haynes and Boone, LLP

(57) ABSTRACT

A work accelerator is connected to a gateway. The gateway enables the transfer of data to the work accelerator from an external storage at pre-compiled data synchronisation points attained by the work accelerator. The work accelerator is configured to send to a register of the gateway an indication of a sync group comprising the gateway. The work accelerator then sends to the gateway, a synchronisation request for a synchronisation to be performed at an upcoming pre-compiled data exchange synchronisation point. The sync propagation circuits are each configured to receive at least one synchronisation request and propagate or acknowledge the synchronisation request in dependence upon the indication of the sync group received from the work accelerator.

27 Claims, 20 Drawing Sheets

SYNC GROUPINGS

TECHNICAL FIELD

The present disclosure relates to a gateway connected to a computer subsystem for acting as a work accelerator, and in particular to the control of sync propagation and/or acknowledgments in the gateway.

BACKGROUND

In the context of processing data for complex or high volume applications, a work accelerator may be a subsystem to which processing of certain data is offloaded from a host system. Such a work accelerator may have a specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

In general, there may exist dependencies between the portions of a program running on different tiles. A technique is, therefore required to prevent a piece of code on one tile running ahead of data upon which it is dependent being made available by another piece of code on another tile. There are a number of possible schemes for achieving this, one of which is described here by way of example, 'BSP', bulk synchronous parallel. According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is to say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both.

In some scenarios a tile performing computation may be allowed to communicate with other system resources such as a network card or storage disk, as long as no communication with other tiles in the group is involved.

During an exchange phase, data exchange may not only be required to take place internally (i.e. between tiles) within an accelerator, but in some circumstances may be required to take place between multiple accelerators. Some of these accelerators may be coupled to different gateways.

When scaling subsystems by connecting them together—directly or indirectly—a problem may occur, which is how to control how an accelerator in the system will synchronise at an upcoming exchange point. As noted, at sometimes data exchange should take place only between tiles within an accelerator, whereas at other times, data exchange should take place between the accelerator and gateway or between multiple accelerators.

SUMMARY OF THE INVENTION

The present invention uses the concept of a gateway which can be used to provide data to the accelerators from external storage and thus interconnect them to scale a subsystem acting as a work accelerator. The accelerator receives the data from the gateway in an exchange phase and computes the data in a following compute phase. In some forms of the gateway, the gateway itself is an active processor of data and autonomously manages its data flows. The gateway acts as an intermediary between external storage and one or more accelerators. The gateway has a local memory for temporarily storing data for delivery to the accelerator from the external storage. The number of different possible ways in which data may be required to be exchanged in such a system raises the challenge of how to control the synchronisation between different elements in the system.

The gateway comprises one or more synchronisation propagation circuits that are configured to receive synchronisation requests from the accelerator for data exchange at a precompiled data exchange synchronisation point. The synchronisation propagation circuits propagate such received synchronisation requests throughout the sync group/zone of a sync network. These synchronisation propagation circuits are configured to forward and acknowledge received sync requests in accordance with an indication of a sync group provided by the accelerator. The accelerator information, therefore, defines the sync group.

According to a first aspect, there is provided a computer system comprising: (i) a computer subsystem acting as a work accelerator, and (ii) a gateway connected to the computer subsystem, the gateway enabling the transfer of data to the computer subsystem from external storage at at least some pre-compiled data synchronisation points attained by the subsystem, wherein the computer subsystem comprises at least one processor configured to: send to the gateway an indication of a synchronisation group comprising the computer subsystem; and send to the gateway a synchronisation request for a synchronisation to be performed at an upcoming pre-compiled data exchange synchronisation point, wherein the gateway comprises: at least one register configured to store said indication; and the one or more sync propagation circuits each configured to receive at least one synchronisation request and perform an action with respect to said at least one synchronisation request, each action being selected in dependence upon said indication, wherein each action selected comprises at least one of: propagating the received at least one synchronisation request to at least one further sync propagation circuit; and acknowledging the received at least one synchronisation request.

In some embodiments, the indication comprises one or more configuration settings indicating each of the actions to be performed by the each of the one or more sync propagation circuits. By writing the set of configurations to the gateway, the accelerator is able to define any arbitrary sync group, providing a greater level of flexibility in controlling the sync groups.

In some embodiments, the one or more sync propagation circuits are configured to propagate the received at least one synchronisation request to one or more further sync propagation circuits selected in dependence upon the indication. By controlling the direction of propagation of sync requests in the gateway, the gateway is able to exercise a greater degree of control over the sync groups.

In some embodiments, the gateway comprises a memory configured to store at least one set of credits, wherein at least one of the one or more sync propagation circuits is configured to: request a credit from one of the at least one set of credits for performing data exchange between the gateway and the subsystem; and in response to determining that the one of the at least one set of credits comprises a non-zero number of credits, acknowledge the synchronisation request. The indication comprises one or more configuration settings indicating each of the actions to be performed by the each of the one or more sync propagation circuits, wherein the at least one set of credits comprises a plurality of sets of credits, wherein the gateway is configured to, in response to receiving the one or more configuration settings, associate one of the plurality of sets of credits with a configuration specified by the received one or more configuration settings, wherein the one of the at least one set of credits from which the request is made comprises the one of the plurality of sets of credits associated with the configuration specified by the received one or more configuration settings. By dynamically associating a configuration with a set of credits, separate credit control is applied for different dynamically defined sync groups. This allows the components within each sync group to remain synchronised with respect to one another.

In some embodiments, the gateway comprises at least one further sync propagation circuit configured to forward synchronisation requests and synchronisation acknowledgments without dependence upon the indication of the synchronisation group comprising the computer subsystem. Participation of each hard-coded sync propagation circuit may be effectively controlled by the configuration settings for the configurable sync propagation circuits.

In some embodiments, the gateway is connected to a further gateway, wherein the gateway is configured to receive from the further gateway, a third synchronisation request for synchronisation to be performed at the upcoming pre-compiled data exchange synchronisation point, wherein at least one of the one or more sync propagation circuits is configured to, responsive to the indication of the synchronisation group comprising the computer subsystem stored in the at least one register: acknowledge the synchronisation request received from the computer subsystem; and acknowledge the third synchronisation request received from the further gateway, wherein the synchronisation group further comprises the further gateway. In response to receiving an acknowledgment for the sync request from the gateway, the at least one processor of the computer subsystem is configured to cause data to be exchanged between the computer subsystem and a third computer system for acting as a work accelerator connected to the further gateway. In this way, the write from the computer subsystem is able to define a sync group for transfer of data between work accelerators connected to different gateways.

BRIEF DESCRIPTION OF DRAWINGS

For a better understanding of the present invention and to show how the same may be carried into effect, reference will now be made by way of example to the accompanying Figures in which.

DETAILED DESCRIPTION

The following description explains various embodiments of the application in further detail. This application relates to a subsystem for acting as a work accelerator for a host system and to the combination of a plurality of such subsystems. The subsystems act as accelerators to perform predetermined processing steps on data sets (work) allocated by a host which is running a process requiring large amounts of data to be subject to mainly repetitive processing. Each subsystem may be a so called intelligence processing unit (IPU) or any class of accelerator (XPU). The techniques described herein can be used with the IPUs described in our earlier U.S. application Ser. No. 15/885,925, the contents of which are herein incorporated by reference, but also can be applied to any accelerator. As will be described in more detail, several accelerators may be combined to form an accelerator machine or appliance. Several accelerator appliances may be combined in a chassis. Multiple chassis may be organised in groups, which can be arranged in a rack. The resulting combinations of accelerators can yield a system with a large amount of processing power for performing parallel operations. This is particularly useful for implementing neural network processing in artificial intelligence applications. The principles laid out here can potentially be used to scale beyond a single rack as well.

The application relates to a novel gateway which has a number of advantages in improving the effectiveness of such accelerators. The gateway(s) allow the disaggregation of the accelerators from the one or more host systems which provide the data sets for processing by the accelerators. This has several advantages. Firstly, it allows the number of accelerators per host to be user configurable and to be increased beyond the physical capacity of a host. Secondly, it allows the accelerator I/O to be decoupled from a host, enabling IO capacity to scale as a function of the number of accelerators. Thirdly, the disaggregation enables multiple hosts to use a set of accelerator resources which are allocated and grouped on demand to the hosts through a well-defined API that supports lifecycle management of these resources and associated hosts.

Figure 1:
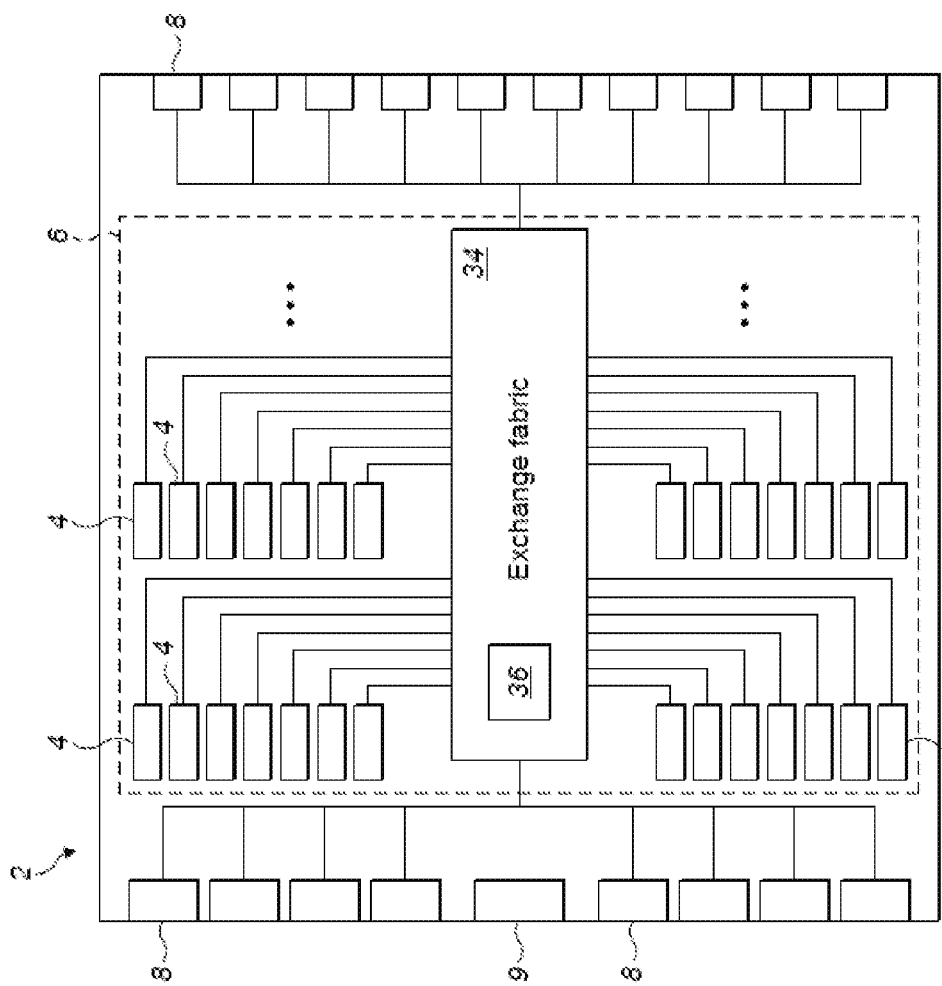
FIG. 1 is a schematic block diagram of a processor chip comprising multiple tiles.

Each accelerator may be a single chip processor. FIG. 1 shows a single chip processor 2, i.e. a single die, comprising an array 6 of multiple processor tiles 4 and an on-chip interconnect 34 connecting between the tiles 4. The processor tiles 4 may collectively perform calculations for one or more AI models. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 is a processing unit capable of executing instructions (code) from a local instruction memory and handling data in local data memory. A tile 4 may comprise a respective instance of a barrel-threaded processing unit 10 and a memory 11. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

Figure 12:
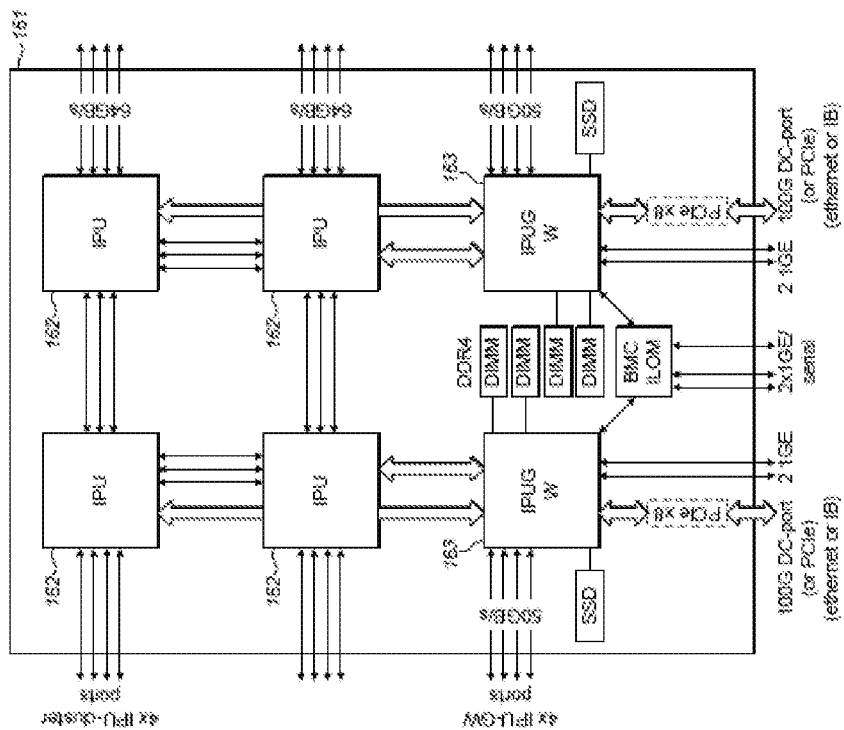
FIG. 12 is a schematic illustration of a machine including a plurality of accelerators and gateways.

Each chip 2 also comprises one or more external links 8, enabling the chip 2 to be connected to one or more other, external processors on different chips (e.g. one or more other instances of the same chip 2). These external links 8 may act as chip-to-chip links for connecting together with one or more other instances of the chip 2 on the same IC package or card, or on different cards. Multiple instances of the chip 2 can be connected together into cards by chip-to-chip links (as shown in FIG. 12 described later). The chip also has a connector 9 which connects the chip to a gateway, which is described in detail later. Note that not all accelerators need to have a gateway connector 9, but at least some do for the purposes described herein. In one example arrangement, the chip 2 receives work from the gateway allocated by a host, in the form of input data to be processed by the chip 2. Note that references to the host may instead imply a reference to an off chip storage system such as network attached storage (NAS). The gateway enables data from a host or NAS to be provided to one or more accelerators, which are designed as a single chip processor 2 or as multiple single chip processors 2, possibly arranged on multiple interconnected cards. The gateway enables relay and disaggregation between accelerator and hosts as detailed later.

The interconnect 34 is configured to enable the different processor tiles 4 in the array 6 to communicate with one another on-chip 2. In the IPU described in our earlier patent applications, communication between tiles 4 on the accelerator 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is therefore required to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from an accelerator is usually barrier dependent to provide data-consistency between the accelerators and between each accelerator and the host. Typically used data consistency models are Bulk Synchronous Parallel (BSP), Stale Synchronous Parallel (SSP) and Asynchronous.

In SSP, the faster worker thread of a plurality of worker threads is allowed to run ahead of the slowest worker thread by a number of clock cycles. A worker thread is able to see updates made to a shared parameter having a range of time stamps. For example, a worker at clock t is able to see all updates from workers up to those updates that are time-stamped at t−Δ.

BSP is a special case of SSP, where Δ=0, and where, therefore, the workers may not run ahead of each other.

In the Asynchronous data consistency model, the shared parameters may be read and/or written to at any time.

Embodiments of the invention described herein use a BSP model, but it will be apparent that the other data consistency models could be utilised as an alternative.

Figure 2:
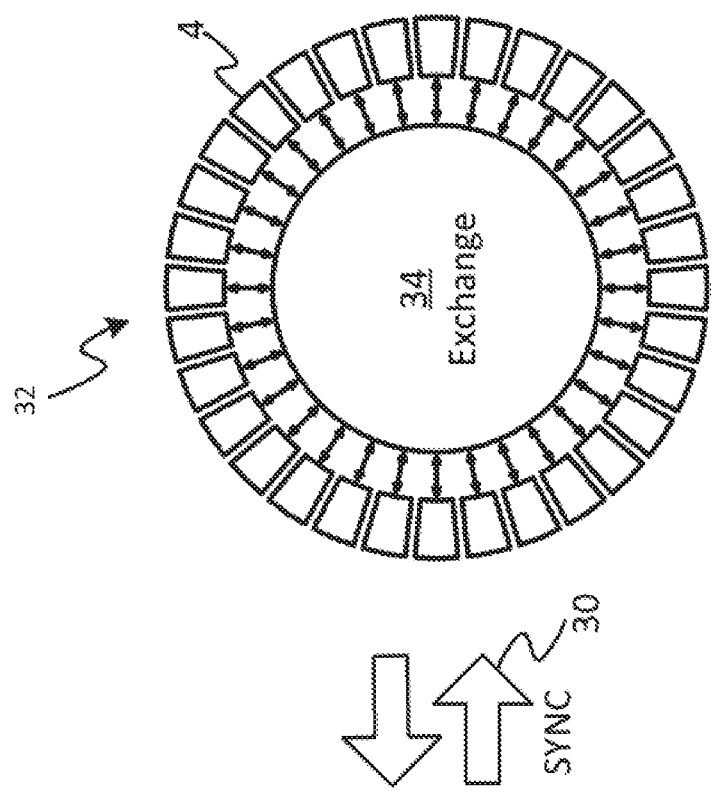
FIG. 2 is a schematic illustration of a bulk synchronous parallel (BSP) computing model.
Figure 2:
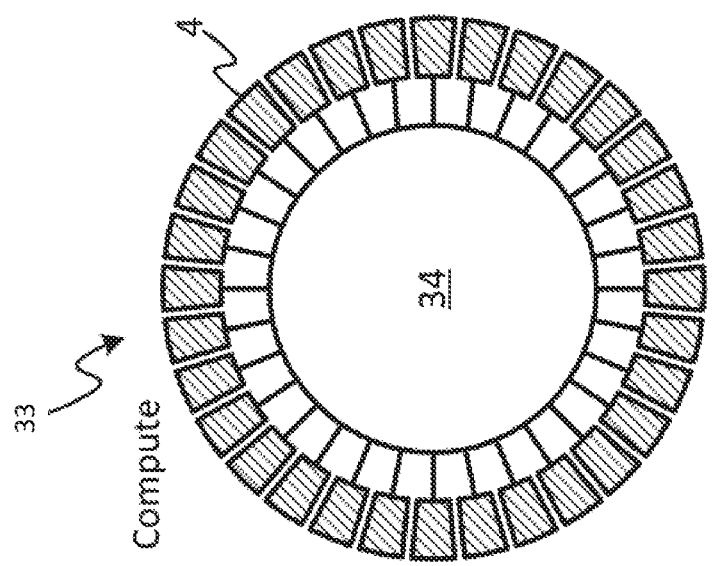
Figure 3:
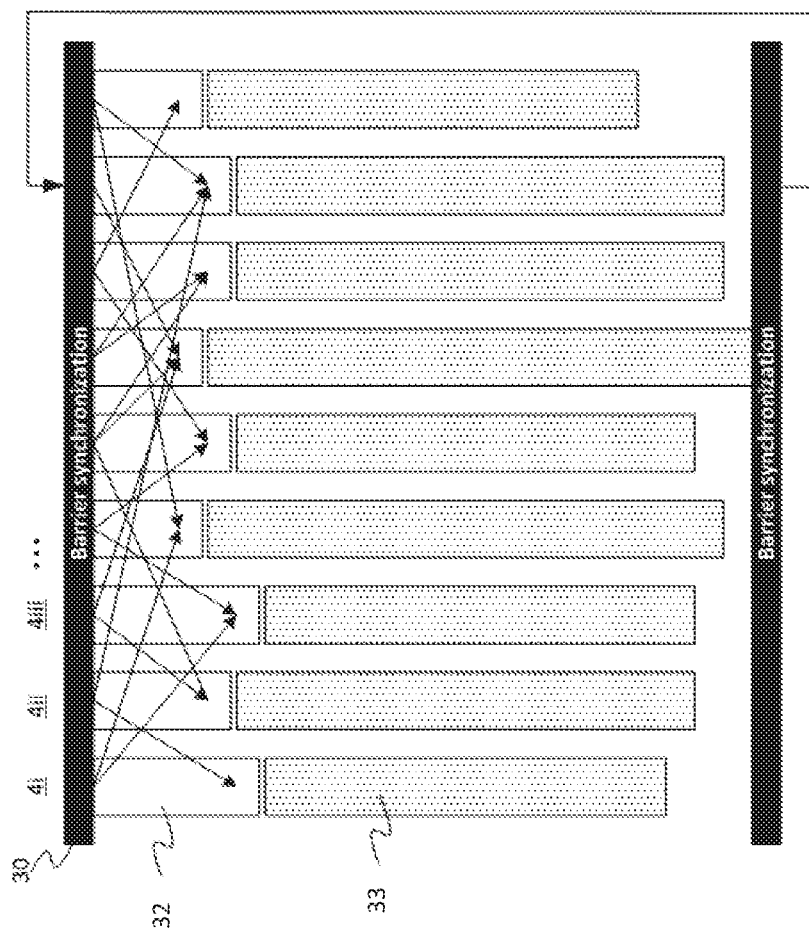
FIG. 3 is another schematic illustration of a BSP model.

Reference is made to FIGS. 2 and 3, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase. Note also that a tile 4 performing computation may be allowed during the compute phase 33 to communicate with the gateway which is external to the array of tiles 4 being synchronized—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same chip 2 or different chips could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later FIG. 2 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

According to embodiments disclosed herein, this type of BSP may be facilitated by incorporating additional, special, dedicated functionality into a machine code instruction for performing barrier synchronization, i.e. the sync instruction. The sync instruction may be executed on the processor of the tile, so as to start an exchange phase in which data is exchanged to cause synchronisation of data stored in memories of the tiles.

As mentioned it is possible to combine several accelerators, e.g. IPUs, to produce an accelerator machine 161 having improved processing power compared to a single accelerator. Such an accelerator machine 161 is illustrated in FIG. 12. The accelerator machine 161 comprises a plurality (in this example four) of accelerators 162 connected in an array with each accelerator connected to its neighbour by links 8. The machine 161 also comprises two gateways 163 that are configured to connect the machine 161 to one or more hosts (not shown). Each gateway 163 is connected to two of the four accelerators 162 via gateway links 9.

As will be explained in further detail, the gateways 163 are able to exchange data with their connected accelerators 162 in the exchange phase, following a data exchange synchronisation point. The data exchange synchronisation point is triggered as a result of the execution of the sync instructions that are part of the pre-compiled code running on the accelerators. At the start of the data exchange synchronisation point, a sync instruction may be executed on the processor of a tile. The execution of one or more sync instructions by one or more tiles of an accelerator 162 causes one or more sync requests to be issued by the one or more tiles. These sync requests are aggregated by the accelerator 162, which then issues an aggregated sync request to its associated gateway 163. The gateways may be connected to transmit synchronisation signals between them to enable synchronisation zones to be formed of multiple gateways and accelerators. One function of the synchronisation signals is to facilitate data exchange between the gateways 163 and the associated accelerators 162 in the exchange phase of a BSP model, but they have other non-data related applications. Each gateway 163 has a local memory and is configured to obtain (from the host, from remote storage, or from another gateway) and store data to be sent to the accelerators at a data exchange synchronisation point. The data is stored in the local memory in advance of a sync request from the accelerator 162 so that it is ready to be transferred to the accelerator. One function of the gateway is to supply requested data to the accelerator when the accelerator needs it. Data can be obtained by the gateway from the host or remote storage by different mechanisms as discussed later.

Each gateway 163 is also configured to exchange data with other gateways. A gateway 163 may distribute copies of data to be sent to the accelerators 162 to other gateways. These other gateways may then distribute data to the accelerators 162 to which they are connected. Therefore, the other gateways receiving the copies of the data need not independently obtain the data from storage (e.g. host or remote storage), thereby preventing redundant data from being retrieved from a storage by multiple gateways. This is described in more detail later. Furthermore, as will be described in more detail later, a gateway 163 is configured to enable a plurality of different types of data transfer. A gateway 163 is configured to exchange data with other gateways. A gateway 163 is configured to exchange data with one or more accelerators 162 to which it is coupled. A gateway 163 is configured to exchange data with one or more hosts (not shown).

Figure 4:
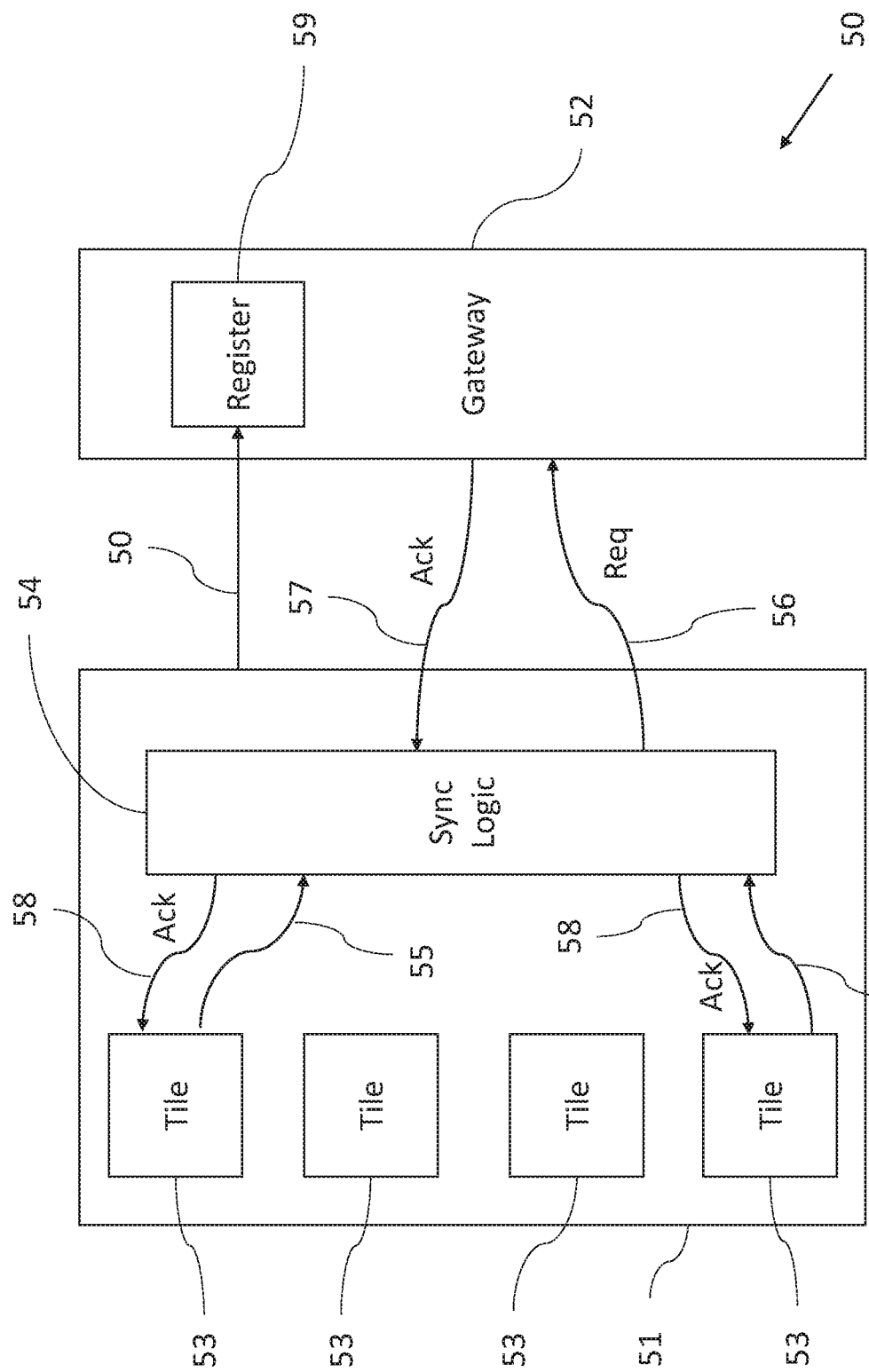
FIG. 4 is a schematic illustration of the exchange of synchronisation requests/acknowledgments between an accelerator and a gateway.

Reference is made to FIG. 4, which illustrates an example of how the sync request/acknowledgment mechanism works in the case that one or more tiles 53 of the accelerator 51 issue requests for synchronisation to the gateway 52.

The gateway 52 comprises a gateway sync register 59 that comprises an indication of a sync zone for an upcoming synchronisation to be carried out. The register 59 may be implemented in a shared register block (SRB) in the gateway 52. The gateway 52 comprises separate such gateway sync registers for the separate accelerators with which to communicate. FIG. 4 shows the gateway sync register for the accelerator 51. Prior to a barrier synchronisation, a tile 53 of the accelerator 51 is configured to transmit an indication 32 of the sync zone to which it belongs for the upcoming synchronisation. As will be explained in more detail later, according to embodiments of the application, the indication of the sync zone defines the sync zone by controlling the propagation of sync requests and acknowledgments in the gateway. Since many of the tiles 53 of the accelerator 51 may belong to the same sync zone, the compiler nominates a tile belonging to the particular sync zone for writing the indication 32. The sync zone indicates which tiles are to be involved in a synchronisation together. In some cases, a sync zone may only comprise tiles 53 on the same chip, in which case it is understood that a gateway is not involved. In other cases, a sync zone may be an external sync including tiles 53 on different chips. In some cases, a sync zone includes tiles on a different accelerator. In some cases, a sync zone includes the gateway/s, host and/or remote storage.

Although the indication of the sync zone is here presented as being transmitted separately to the sync request. In some other embodiments, the indication may be provided as part of the sync request 56 that is received from the accelerator 51, or part of the out of band (e.g. PCIe write) sync information provided before the sync request is asserted.

The data exchange synchronisation point is triggered as a result of the sync instructions pre-compiled in the code running on the tiles 53 of the accelerator 51. At the start of the data exchange synchronisation point, one or more sync instructions may be executed on the processors of one or more of the tiles 53. Each tile which executes a sync instruction transmits a sync request, which is received at sync logic 54 of the accelerator 51. The sync logic 54 aggregates these sync requests 55 and transmits the aggregated sync request 56 to the gateway 52.

The gateway 52 receives from the accelerator 51, the sync request 56, and may allow the synchronisation barrier to be passed. This involves transmitting a sync acknowledgment 57 to the accelerator 51 in response to the sync request 56. Allowing the synchronisation barrier to be passed causes the tiles 53 of the accelerator 51 to exchange data with each other and, in some circumstances, with the gateway 52 itself. The data exchange with the gateway 52 may involve data received at the gateway 52 from the host (not shown) being transferred to one or more tiles 53 of the accelerator 51. The data exchange with the gateway 52 may involve data received at the gateway 52 from another gateway (not shown) being transferred to one or more tiles of the accelerator 53. The data received from the other gateway may have originated from another accelerator. This is one mechanism by which data exchange between accelerators may be achieved via the gateways. The data received from the other gateway may have originated from another host. Another mechanism is through a facility of the gateways to enable one accelerator connected to a gateway to write directly to another accelerator connected to another gateway, via a fabric port between the gateways. To achieve this, all storage locations in each grouping of accelerators/gateways (i.e. chassis/group/rack etc) form part of a single global address space.

The gateway 52 has three data exchange boundaries: (i) gateway—accelerator; (ii) gateway—external; and (iii) gateway-gateway. These have different requirements and therefore are managed by different protocols. However, they have to be co-ordinated such that accelerator 51 data is available in gateway memory when it is requested (i.e. on sync) by an accelerator 51, but that the gateway memory which stores data for the gateway 52 does not overflow.

As mentioned, prior to the synchronisation, an indication is stored in the register 59 as to the sync zone for a group of tiles 53 of the accelerator. In some embodiments, the write 50 to this register 59 is preferably made prior to the issuance of the sync request 56 to the gateway 52. Preferably, the tile would transmit the indication at the end of the previous exchange phase or at the beginning of the compute step preceding the exchange phase in which the corresponding synchronisation will take place. A separate write 50 to the register 59 is carried out for each synchronisation barrier. Upon receiving a sync request 56, the gateway 52 is configured to consume from the register 59, the indication corresponding to the sync request. The gateway 52 is configured to only transmit the acknowledgment 57 for the sync request to the accelerator 51 if an indication corresponding to the sync request 56 has been written to the register 59. In other words, the gateway 52 will only transmit the acknowledgment 57 for the sync request to the accelerator 51 if the value has been refreshed since the last barrier.

If there is a delay in the writing to the register 59 of the indication of the sync zone—because, for example, one or more tiles 53 of the accelerator are unable to determine their sync zone until the end of the compute phase—then the sync request may be received before the register is updated with the corresponding indication of the sync zone. In this case, the gateway 52 waits to transmit the acknowledgment 57 until the register 59 receives the corresponding indication of the sync zone. The system may, therefore, be subject to a small latency hit whilst waiting for the register 59 to be refreshed.

The gateway 52 uses the indication of the sync zone that is stored in the register 59 to generate and transmit the sync acknowledgment 57 to the correct tiles, chips and/or accelerators. For example, if the indication of the sync zone is that the sync zone includes the accelerator 51 and, additionally, a further accelerator (not shown), the gateway 52 transmits a sync acknowledgment to the accelerator 51 and to the further accelerator in response to receipt of the sync request. The gateway 52 may read the indication of the sync zone from the register 59 and in dependence on this indication, propagate the sync acknowledgment or request 57 accordingly.

The information that is written to the register 59 by the accelerator 51 comprises an indication of whether or not data transfer from the gateway 52 itself is required as part of the synchronisation. This indication may be implicit from the indication of the sync zone stored in the register 59. If the gateway 52 determines that data transfer is required, the gateway 52 then applies a credit control mechanism to determine whether or not to allow the synchronisation barrier to be passed. If the gateway 52 determines that data transfer is not required, the gateway 52 transmits the sync acknowledgment 57 to the accelerator 51 without applying the credit control mechanism. For the credit control mechanism, if there are one or more of a first set of credits (referred to as ESP (exchange synchronisation point) credits) available in a storage (the Local Sync Barrier Module (LSBM), to be described later) of the gateway 52, then the gateway 52 is configured to allow the synchronisation barrier to be passed in response to receipt of the sync request 56 by transmitting the sync acknowledgment 57 to the accelerator 51 and transferring the data of the synchronisation to the accelerator 51 from gateway memory (not shown in FIG. 4). If there are zero of the ESP credits available, the gateway 52 will not acknowledge 57 the synchronisation request 56 and the data will not be transferred from the gateway memory (not shown in FIG. 4) to the accelerator 51 thus causing the synchronisation to stall. This credit control mechanism, which is described in more detail below, allows the gateway 52 and the accelerator 51 to remain synchronised in the BSP protocol with respect to one another.

In some embodiments, the gateway 52 and accelerator 51 each comprise pre-compiled code, allowing the gateway 52 to provide the required data to the accelerator 51 at the correct time.

After the sync logic 54 of the accelerator 51 has transmitted the sync request 56, the sync logic 54 will await the sync acknowledgment (sync_ack) 57 from the gateway 52. When the sync logic 54 of the accelerator 51 receives the sync acknowledgement 57 from the gateway 52, it will return the sync acknowledgment signal 57 (sync_ack) to the tiles 53 that issued the sync requests 55. All the sync requesting tiles 53 will be automatically paused until the sync acknowledgment 58 (sync_ack) from the external sync logic 54 is returned. In response to the sync acknowledgment 58, the tiles 53 resume instruction issue for the supervisor, i.e. they re-enter the compute phase.

The actual data (content) may be transmitted between the accelerator tiles 53 and the gateway 52 by a different channel to the sync requests 55/56 and the sync acknowledgements 57/58. Further, it will be appreciated that the skilled person will be capable of building different types of circuits for implementing the disclosed synchronization and aggregation functionality given the specification of that functionality disclosed herein. For instance, the synchronisation logic 54 could use dedicated wiring for transmitting the sync requests 56 and sync acknowledgments 57/58. The synchronisation logic 54 could instead use packets carried over an interconnect as an alternative to dedicated wiring. For example, the sync request 55/56 and/or the sync acknowledgment 57/58 could each be transmitted in the form of one or more packets. For example, the sync request 55/56 and/or the sync acknowledgement 57/58 could each be transmitted in the form of one or more packets Reference is made to FIG. 5, which illustrates, in more detail, the concept of sync zones.

Figure 5:
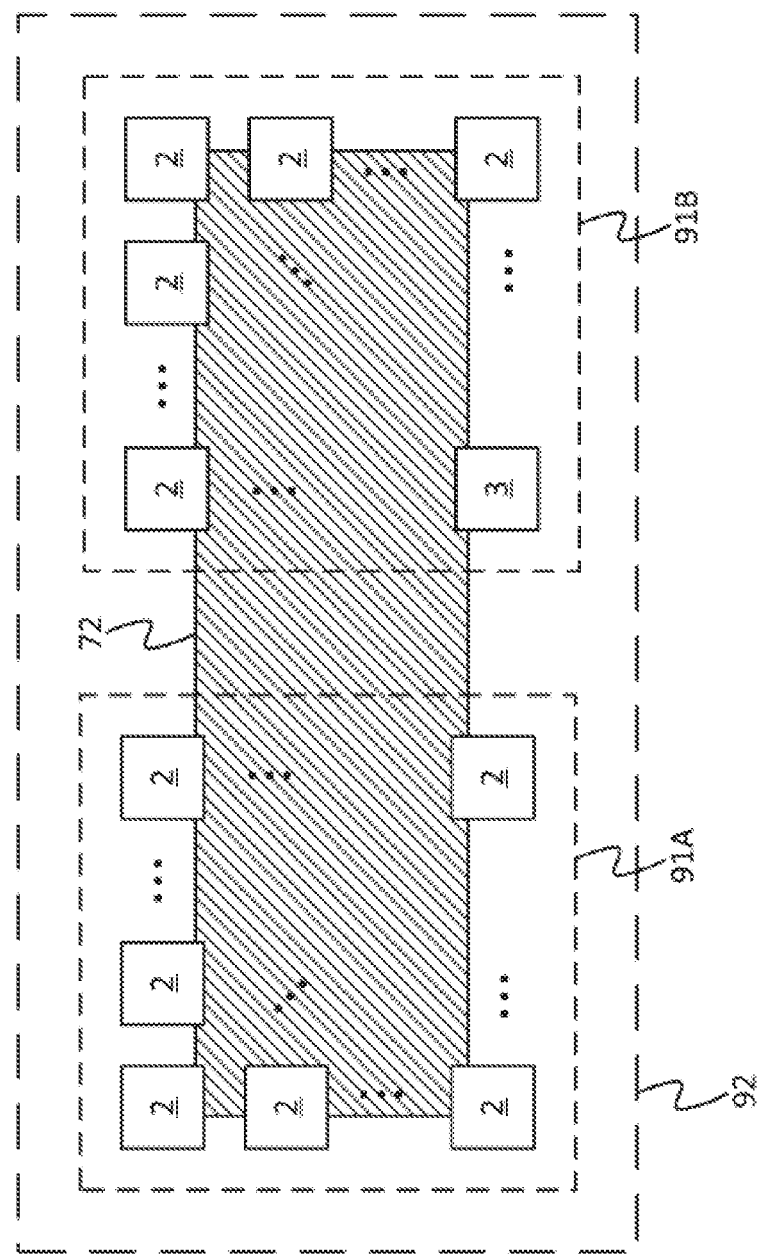
FIG. 5 is another schematic illustration of a system of multiple processor chips.

FIG. 5 illustrates two different possible sync zones, e.g. zone_1 or zone_2. In embodiments, these correspond to different hierarchical levels. That is to say, each higher hierarchical level 92 (e.g. zone 2) encompasses two or more zones 91A, 91B of at least one lower hierarchical level. Using FIG. 9 as an example, the two leftmost gateways and accelerators might have a sync zone 0 in which the one of the two gateways is the master. Likewise, the two rightmost gateways and accelerators might have a sync zone 0 in which one of the two gateways is the master. Then there may further be a sync zone 1 which is the entirety of the diagram (and then any arbitrary gateway might be nominated as the sync master).

Then it would be possible for several hierarchies of sync to be utilized by the program:

1. Internal accelerators only sync—tiles on the same accelerator might sync
2. IPU+gateway only (data) sync—single accelerator asking its gateway for sync (e.g. to coordinate the exchange of data).
3. Leftmost sync zone 0 (with or without credits at each gateway)
4. Rightmost sync zone 0 (with or without credits at each gateway)
5. Sync zone 1 (with or without credits at each gateway)

The information written to register 59 may indicate gateway involvement (i.e. that data is to be transferred between gateway 52 and the accelerator 51) for the synchronisation. Therefore, when a corresponding sync instruction is executed, data exchange between the accelerator 51 and the gateway 52 takes place. The indication may indicate involvement of a further gateway other than gateway 52, where the accelerator 51 may communicate with the further gateway via the gateway 52. In the case where a further gateway is indicated for involvement, the sync request from the accelerator 51 may be passed (after being aggregated with other sync requests received at the gateway 52) upstream to the further gateway. The gateway 52 awaits a sync acknowledgment from the further gateway, before providing the sync acknowledgment to the accelerator. This scenario is described in more detail later with respect to FIG. 8.

In response to receiving a sync request from the accelerator 51, the gateway 52 transmits a sync acknowledgment 57 to the accelerator 51. The dedicated hardware sync logic 54 in the accelerator receives the sync acknowledgment (sync_ack) 57 from the gateway and transmits the sync acknowledgement 58 to the tiles 4 of the sync zone. The sync logic 54 will return the sync acknowledgment signal 58 (sync_ack) to the tiles in the signalled sync zone only once a synchronization request (sync_req) 55 has been received from all the tiles 4 in that zone (but will not wait for any other tiles outside that zone if it is not a global sync).

Figure 6:
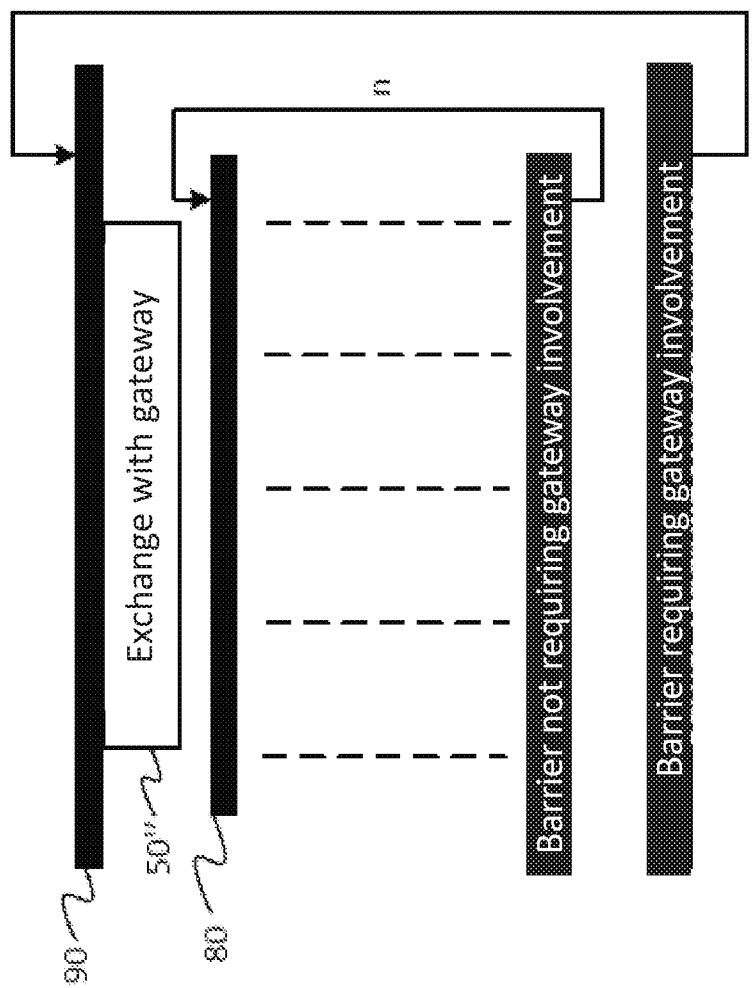
FIG. 6 schematically illustrates a program flow involving synchronisation with host.

Note that in other embodiments, the sync zones that can be specified by the indication in the register 59 are not limited to being hierarchical in nature. In general, the indication in the register 59 may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups which can run asynchronously to one another until a broader synchronization is required As explained, some synchronisation barriers involve synchronising tiles of an accelerator with data from the host provided via the gateway, whereas some synchronisation barriers do not. An example is illustrated schematically in FIG. 6 for the global sync zone 92. The system is allowed to perform N supersteps, passing through N sync barriers 80, before a barrier 90 also requiring synchronisation with data provided by the host 63 is imposed. At the synchronisation barrier 90, data, which has been transferred to the gateway 52 from the host 63, is transferred to the accelerator 51 from the gateway 52. The N sync barriers require sync requests from all the (non-abstaining) tiles 4 in the relevant sync group 92. These sync requests are aggregated and passed to the gateway 52, which acknowledges the aggregated request. The subsequent sync barrier 80 also requires sync requests from all the (non-abstaining) tiles 4 in the sync group 92. These sync requests are aggregated and passed to the gateway 52, which acknowledges the aggregated request only if suitable ESP credit is available in the gateway 52. In other words, to pass the sync barrier 80 requires that the gateway stores at least one ESP credit to pass the particular barrier. After this barrier 90, an exchange 50" may be performed between the gateway and one or more of the tiles 4, e.g. for one or more of the tiles 4 to report computation results to the host 63.

Figure 7:
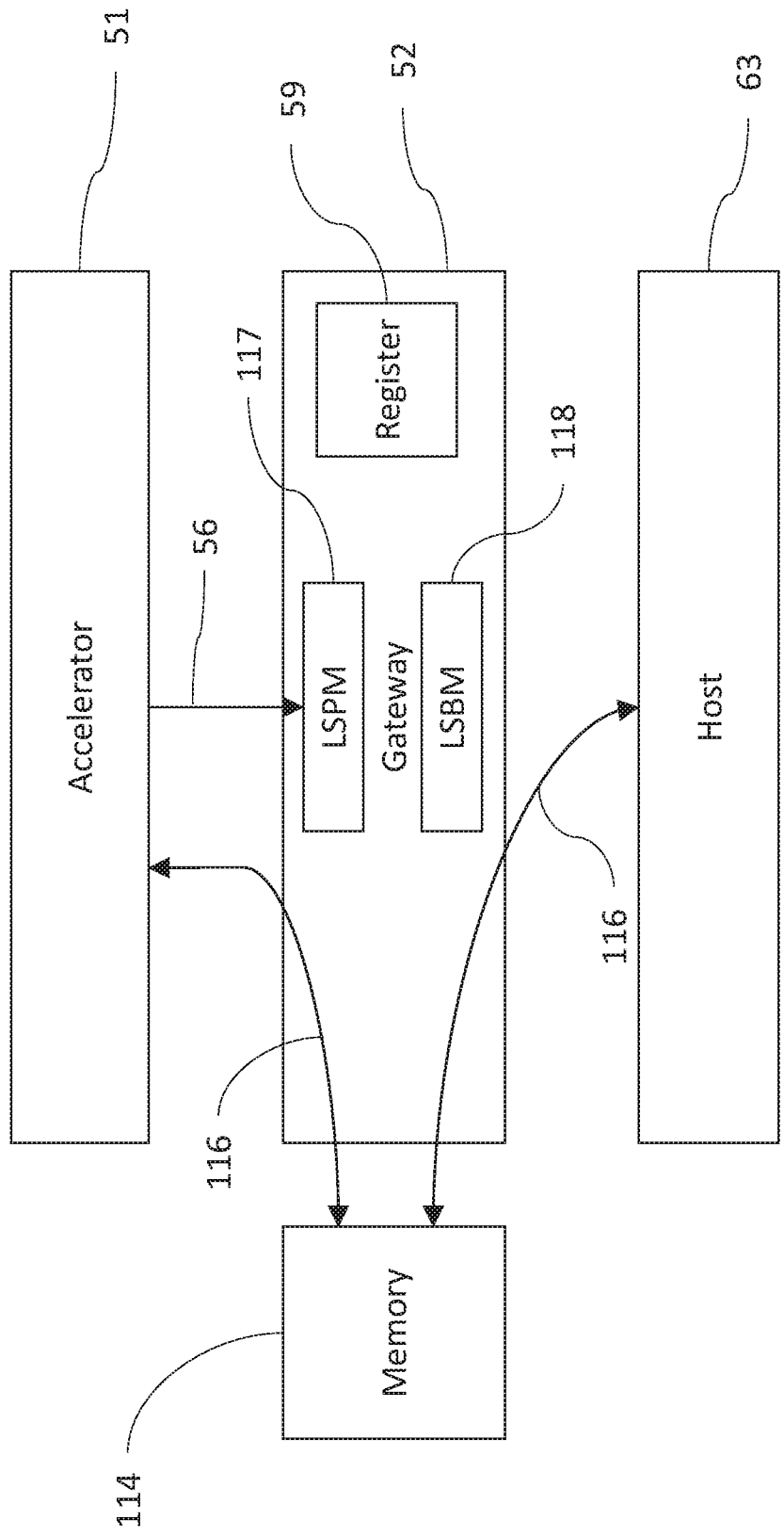
FIG. 7 schematically illustrates a system including an accelerator, gateway, and host.

Reference is now made to FIG. 7, which illustrates in further detail how a host 63 interacts and exchanges data with an accelerator 51. The host 63 is configured to provide data for the accelerator 51 to process. The accelerator 51 is configured to process the data and deliver the results of the processing to the host 63. The gateway 52 is responsible for streaming data in a managed fashion between the host 63 and the accelerator 51 for the exchange of data. In the example, the accelerator 51 may be an IPU as described above with reference to the preceding Figures. However, the gateway 52 may be useable for interfacing a host 63 with other types of accelerator 51.

Data synchronisation between host 63, gateway 52 and accelerator 51 through Exchange Synchronisation Points ensures gateway data consistency and readiness for I/O operations. The availability of data between gateway 52 and accelerator 51 is handled via a credit mechanism of ESP credits. One credit allows one ESP to be passed. The gateway memory 114 preparation, ahead of an ESP, is handled by the gateway 52 executing "pre-work" instructions. The data handling after the ESP is performed by executing "post-work" instructions. A PPE execution engine 123, described later, executes the pre- and post-work instructions.

As shown in FIG. 7 (and referring also to FIG. 5), the gateway 52 comprises at least one "Local Sync Propagation Module" (LSPM) 117 and at least one "Local Sync Barrier Module" (LSBM) 118. The LSBM 118 can be considered as a kind of proxy to the PPE and enables the program running on the accelerators to process batches of data to be decoupled from the host. The accelerator 51/gateway 52 synchronisation can run asynchronously from the host 63 activity in providing data to the gateway 52. The LSBM 118 is configured to store the ESP credits discussed above. The LSBM is accessible to the LSPM 117.

The LSBM 118 comprises hardware circuitry configured to enable the host 63 to participate in the respective sync group 92 in which the LSBM 118 is arranged to act as a proxy to the PPE. A sync request 56 emitted by the tiles 4, if it is a sync with gateway involvement, will make use of both the LSPM 117 and LSBM 118 of the gateway 52, whereas a sync request 56 for a sync which does not involve transfer of data between gateway 52 and accelerator 51 will be received by the LSPM 117 and returned to the requesting tiles without involving the LSBM 118. Thus the tiles 4 determine by virtue of the program they execute when, if at all, the accelerator 51 requires to interact with the gateway via the LSBM 118.

If the accelerator 51 requires to interact with the gateway, the LSPM 117 is then configured to allow the synchronisation barrier to be passed when a sync request 56 is received in response to determining that the number of ESP credits in the LSBM 118 is greater than zero. Allowing the synchronisation barrier to be passed involves generating a sync acknowledgement (not shown) and sending this sync acknowledgment to the accelerator 51.

As explained above, the gateway 52 stores in the LSBM 118 a set of credits associated with the interface between itself and the accelerator 51. These credits are referred to in the description as exchange synchronization points (ESP) credits. However, the skilled person would understand that this name is used to conveniently identify the credits only and does not imply a limitation as to the nature of the credits. The ESP credits may also be referred to as barrier credits, since they control whether or not a data exchange operation may be executed for one barrier.

If the number of ESP credits in the LSBM 118 is zero, when a sync request 56 is received and the corresponding indication in the register 59 is such that data transfer with the gateway is required, the LSPM 117 does not allow the synchronisation barrier to be passed and therefore does not allow the tiles 4 in the group 92 to continue running again until the number of ESP credits is greater than zero. The generation of ESP credits may be achieved when data, which is for transfer to the accelerator 51 at the exchange synchronisation point, becomes available in the gateway 52. In some cases, this data may become available as a result of it being transferred from the host 63 or network attached or other external storage. In other cases, this data may become available as a result it being transferred from another gateway. The data received from the other gateway may be data from another accelerator or from another host or remote storage.

In some embodiments, there may be a plurality of sets of ESP credits held by the gateway 52. There may be different sets of credits for different sync groups. In this case, a sync request 56 corresponding to one sync group may cause the gateway 52 to acknowledge the request (if the number of ESP credits for that group is non-zero), whereas a sync request 56 corresponding to another sync group may not cause the gateway 52 to acknowledge the request (if the number of ESP credits for that group is zero). There may also be different sets of credits for the different accelerators configured to communicate with the gateway 52. As shown in FIG. 12, each gateway 163 is configured to communicate with two accelerators 162, and therefore, the gateway 52 may store two sets of ESP credits for each accelerator 162. If each accelerator 162 has two possible sync groups requiring gateway data transfer, this leads to four sets of credits in total being held by each gateway 163.

In some embodiments, the different credit sets that are established for different sync zones for an accelerator may be controlled by a single ESP credit register in the LSBM 118. In this case, all of the per sync zone ESP credit sets will be identical to a single ESP credit register that controls all credits in the GW for a given accelerator. When a sync barrier is passed, the ESP credits of the single ESP credit register for the accelerator will be decremented.

Tiles 4 of a sync group can be allowed to continue running through N barriers synchronized (with sync requests being forwarded to and acknowledged by the LSPM 117) without requiring the checking of ESP credits of the gateway to be carried out, after which they must then synchronize with the gateway via the LSBM 118 (and may then exchange data to and/or from the gateway). See, for example, FIG. 6.

As explained above, the software running on the tiles 4 is programmed to request a sync with the gateway by transmitting an indication (which may be included in the sync request or transmitted separately) as to whether or not gateway involvement is required for the sync. This indication is stored in register 59 of the gateway 52. In such embodiments, the above described credit control mechanism is applied only by the LSBM 118 for the barriers corresponding to syncs marked as requiring gateway involvement (the "involvement" of the gateway for any given barrier being either the proxy granting (LSBM) of the sync ack by the LSPM 118 on behalf of the host, or occasionally the explicit granting of more ESP credits to LSBM 118).

In embodiments, preparation for barriers performed by the gateway may include the preparation of data to be fetched by the accelerator 51, such as experience data sets required by the accelerator 51 for the next stage in learning a model. Preparation in this context may include fetching the data from storage disks or other media, formatting data in a form which is required by the training algorithm running on the accelerator 51 or decompression of image data. Additionally, preparation for barriers may include consuming output data produced by the accelerator 51. As discussed later, some or all of this preparation may be conducted at the gateway 52. As a minimum, the gateway 52 is in the pathway between the storage disks or other media and the accelerator 51.

The sync request 56 to the LSPM 117 could be delivered from a processing element as a network (or PCIe) packet, and/or the sync acknowledgment 57 could be returned as a network (or PCIe) packet. In general the (or a) gateway may be involved in any one or more of the hierarchical levels of sync.

Generally, the concept of ESP credits can be applicable to any multi-tile architecture, not just the example architecture disclosed herein. Nor is it necessarily limited to the BSP application context. The disclosed technique has a particular synergy with systems which employ a single rendez-vous point such as BSP, or when the number of distinct rendezvous points between a host or other outside-world system and the machine in question is limited to just one rendezvous or a very small number (as opposed to, say, CSP). Nonetheless the applicability of the present disclosure is not absolutely limited in this respect. In any system or application, latency saving can be achieved by enabling the tiles to pass through a specified number of synchronization barriers without involving the gateway, thus reducing the number of times the multi-tile sub-system has to interact with the gateway and therefore reducing the number of times the latency penalty of doing so is incurred.

Furthermore, although embodiments have been exemplified in terms of a PCIe interface between cards or with the host 63, this is not limiting and other types of interface could be used, e.g. Ethernet.

Furthermore, the implementation is not limited to synchronising communications between a host system 63 and an accelerator 51 which would otherwise run asynchronously. In embodiments, the gateway 52 could be employed for the synchronization between two independent BSP or other parallel processing subsystems, which run synchronously internally, but run asynchronously, with respect to one another. The gateway 52 allows the size of a sync group to be increased to a much larger size and enables a more efficient tree structure for those larger groups.

The batches of data received at the gateway 52 are stored in a memory 114. The memory 114 is a local memory (e.g. DRAM) that is reserved for use by the gateway 52. In response to the sync request 56, the data may be retrieved from the memory 114 by the gateway 52 and transferred to the accelerator 51. The path 116 illustrates the flow of each batch of data. Note that each batch of data is held in the memory 114 for a period of time which may vary from batch to batch. It depends on the time the batch enters the gateway 52 and the time it is pushed to the accelerator 51, and these are not necessarily related.

The LSPM 117 may be configured to indicate, to the gateway 52, the timing of the transfer of data from the memory 114 to the accelerator 51, or from the accelerator 51 to the memory 114. This allows the LSPM 117 to dictate the appropriate timing for the deployment of data from the accelerator 61 to the memory 114 so as to prevent overflowing of the gateway memory 114.

Furthermore, the flow of data into the gateway memory 114 from the host/remote storage is managed so as to avoid overflowing the gateway memory 114.

In FIG. 7, data for processing by the accelerator 51 is transferred from the host 63 to the gateway 52, which stores it in local memory 114. The data may be pulled by the gateway 52 via RDMA read or may be written via an RDMA write made by the host 63 to the gateway 52.

Figure 11:
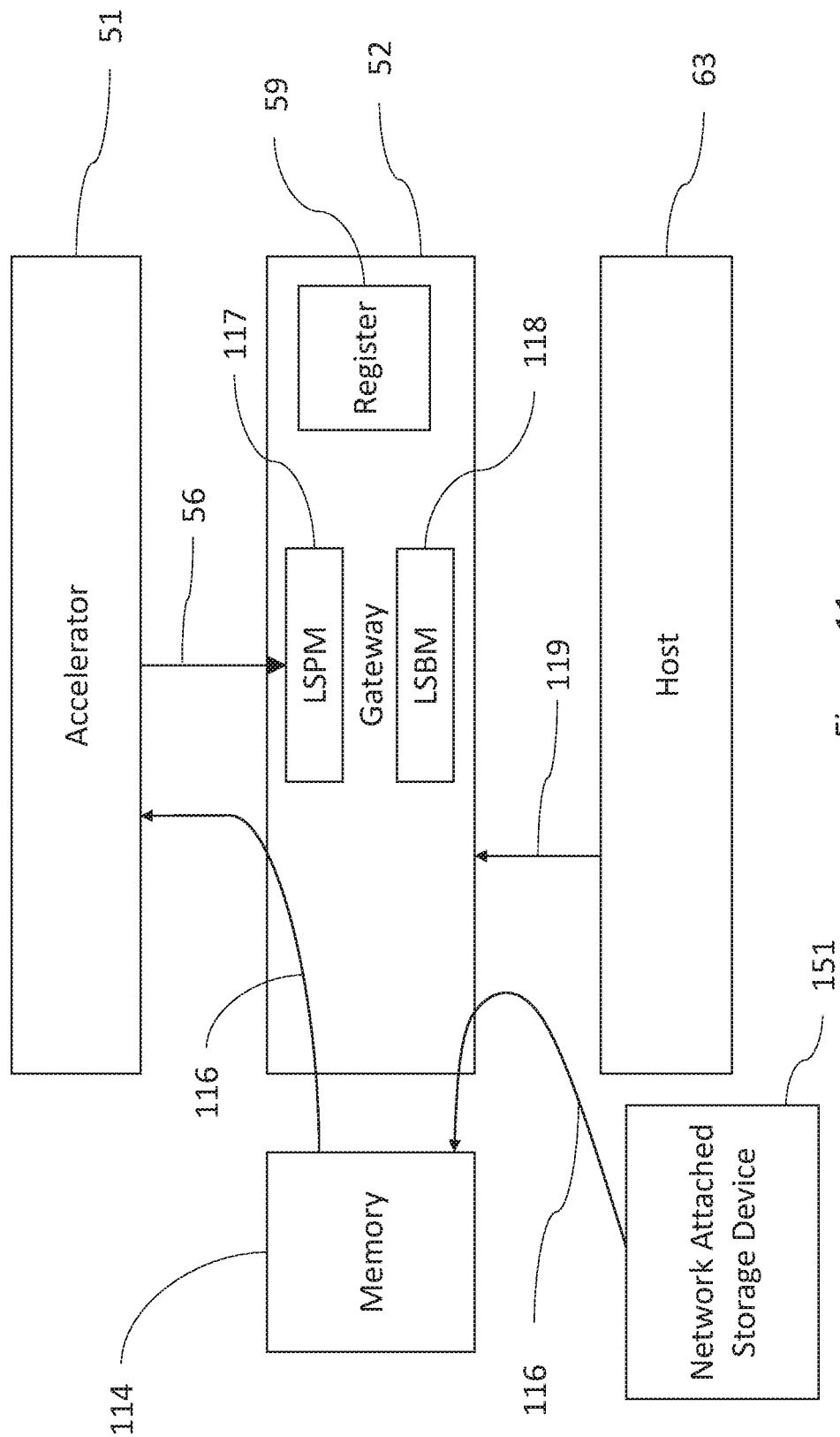
FIG. 11 is a schematic illustration of a system including an accelerator, gateway, and host.

Reference is made to FIG. 11, which shows an alternative scheme in which data 116 is retrieved by the gateway 52 from a network attached storage 151. The network attached storage 151 is also be referred to herein as remote storage. In FIG. 11, like elements to elements of FIG. 11 are indicated with like reference numerals.

In FIG. 11, the host 63 sends a descriptor 119 to the gateway 52. The descriptor 118 identifies the location of a network attached storage 151 that is accessible to the gateway 52. The gateway 52, when executing a data fetching instruction referring to the descriptor 119, retrieves the data 116 from the network attached storage 151. The gateway 52 then stores the data 116 in memory 114 prior to transferring the data 116 to the accelerator 51.

In some embodiments, instead of transferring the descriptor 119 from the host 63 to the gateway 52, the pre-compiled code stored by the gateway 52 includes the descriptor. In this case, the gateway 52 autonomously retrieves data from the remote storage 151 without the intervention of the host. In some examples of the application, the gateway 52 comprises a System on Chip (SoC) serving as a standalone appliance so that no external host 63 is required. The entire application stack runs directly on the SoC or on one of the SoCs in the broader system. The gateway 52 is configurable to operate in a first mode where it interacts with an external host 63 processor and a second mode where no such external host 63 is required. The remaining parts of the gateway 52 (e.g. the streaming engine, described with respect to FIG. 8) perform the same functions irrespective of which of these modes the gateway 52 is configured to operate in. The gateway 52 running the standalone appliance retrieves data from an external storage, such as Network Attached Storage Device 151.

Figure 8:
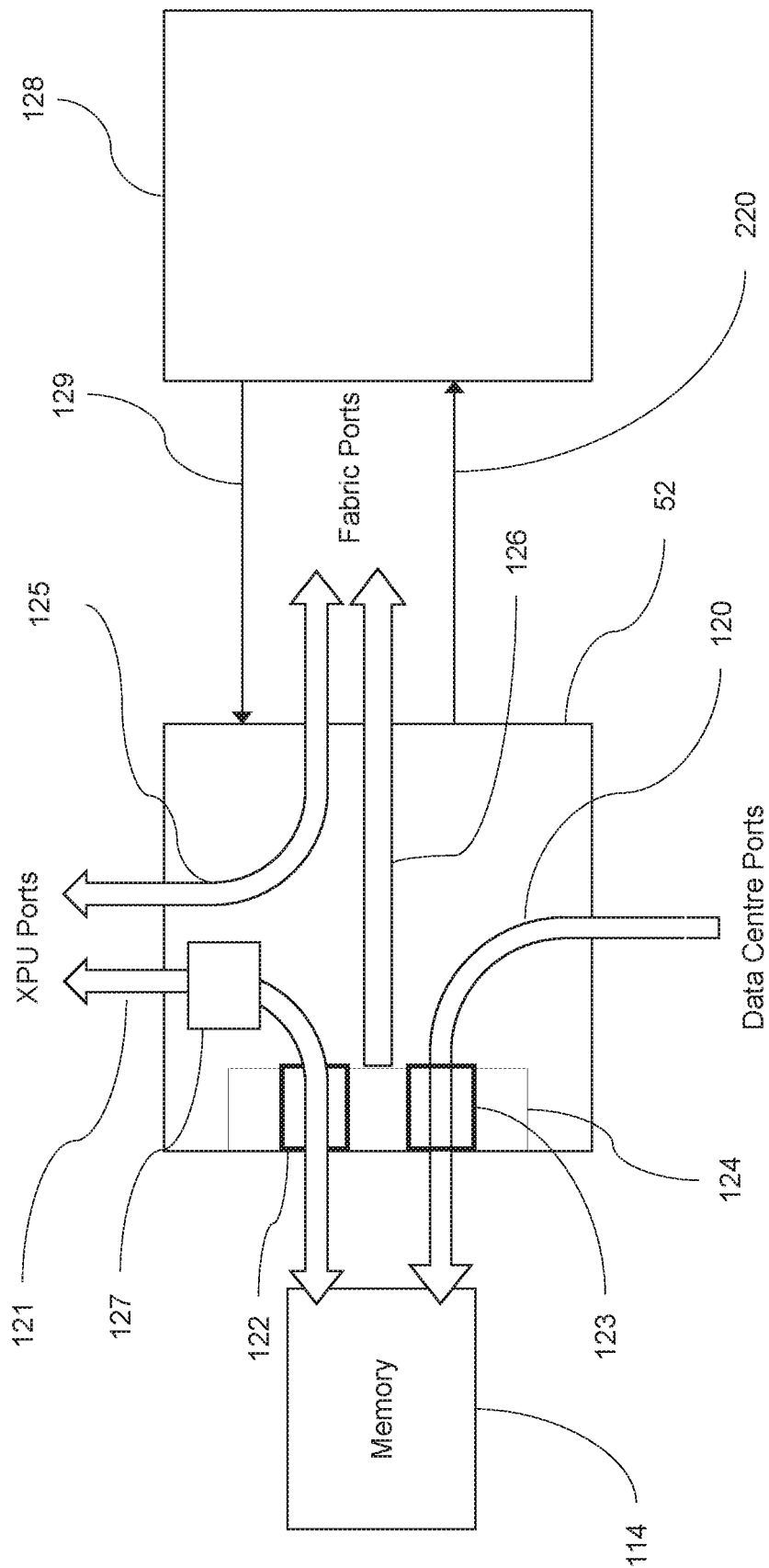
FIG. 8 is a schematic illustration of the different data paths through a gateway.

Reference is made to FIG. 8, which illustrates the gateway 52 in more detail. FIG. 8 shows the various paths that data takes through the gateway 52.

FIG. 8 shows how data 120, which is for processing by the accelerator 51, is transferred to the memory 114 from the host 63 or remote storage 151. As already mentioned, in some examples, the data 120 is transferred to the gateway 52 from the host 63. In other examples, the data 120 is received from local or remote storage 151 (e.g. network attached storage) in response to a read request from the remote storage 151 made by the gateway 52. The gateway 52 retrieves the data 120 from the remote storage 151 via RDMA. The data 120 is received via the data centre ports. Additionally, as well as retrieving data, the gateway 52 writes data (not shown) to the host 63/remote storage 151. The data writes are made via the data centre ports. During the exchange phase, data may be transferred from gateway memory 114 to the accelerator 51.

Instead of, or in addition to, the transfer of data to the accelerator 51 from gateway memory 114 during the exchange phase, data may be transferred from the accelerator 51 to the gateway 52. The accelerator 51 is configured to send the data in the form of data packets to the gateway 52, wherein each data packet includes a header indicating an address. The gateway 52 uses the address of the data packets to determine where to send them. For example, the data packets may be stored in local memory 114. The data packets may be sent to a further gateway 128. The data packets may be dispatched to an accelerator connected to the further gateway 128. The data packets may be sent to host 63/remote storage 151.

The data 120 traverses the gateway 52 to the memory 114 under the control of a streaming engine 124 (which is also responsible for retrieval of data 121 from memory 114 for delivery to the accelerator 51). The streaming engine 124 performs execution of the data streaming operations. These operations for a batch of data may be specified by a work descriptor (WD). The streaming engine 124 comprises two execution engines and code memory (not shown). One of the execution engines is a Data Mover Engine (DME) 122, the other is a Pre/Post Work engine (PPE) 123. They execute instructions loaded into the code memory as an executable image, which is produced by a compiler. The streaming engine 124 has a set of work instructions for execution by the DME 122 and a set of work instructions for execution by the PPE 123. The sets of instructions for the DME and PPE are coordinated by the WD, as set up at compile time. These instructions for a single data exchange synchronisation point may be grouped together into a single WD. The DME 124 is operated by specific DME instructions found in the DME sections of the executable image. The DME 124 uses the WD for navigating to the set of data mover (DMOV) instructions that relates to a given ESP. The PPE 123 is operated by specific PPE instructions found in the PPE sections of the executable image. The PPE 123 uses the WD for navigating to the set of pre/post-work instructions that relates to a given ESP.

The PPE's pre-work must be ready before the data exchange with the accelerator 51. The PPE's post-work in the WD can only start after the exchange has completed. The data exchange comes immediately after the sync request 56 is acknowledged and signalled both to the accelerator 51 and streaming engine 124. This request/ack signals an "Exchange Synchronization Point" (ESP).

The streaming engine 124 supports different data streaming models.

All models support a configuration where a host is allowed to tightly control the consumption of ESP credits. This supports the co-ordination of I/O operations between host 63, gateway 52, and accelerator 51, as well as a mechanism for stalling the accelerator 51 in case this is needed for other accelerator level I/O mechanisms not making use of the gateway memory 114. It may also be a mechanism used for setting break-points or single-stepping a full fabric of accelerators. When running any model under tight flow-control from a host 63, the ESP credits granted by the host 63 are transferred by the PPE scheduler to the "ESP credit register" (part of the LSBM 118). The ESP Credit Register can be read/written by gateway 52 hardware and firmware.

The different streaming models will now be discussed. It would be understood by the skilled person that the streaming models are not mutually exclusive, but that a gateway according to embodiments of the application may operate according to more than one model.

The first streaming model that is supported by the streaming engine 124 is referred to as "Advanced Gateway (GW) push". In Advanced GW push, the PPE 123 streams data from/to external storage and the gateway (GW) memory 114, whilst the DME 122 pushes data to the accelerator 51. Execution is based upon instructions from the compiled executable image held by the gateway. Generation of the executable image for the streaming engine 124 is integrated with the accelerator compiler. The compiler generates two related complied code sequences or executable images. A first of these is executed on the accelerator 51, whilst the second is executed on the gateway 52. In some embodiments, the host 63 may provide the compiled code sequences to the accelerator 51 and gateway 52.

The "gateway push model" is a usage model where the gateway 52 is the one that pushes data. This model differs from the "gateway pull models" (discussed below) in that it pushes data to the accelerator 51 at agreed points in times (at agreed ESPs). This generic push model can support different types of Memory Consistency Protocols or Bridging Models for parallel programming. Examples include Bulk Synchronous Parallel (BSP), Stale Synchronous Parallel (SSP) and Async Parallel.

The Advanced gateway (GW) push model uses the credit mechanism for controlling the availability of data input (relative the accelerator) to be pushed, as well as availability of gateway 52 data buffers for the accelerator 51 to output data into. The gateway 52 executes both Data Mover Instructions (DME 122 is pushing data to the accelerator 51) AND pre/post-work engine instructions for transferring data with the external nodes (host, NAS, or other gateways). The PPE 123 is responsible for effectively stalling the DME 122 through missing ESP credits when accelerator input data is not available due to external I/O bottlenecks. A similar stall is also required when accelerator output data (headed for remote host/storage) is piling up in gateway 52 memory 114 due to external I/O bottlenecks.

Data may be delivered with low latency by pre-fetching the data from GW memory 114 into a high speed gateway transfer memory 127 (e.g. SRAM) before the push to the accelerator 51 happens.

The memory consistency models as described above (BSP, SSP, Async etc.) could be combined with the push model. The accelerator 51 run-time would then have to make sure that external barriers will trigger DME 122 and PPE 123 data movement. In case of a push operation, the ESP credits will be decremented by one by the gateway 52.

In the above described streaming push model, the gateway 52 hides the accelerator memory access latency by using the gateway memory 114 as an on-chip streaming buffer. The overall benefits of the streaming engine 124 are that data movement can be overlapped with accelerator computation and pre-loaded into the memory 114 of the gateway 52 ahead of timed push operations.

The second streaming model is referred to as advanced accelerator pull. In this streaming model, a PPE 123 streams data from/to external storage into gateway memory 114. The accelerator 51 then pulls data from the Gateway 52 via a PCIe read operation(s). PPE 123 execution is based upon instructions from the executable image in code memory.

In this model, the PPE 123 is active and obtains the data and store it in memory 114 by issuing "pull requests" (i.e. read requests) from the external storage. The accelerator 51 will then pull data from the gateway at the pre-defined ESPs. The advanced accelerator pull model makes use of an executable image that contains pre/post-work instructions, without the DMOV push instructions. However, as will be discussed, the DME 122 may still execute instructions from the executable image to pre-load the data to a high speed gateway transfer memory (e.g. SRAM) from which data can be pulled at low latency by the accelerator 51.

In the Pull model, the host 63 synchronizes the accelerator 51 via the ESP credit mechanism so that it pulls valid data prepared in gateway memory 114 at the expected ESP. Also for this model, the PPE 123 is responsible for stalling the LSPM (via a credit mechanism) when accelerator 51 input data is not available due to external 10 bottlenecks. A similar stall may also be performed when accelerator 51 output data (headed for remote host/storage) is piling up in gateway memory 114 due to external 10 bottlenecks.

In the Pull model, some or all of the data to be transferred to the accelerator 51 at an upcoming ESP, is pre-loaded from the memory 114 into a gateway transfer memory (e.g. SRAM) prior to being pulled from the gateway transfer memory by the accelerator 51. This gateway transfer memory may be the same or different to the gateway transfer memory 127 shown in FIG. 8 and used to store data to be pushed to the accelerator 51.

Figure 16:
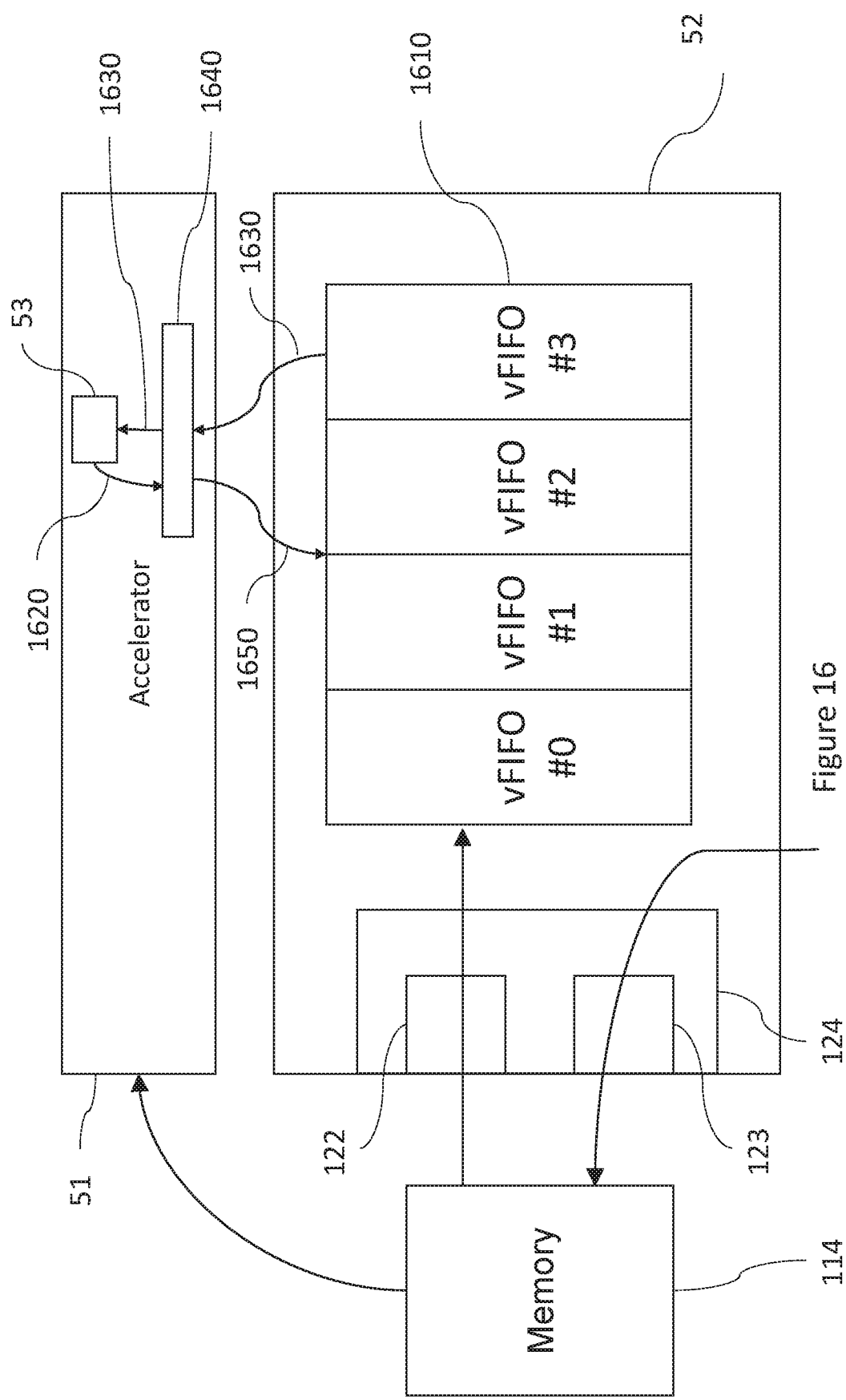
FIG. 16 is a schematic illustration of pre-loading data into a gateway transfer memory to be pulled by the accelerator.

Reference is made to FIG. 16, which illustrates the interaction between the gateway 52 and the accelerator 51 when the pull model is used. As shown, the gateway 52 comprises a gateway transfer memory 1610. The gateway transfer memory 1610 comprises a series of streaming buffers (shown as virtual FIFOs).

In some embodiments, to perform the pre-loading, at least one processor of the streaming engine 124 is configured to execute instructions of the executable image. In some embodiments, commands from the host 63 or accelerator 51 may cause the streaming engine to perform the pre-loading. The DME 122 is described as performing these operations in the following description of the pull model. However, it would be appreciated that in some embodiments, the operations for transferring to memory 1610 may be performed by hardware other the DME 122. The hardware that performs the pre-load operations may be a field programmable gate array (FPGA).

The DME 122 pre-loads data into the memory 1610 for a predefined number of upcoming ESPs. The accelerator 51 is configured to issue read requests to read the pre-loaded data directly from the memory 1610 in response to attaining an ESP. As shown in FIG. 16, the accelerator 51 may additionally pull data from the memory 114.

The data that is pulled from the gateway 52 may be organised into a plurality of accelerator input streams. An accelerator input stream is defined as a plurality of sets of data which are transferred to the accelerator memory in a fixed order. Each set of data can be any arbitrary size and a single stream can be any arbitrary number of sets of data. The sets of data are arranged into data buffers (not to be confused with the virtual FIFOs of memory 1610). In the pull model discussed here, these sets of data are delivered to the IPU by means of IPU issued reads. There is no ordering between any two input streams.

The memory 1610 is organised into a set of buffers (shown as virtual FIFOs). The buffers are preferably virtual data buffers, that are defined by a virtual address space that maps to a physical range of memory addresses (which may be contiguous or discontiguous) in the memory 1610. The virtual buffers are read from and written to at locations in the memory 1610 indicated using a read pointer and write pointer, respectfully. The pointers are held in a memory of the gateway (which may be the same as or separate to memory 1610). The virtual buffers are preferably virtual FIFOs, as shown in FIG. 16.

Each buffer corresponds to a different input stream. From the accelerator's perspective, a particular input stream is located at a particular location in memory 114. However, at least some of the data from that input stream may have been pre-loaded to a buffer of memory 1610. To pull data for that input stream from the gateway, the accelerator issues consecutive reads to addresses in memory 114. The read requests also include a number of bytes to be read for that input stream. When the gateway 52 receives the read request, logic of the gateway 52 determines on the basis of the address information located in the read request, the input stream from which the read request is reading from. If the buffer for this input stream is in the loaded state, then the data is read from that buffer instead of from memory 114. If the buffer is loading, then the data is read from that buffer once the loading is complete. If the buffer is not loaded or loading, then the data is read from the memory 114 at the address indicated in the request.

Since the accelerator 51 is issuing requests to read from specific memory addresses in memory 114, and a FIFO structure is being used in memory 1610, it may be guaranteed that the same data is returned as if the read were being done from memory 114. If two tiles are allowed to read from the same input stream, then that is not guaranteed, since one tile has no knowledge of where the other tile is in the reading process, and therefore may issue a request to read particular data from a particular address, when the other tile has already read this data from the FIFO. This problem is addressed by ensuring that the reads for a particular input stream are all issued by the same tile of the accelerator 51 so that the reads received at memory 1610 are in the appropriate order.

The gateway 52 is configured to store state for each input stream. The state stored for an input stream comprises a base address and a size. This indicates the address range of the memory 1610 which the accelerator uses to access the input stream. This is maintained in the streaming buffer/port logic.

The state stored for an input stream may comprise the number of bytes loaded into the buffer associated with the input stream.

The state stored for an input stream may comprise the load state of a buffer associated with the input stream. The load state is an indication as to whether or not the buffer has been pre-loaded with data to be transferred to the accelerator 51.

There are a few possible approaches to managing the set of buffers of an input stream. In some embodiments, the buffer address and size for each buffer is fixed. The accelerator is configured to issue reads repeatedly from the same buffer.

In some embodiments, the buffer address and size is determined by values stored in a control and status register (CSR) of the DME 122. The values stored in the CSR are determined prior to execution of the relevant pre-load instruction by the DME 122.

In some embodiments, the buffer address and size is indicated in the pre-load instruction executed by the DME 122. These indications are passed from the DME 122 to the gateway transfer memory 1610 as part of the pre-load process. The indications may, for example, be passed in headers of the data that is pre-loaded into memory 1610. This approach provides a high level of flexibility.

As noted, the gateway transfer memory 1610 is implemented as a set of buffers, where one buffer corresponds to one accelerator input stream. In the example, shown in FIG. 16, the memory 1610 is configured to support four such virtual FIFOs, however, another number of virtual FIFOs may be used. Four is chosen in this example, since it is the number of accelerator tiles needed in order to produce sufficient bandwidth of communications to saturate a single PCIE link.

Data loaded into the memory 1610 is loaded by an engine (e.g. the DME 122) running on the gateway 52. The engine may be implemented in hardware (e.g. in an FPGA) or in software (e.g. as code executing on a CPU).

Prior to an ESP, the DME 122 will load data into one of the virtual FIFOs in memory 1610 with the data for the next step. The state of the buffer is then set to indicate that the buffer is loaded with data. When the gateway 52 receives a read request from the accelerator 51, the data is transferred to the accelerator 51 in response to determining that the corresponding buffer is in the loaded state. The determination is made by FPGA logic on the gateway. If instead of determining that the buffer is in the loaded state, it is determined that loading is progress, the data will be transferred from the buffer when loading for the buffer is complete. If it is determined that the buffer is not loaded and it is not loading, the data will be read from memory 114.

In some cases, not all of the data may be pre-loaded into the memory 1610 prior to the upcoming ESP. In this case, when the ESP occurs and the accelerator 51 initiates the read of data of an input stream from the memory 1610, the DME 122 pre-loads any remaining data of the input stream that is to be transferred to the accelerator 51 during the exchange phase following the ESP. Therefore, the pre-loading of the remaining data of an input stream occurs at the same time as data of the input stream is being pulled from the memory

1610. The data is pulled from the memory fast enough to make space for the remaining data that is being pre-loaded during the exchange phase.

The memory 1610 is emptied by reads issued by the accelerator. Reads from the accelerator for a particular input stream arrive at the gateway 52 in address order. The reads start from the base address of the buffer and continue through the entire address range of the buffer.

When the gateway 52 receives a read it compares the address to the set of buffer address ranges in memory 114 for an input stream. If a read lies in the range specified for that input stream, then the read will be executed by transferring the next predefined number of bytes (as specified in the read request) from the buffer associated with the input stream of memory 1610 to the accelerator 51. The offset portion of the address may be ignored, with the data being read out of the buffer in a FIFO fashion.

Each of the buffers is associated with a read count indicating the total amount of data read from the buffer. As accelerator reads are processed for a particular input stream, this count increases. When the count reaches the size of the entire buffer, the state of the buffer is modified to indicate that the buffer is empty. The DME 122 is then informed that the reading of data from the buffer is complete.

The example gateway transfer memory 1610 shown in FIG. 16 is configured to store data for four input streams. If more there are more than four input streams of data transferred to the accelerator, then the accelerator pulls the data for those additional streams from the memory 114 instead of from gateway transfer memory 1610. If an input stream is determined to be too large to store the data for that stream in the gateway transfer memory 1610, then the accelerator pulls data for that stream from the memory 114 instead.

In the case in which a stream is read from memory 114 instead of memory 1610 by the accelerator 51, then the DME 122 is not loaded with instructions related to this stream and the buffer would not be allocated in the memory 1610 for this stream. The reads related to this stream would then be directly by the gateway 52 to the memory 114.

As discussed in relation to FIG. 4, when one or more tiles 53 of the accelerator 51 require to exchange data with the gateway, they transmit synchronisation requests 55 which are aggregated and passed via sync logic 54 to the gateway 52. The gateway 52 in turn transmits a synchronisation acknowledgement to the sync logic 54, which returns synchronisation acknowledgments to the tiles 53 which sent the synchronisation requests. FIG. 16 illustrates the messaging that occurs following this sync request/ack scheme when a tile 53 pulls data from memory 1610 in the gateway.

Following receipt of a synchronisation acknowledgment, as shown in FIG. 16, a tile 53 transmits one or more control packets 1620. The one or more control packets may be transmitted by the tile in response to the execution of a READ instruction of supervisor thread of the tile 53. The control packets are transmitted to read request logic 1640 of the accelerator 51. The read request logic 1640 may be a PCIe controller. In response to the one or more control packets, the read request logic 1640 is configured to generate a read request 1650 that is sent to the memory 1610 of the gateway 52. The read request 1650 is a DMA read request. The DMA read request 1650 may be a PCIe read. In response to the read request 1650, the data 1630 is read by logic of the memory 1610 and sent to the read request logic. The read request logic transfers the data 1630 to the tile 53 that issued the READ instruction. Additionally, these operations may be carried out to pull data from the memory 114.

Figure 17:
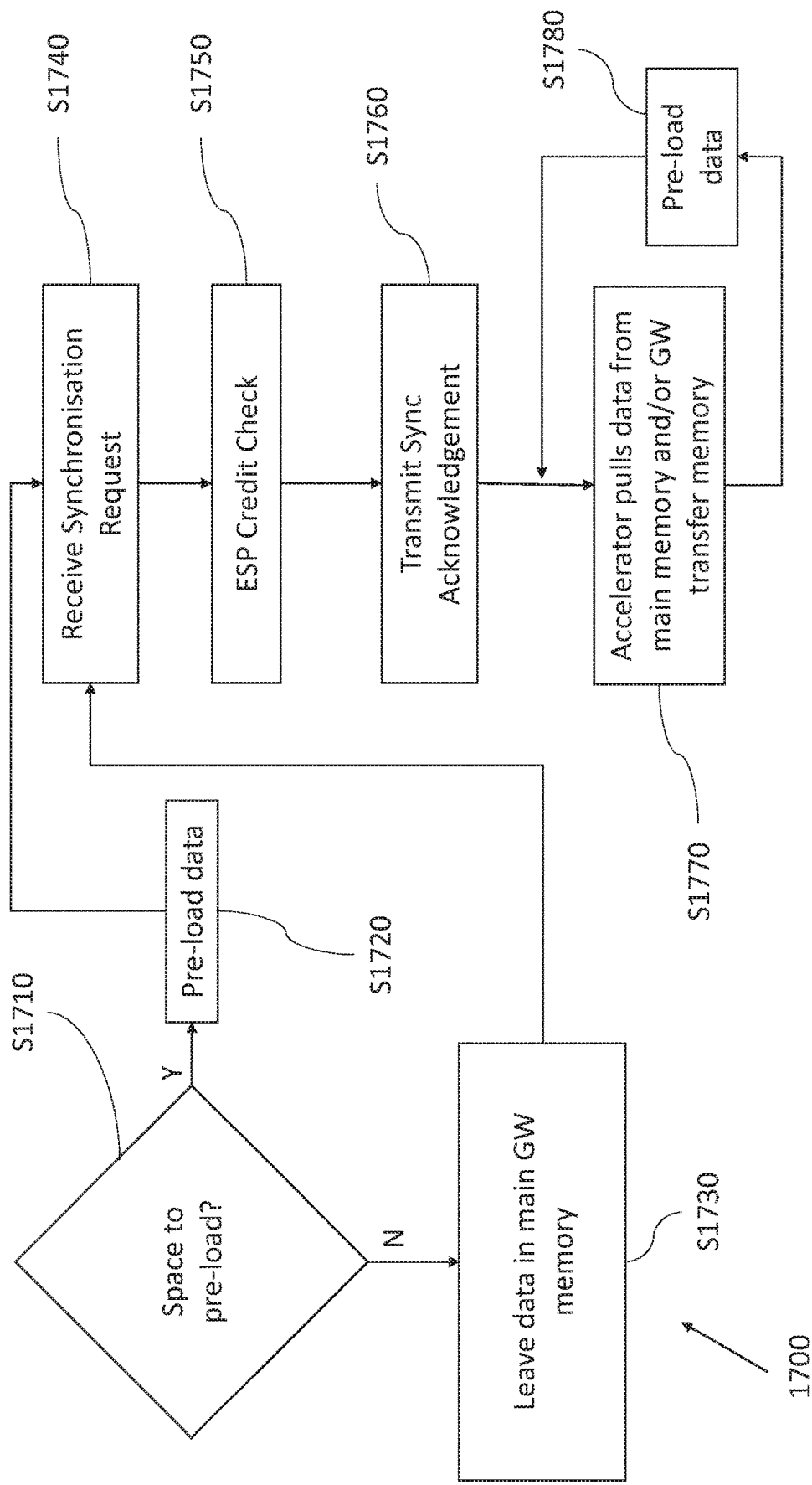
FIG. 17 illustrates a method of streaming data to the accelerator through the gateway where the gateway operates according to a pull model.

Reference is made to FIG. 17, which illustrates an example of a method 1700 according to embodiments of the application. The method 1700 shows steps performed when the gateway 52 operates according to the pull model. The steps take place after the data has been transferred from external storage to gateway memory 114.

At S1710, the DME 122 determines whether or not there is space in the gateway transfer memory 1610 for pre-loading a given stream of data into the memory 1610. There is determined to be space if the maximum number of streams (i.e. four in the example shown in FIG. 16) that the memory 1610 can store data for would not be exceeded and the stream of data does not exceed a maximum permissible size.

If there is space available, at S1720, data of the stream is pre-loaded from the memory 114 into the memory 1610. The data for a stream that is pre-loaded may comprise data to be transferred to the accelerator 51 during a plurality of upcoming exchange phases.

If there is not sufficient space available, at S1730, data of the stream remains in main gateway memory 114, without being pre-loaded.

At S1740, a synchronisation request is received from the accelerator 51 at the gateway 52.

At S1750, a check of the ESP credits stored in the gateway LSBM 118 is made. Assuming that there is a non-zero number of credits available for the relevant accelerator and sync group, the method 1700 proceeds to S1760.

At S1760, the gateway 51 transmits a sync acknowledgment to the accelerator 51.

At S1770, in response to receiving the sync acknowledgment, the accelerator 51 issues a read request to pull the data from the gateway 52. The accelerator 51 reads data from at least one of the main memory 114 and the gateway transfer memory 1610. The accelerator 51 reads from the memory 1610, data of streams that were pre-loaded into the memory 1610. The accelerator 51 reads from the memory 114, data of streams that weren't pre-loaded into the memory 1610.

At S1780, whilst the accelerator is reading data from the memory 1610, the DME 122 continues to pre-load data into the memory 1610 to be read by the accelerator 51. The accelerator 51 may read from a buffer of a stream, with the DME 122 overwriting data that has been read the buffer with additional data of the stream from the memory 114. The data that is pre-loaded during the reading by the accelerator 51 is the remaining data that is to be transferred to the accelerator 51 during the current exchange phase.

The pull model using the pre-loading has the advantage that the gateway 52 is able to prepare data in the high speed transfer memory 1610 in advance of an upcoming pre-compiled exchange synchronisation point, such that the data is available to be pulled by the accelerator 51 in a more timely fashion. Therefore, data may be pulled from the gateway 52 at a lower latency. Additionally, pre-loading data to the high speed transfer memory 1610 improves the bandwidth of data transfer.

The third streaming model is referred to as simple accelerator pull. In this streaming model, the host 63 streams data in to/out of gateway memory 114. The accelerator 51 pulls data from the gateway 52 via PCIe read operation(s). The gateway 52 in this case does not execute PPE instructions but is instead a slave of a predefined I/O scheme between host 63 or NAS and the gateway 52.

In this model, the gateway memory 114 serves as a memory region, wherein the host 63 has control over its contents. There are no instructions executed in the gateway 52 for loading data in memory 114. The PPE 123 is not executing instructions, but is still functioning as a proxy to update ESP credits and instruct DME for pre-loading operations given by the host 63 for the accelerator 51 to discover when data is available.

The gateway memory 114 allocated for the streaming of data is maintained by host 63 as if it was PCIe attached memory, with the only difference that RDMA is used instead of PCIe.

In the simple pull model, data is also pre-loaded into the gateway transfer memory 1610 as described above for the advanced pull model with reference to FIGS. 16 and 17. In the simple pull model, the PPE 123 will receive commands from the host 63 and/or accelerator 51 instructing the pre-loading of data into the memory 1610. In response to the received commands, the PPE 123 causes the DME 122 to pre-load data into memory 1610. The PPE 123, therefore, acts as proxy for pre-load commands coming from the host 63 and/or accelerator 51.

Furthermore, the simple pull model is distinct from the advanced accelerator pull model in that, in the simple pull model, the PPE 123 does not execute instructions to retrieve data from the host or other external storage.

Execution of the data streaming operations in the gateway 52 is performed by the streaming engine 124 that, depending on the operational model, will run either: all (in the advanced push model) of the gateway 52 instruction set, a subset (in the advanced pull model) of the gateway 52 instruction set, or no instructions (in the simply pull model) of the gateway 52 instruction set. In the simple pull model, the gateway 52 performs the streaming operations in response to commands from the host 63 or accelerator 51.

When the gateway 52 executes all or some of the instruction set, the instructions are loaded into gateway memory 114 as an executable image. Generation of executable images for the streaming engine 124 will be integrated with a specific accelerator/gateway compiler environment in which the compiler produces related code for running on the accelerator 51 and gateway 52.

The streaming engine 124 can be seen to comprise a set of hardware and software components that work together to ensure that the accelerators are supplied with data I/O in a performance optimal way. Depending on the operational model of the gateway 52 or streaming engine 124, the streaming engine 124 may push data in a "just in time" fashion, i.e. at planned data exchange phases representing a conditional entry-point to the next accelerator compute step, or may make data available in gateway memory 114 and/or memory 1610 for the accelerator 51 to pull in the same "just in time" fashion. Preparing relevant data in gateway memory 114 prior to the data exchange phase is done via pre-scheduled data streaming instructions executed by the gateway streaming engine 124. The push model can additionally pre-fetch data from the gateway memory 114 into gateway transfer memory 127 (e.g. SRAM) for reduced latency during data exchange phases. The concept of bringing data into gateway memory 114 "just in time" is useful for cases where the gateway memory 114 is not large enough for holding all the data needed by accelerator computation algorithms.

The PPE engine uses the WD for navigating to the set of pre-work (PRW) and post-work (POW) instructions that relate to a given ESP. The terms "pre" and "post" indicate whether the operation happens before or after a WD's data exchange phase with an accelerator or other target. The PRW instruction has as its main responsibility to bring data into gateway memory 114 (e.g. from host 63, remote storage 151, or from a further gateway 128) from the host 63 or as a preparation for one or more DMOV push instructions.

"Post-work" has, as its main responsibility, to move data out of GW memory 114 (e.g. to host 63 or remote storage 151). The PPE instructions are located in the PPE specific image section.

The DME 122 is active for transferring data from the gateway to the accelerator in the "gateway push" operational model as described above, and also active in both pull models for pre-loading the memory 1610 VFIFOs if this pre-loading optimization is enabled. In the push model, the DME 122 uses the WD for navigating to the set of data mover (DMOV) instructions that relate to a given ESP. The DMOV instructions push data towards the accelerator. The WD and DME related instructions are located in a DME specific image section. The DME instructions sourced from the image in physical DDR memory of the gateway 52 are converted into DMA descriptor lists that are executed by the DME's DMA machine as part of the DMOV instructions. The DME 122 will prepare DMA descriptors for several planned data exchanges that are controlled by stop criteria that allows full control of the size of each batched data exchange with the accelerator 51.

The DME 122 uses a high level programmable multi-channel DMA machine designed for streaming data in and out of accelerator memory. The DME 122 supports streaming of data to a single accelerator 51 over one or two high speed data buses using load-distribution. If the accelerator 51 is agnostic to data loading sequences, the load-distribution is achieved by local DME decisions and is not controlled by information found in the executable image.

A WD is considered "ready for execution" (or fully prepared) when all pre-work related instructions for the WD are completed as well as all the post-work instructions that have an end-criteria for this WD. Only then, will an ESP credit for the WD be added to the set of ESP credits in the LSBM 118.

A WD is considered "completed" when the "end of exchange" criteria is met. This is when all deployment operations (DMOV) are completed and all output data received from the accelerator 51 is determined to be equal to the expected output size. The expected output size is indicated in the WD.

The gateway 52 needs a way for the PPE 123 to signal to the DME 122 when a WD is fully prepared, and this is done by adding an ESP credit to the DME 122 (one could call this a WD credit or an exchange credit as well). A PPE 123 engine running several WDs ahead of the DME 122 is allowed to add several ESP credits. This prevents the accelerators from having to wait for PPE work to complete at each ESP. Optimally, at each ESP transition, ESP credits should be already available, such that the barrier can be passed without stalling the accelerator.

One credit represents the ability of the DME 122 to transfer all data for the first data exchange with the accelerator 52. The PPE 123 increments the ESP credits by adding a new credit every time the PPE completes data pre-fetch (i.e. completes the pre-work) for the next sequential ESP. If the PPE 123 pre-loading of data from external nodes is not completed in time for the ESP, the DME 122 will find its ESP credits to be zero, and the execution stalls until the PPE 123 increments the credit count. Stalling one accelerator 51 due to missing data, will effectively stall the full set of cooperating accelerators running synchronously (i.e. sharing the same barrier sync network).

Each DMOV instruction is executed by the DME 122 in hardware as a DMA operation. These DMOV instructions are executed when the gateway push model is applied. The DMOV instructions move data residing in the referenced data buffer (in gateway memory 114) to its destination. That would normally be an accelerator 51 memory location, but other destinations are supported as well.

Since the streaming of data is batched per ESP, the DME 122 will stop transferring data when the required number of buffers from gateway memory 114 are transferred. The number of bytes exchanged per ESP batch is indicated in the WD by parameter fields for both 1) streaming engine 124 push operations and for 2) writes into gateway memory 114. It is expected that the number of bytes to push is equal to number of bytes in all buffers scheduled for the same WD. If there is a mismatch, this will lead to an exception situation.

The DME 122 is configured to use physical memory addresses for retrieving data from memory 114 without the support of a memory management unit (MMU).

For accelerators 51 with dual bus attachments to the gateway 52, there is no information in the DMOV to indicate which bus the data should be directed to. The DME 122 controls the selection of the bus, so as to balance traffic transmitted over the two busses.

The DMOV may be linked to a pre-initialized data buffer in gateway memory 114, and thus, in this case, there is no need for a related prework instruction to fill the buffer.

Alternatively, a single DMOV (with a single memory data buffer in memory 114) may be linked to a set of pre-work instructions for data gather operations. Each such referenced pre-work instruction will bring data from a specific source and location into the same data buffer at different offsets, thus forming a gather operation. The pre-work instruction is scheduled in the same WD as the DMOV it prepares data for. A single pre-work operation may provide data to be pushed by several DMOV operations.

The pre/post-work engine instruction sets are executed by the pre/post-work engine implemented in software. There is a need to perform "pre-work" relative to a given ESP and there is a need to perform "post-work" relative to a given ESP.

The autonomous execution of instructions by the PPE may be implemented in the "gateway push" and "Advanced accelerator pull" operational models. PPE 123 uses RDMA, NFS, NVMoF, iSCSI or any other supported file access protocol for moving data to/from gateway external memory/storage 114. The execution of the streaming operation is controlled directly by the PPE instructions found in the "post/pre-work sections" of the executable image. The PPE 123 can be viewed as a software based streaming processor that takes instructions from the image file and converts these to local/remote storage operations. These transfers will be between gateway memory 114 and external memory/storage The PPE 123 executes in parallel with the DME 122, and since the DME 122 depends on the results of the PPE 123, the PPE 123 has to have its work done before the Data Mover operation performed by the DME 122 is scheduled. This is taken care of in the executable image by grouping together, using the work descriptors, DME 122 and PPE 123 instructions that belong to the same data exchange synchronisation point.

Each PRW instruction retrieves data from external storage and stores the data into a pre-compiled data buffer (in gateway memory 114) that the PRW instruction points to. PRW instructions come in different variants depending on the source of the data. These variants require different parameter sets detailing the external 10 operation. These details are looked up in referenced 10 templates set up by the control plane via the gateway control channel prior to execution start.

The compiler pre-assigns regions of memory 114 for buffers that are referenced by PRW instructions. These buffers are used for storing data retrieved from external storage when the PRW instructions are executed.

The set of ESP credits is incremented by the PPE 123 for each WD when all pre-work related instructions scheduled for this WD are completed, and only if all pre-work related instructions scheduled for all previous WDs are also completed, and only if all post-work related instructions that have an end-criteria on this WD are also completed.

The PRW instructions come in different variants depending on the source/destination of the data.

The execution order of the PRW instructions is the order in which they are expressed in the executable image. However, smaller batches of the PRW instructions will be run in parallel to optimize I/O performance from remote locations. One or more PRW instruction from one or more WDs are executed in advance of the WD when the data is needed. This is required to fill the data "pipeline" to be consumed by the WD. The gateway 52 has a parallel execution engine for pre-work, allowing it to do this pre-work filling the data "pipeline".

The completion order for PRW instructions may not be the same as the order of the instructions in the executable image. Such out of order completion is, however, not a problem since the data ends up in gateway memory 114 with no sequence requirements. When it comes to the deployment sequence of this data to the accelerator 51, the DME 122 ensures that the instruction order is that expressed by the executable image.

A PRW instruction always has an end criteria. The PRW instruction is scheduled by the GW 52 to be completed in due time before a given WD at which the supplied data is needed by the accelerator 51. The end criteria is represented by the WD in which the PRW instruction is contained. In cases where the data cannot be supplied in time for the WD, the data exchange phase will be delayed until the data is available. This effectively stalls the accelerator 51 compute phase until data is available. The occurrence of such stalls are counted, and the feedback from such monitoring will help optimize the gateway and/or the compiler.

The POW instruction does "post-work", related to a given ESP. Its main function is to move data from gateway memory 114 to an external storage (e.g. host 63 or remote storage 151). The data stored in the gateway memory 114 being data received from the accelerator 51. The POW instruction comes in different variants depending on the destination of the data. These variants would need different parameter sets detailing the external 10 operation.

It is up to the compiler to link a POW instruction to a data buffer in the memory 114 on which to operate.

For post-work, the instructions may be executed out of order since the results are not communicated to the accelerator 51, but instead are stored in host 63, remote storage 151 storage or gateway memory 114, where there is no implied semantics related to the write order for pure data.

A POW instruction always has a mandatory start criteria, which represents the earliest point in time at which the instruction may be executed. It could be executed later, but not earlier, than the mandatory start point. Thus, the POW instruction is triggered for start at a given WD. This trigger WD is represented as the WD in which the POW instruction is contained. At the completion of the previous WD, the accelerator 51 must have finished writing to the POW instruction's buffer.

There are different types of POW instruction. The first type of POW instruction involves moving data from local GW memory 114 to the remote storage 151. This can be configured by the host 63 by instructions (e.g. descriptor 119) sent via the control channel. The second type of POW instruction involves the moving of data from local gateway memory 114 to host 63. This can also be configured by the host 63 by instructions sent via the control channel. The third type of POW instruction involves the manipulation of data stored in the gateway memory 114.

A POW instruction may also have an optional end criteria represented by a parameter of the POW instruction. This may have the following uses. Firstly, this optional end criteria may enable the POW instructions to prepare data for a specific WD, much in the same way as the pre-work instruction has its end criteria implicitly given by the WD it is part of. Secondly, in cases where the gateway compiler is reusing "output" buffers used by the POW instructions for export to external nodes, it is important to protect buffers still holding unsaved data from being overwritten by the accelerator 51. In this case, the program can protect buffers by placing so-called Named Execution Barrier (NEB) instructions in the DME instruction stream as stop points until all POWs have completed flushing buffers, thus freeing buffers for reuse and more accelerator 51 output operations. These NEB instructions are described later.

If a POW instruction cannot meet its end criteria, the PPE 123 will pause the local DME 122 and consequently all accelerators will be synced up at the same sync level. The PPE 123 parses a POW instruction and finds the end criteria. There may be several POW instructions with the same stop criteria or with different or with no stop criteria.

As mentioned above, the compiler may place stop/pass "execution barriers" at given execution points in time. The (NEB) instruction refers to a named "execution barrier" completed (NEBC) object that collects the number of completion reports from objects that are instructed to signal to the NEBC when completed (e.g. POW instructions).

The NEB instruction always belong to a WD, i.e. it is enveloped by the WD. It can be inserted in all three instruction streams (DME, PPE_PRE and PPE_POST).

The "stop" state represents a stop signal to the DME/PPE not to proceed with execution of the instructions in the WD. The other possible state is "pass", which allows the DME/PPE to proceed with execution of their instructions in the WD, thus passing the NEB instruction. The state changes from "stop" to "pass" when all the instructions linked to this end criteria have reported completion by incrementing a "completions_seen" counter in the NEBC object.

The concept of an "execution barrier" is not to be confused with the ESP synchronisation primitive that may be used to control barriers in the Bulk Synchronous Parallel (BSP) memory consistency model. In some examples, the NEB instruction insertion point is correlated with a specific ESP for the accelerator program, but there is no such direct requirement. The NEB can be used a generic stop point for all kinds of synchronisations.

A first example of the use of the NEB instruction may be given, where the NEB instruction(s) is inserted into the WD at the start of the DME instruction stream. The NEB represents a pre-condition for executing the DME instructions. The pre-condition is used for controlling the flushing of accelerator output buffers (or ring-buffer fill thresholds) to external nodes (e.g. host 63 or remote storage 151) via POW instructions. The set of ESP credits is not incremented until both: the NEB pre-conditions are met and the PRW instructions are completed. This means that a WD can be cached by the DME, but not executed further if there are no ESP credits available. When the PPE 122 has completed execution of the PRW instructions, it will first check if all NEB instructions in the WD are in "pass" state. If they are, and all other preconditions for giving a credit is met, the credit will be incremented. The DME execution engine will raise an exception if it sees that the NEB instruction is in stop state. This exception indicates that the PPE has wrongly added a credit despite a "stop" state, or that there is some raise condition in the DME/PPE implementation.

A second example of the use of the NEB instruction may be given, where the NEB instruction is inserted into the post-work instruction stream for flow-controlling data export from the gateway 52 to the host 63. In this case, the host 63 controls the state of the NEBC. In this model, the host controls whether or not the PPE 123 is allowed to execute POW instructions to transfer data to the host 63, thus passing a NEB instruction. This is controlled by the host providing updates to the "linked" NEBC object's state, to set the state to a "pass" state. The host is only allowed to set the "pass" state when all the linked POW instructions are completed.

An end criteria is always placed on the "next occurrence" of a NEB in the instruction stream. The "next occurrence" is to be understood as relative to the execution of the POW.

A third example of the use of the NEB instruction may be given, where the NEB instruction is inserted into the pre-work instruction stream for flow-controlling data import feeding from the host 63. In this case, the host 63 is controlling the state of the NEBC. In this model, the host controls whether or not the PPE 123 is allowed to execute PRW instructions to transfer data to the memory 114 from the host 63 or remote storage 151, thus passing a NEB instruction. This is controlled by the host 63 providing updates to the "linked" NEBC object's state, to set the state to a "pass" state.

The NEBC object is always initialized in a stop state at the start of program execution. The same reinitialization is performed when starting on the next instruction after the NEB. When setting the state to "stop", the "completions_seen" is set to zero as well.

In the DME case, the DME 122 itself may not have come so far in its execution that the NEB is seen yet, and if all linked instructions are completed by the time the NEB instruction is seen, the "completions_seen" is identical to "expected_completions" and the state will be observed as "pass", and thus execution continues with no waiting. Otherwise, the DME 122 waits until all linked instructions are completed.

There is one streaming engine 124 per accelerator 51 in a gateway 52, where each streaming engine 124 may run in the various modes that has been described.

There are several streaming engine instances made available across the fabric. There is one streaming engine 124 per accelerator 51, where each streaming engine 124 is executing an image. Each streaming engine 124 feeds data to an accelerator 51 via one or more high speed buses (e.g. PCIe Gen4).

There are a plurality of different possible streaming flows that may be implemented using the streaming engine 124. For example, in a first possible streaming flow, the gateway 52 may enable the streaming of data to the accelerator 51. This streaming of data may be initiated by a further accelerator which is configured to provide the data. Alternatively, the streaming of data may be initiated by a DME 122 of the gateway 52, which executes instructions to transfer data from memory 114 to the accelerator 51. Such data may have been received at the gateway 52 from the host 63 or remote storage 151.

In a second possible streaming flow, the gateway 52 may enable the streaming of data to a remote accelerator. The accelerator 51 may provide packets to the gateway 52 having an address identifying the remote accelerator in a global address space. The gateway 52 is configured to use this address to forward the data packet to a further gateway 128 for deliver to the remote accelerator.

In a third possible streaming flow, the gateway 52 may enable the streaming of data into the local gateway memory 114. This may be the result of a local gateway offload. The transfer of data to the memory 114 may be from the accelerator 51 at an ESP. The transfer of data to the memory 114 may be the result of a local RDMA or host RDMA. The data may be transferred to the memory 114 from external storage, such as the host 63, the NAS 151 or from the further gateway 128. The transfer of data into memory 114 from such external storage is part of the pre-work carried out by the PPE 123.

In a fourth possible streaming flow, the gateway 52 may enable the streaming of data into the memory of a further gateway 128. The data transfer may be initiated by the gateway 52 itself. The data transfer may be initiated by the accelerator 51, which provides packets to the gateway 52 having an address identifying the further gateway 128 in the global address space. The transfer of data to further gateway 128 may be the result of pre-work instructions executed by the further gateway 128 to pull the data from the gateway memory 114.

In a fifth possible streaming flow, the gateway 52 may enable the streaming of data to the remote storage 151. The data is transferred from gateway memory 114 to the remote storage 151 by one or more of: RDMA, the Network File System (NFS) protocol, Non-Volatile Memory over Fabrics (NVMoF), and the internet Small Computer System Interface (iSCSI) protocol. The data transfer is initiated by the gateway. This transfer to the remote storage 151 may result from the execution of post-work instructions by the PPE 123.

In a sixth possible streaming flow, the gateway 52 may enable the streaming of data to the host 63. The data is transferred from the gateway memory 114 to either pinned host memory or RDMA accessible host memory. This transfer to the host 63 may result from the execution of post-work instructions by the PPE 123.

In a seventh possible streaming flow, the gateway 52 may enable the streaming of data from one or more remote NFS servers. The data transfer from these servers may occur in response to a request transmitted by the gateway 52.

As mentioned earlier, parallel programming models for AI and HPC usually follows a 3-phase iterative execution model: Compute, Barrier, and Exchange (Data transfer, Collective and Broadcast). The implications are that accelerators usually requires data transfer to/from accelerator at pre-compiled data exchange synchronization points and/or collectives executed upon accelerator request. The request represents a sync point where the accelerator 51 has finished processing the available data, and now requires to export some data and requires to import some data. The gateway 52 will schedule its data movements immediately after an accelerator exchange request that is acknowledged.

The gateway streaming engine 124 optimizes data movement, thus the data buffer "object" play an important role in holding the data. By passing pointers to buffers (in the gateway memory 114) during execution, the system implements zero copy semantics during operation. The data buffers are either pre-initialized in the loaded image, or are filled by the PPE 123. In both cases, a reference to the buffer in memory 114 may be used by the DME 122 for transferring data to the accelerator 51 at the ESP.

There may be cases where there is no pre-work required for preparing accelerator data, such as when data is already prepared and embedded in the loaded executable image. In such cases, the PPE 123 will also be responsible for posting ESP credits to the DME 122.

There may also be ESPs where there are no data movement towards the accelerator 51 (e.g. only accelerator output data), and in such cases the PPE 123 will also be responsible for posting ESP credits to the DME 122. In this case, the PPE 123 will, in response to determining that there is no data movement towards the accelerator 51 during an upcoming ESP, increment the ESP credits for the upcoming ESP.

It is always the PPE 123 that adds ESP credits.

For the pre-work instructions only: If a WD's pre-work is completed ahead of time compared to pre work in earlier issued WDs, the design will need to queue the pre-work completion info and increase the number of ESP credits after the handling of all the previous WDs when they have completed.

For accelerator data import (i.e. data transfer from gateway 52 to accelerator 51), the WD describes how many bytes that are to be transferred in both directions (i.e. between accelerator 51 and gateway 52) during an exchange. The accelerator 51 in the push model has, as a result of the compilation, the same information and thus knows when all expected data is received for this exchange, and starts the compute phase immediately after all data is received. In the pull model, the accelerator 51 controls when the exchange is over by stopping the reading of the data from the gateway 52.

For accelerator data export: The accelerator 51 knows from its compiled code how much data to send to gateway 52 for a given ESP, and the gateway 52 knows how much to expect by reading this information from the WD.

When the gateway 52 has received the exact number of bytes expected from the accelerator 51, it will move on to execute the next WD. In executing the next WD, the gateway 52 may perform post-work comprising local operation on data in the gateway memory 114. Additionally or alternatively, the gateway 52 may perform post-work to transfer the data to its final destination. Alternatively, the gateway 52 may perform no post-work. For example, it may let the data stay in gateway memory 114, allowing the memory 114 to function as an off-accelerator data cache for later read back. In executing the next WD, the gateway 52 may perform pre-work needed to be completed prior to the next ESP. Additionally or alternatively, the gateway 52 may perform DMOV instructions to be executed after the next ESP. If there are ESP credits available, the DMOV instructions are used for pre-loading data to the gateway transfer memory 127 in advance of the ESP. If there are no ESP credits, the DME 122 awaits ESP credits, and when ESP credits are available performs pre-loading.

If the PPE instructions—i.e. both post-work (POW) and pre-work (PRW) instructions—are targeting remote storage 114 for static data that is known to be already available on a storage node, then there is no need for data synchronization with that node as long as the gateway supports the storage protocol for direct access to the data.

The host 63 memory is small relative to the amount of data which it is transferring to the gateway 52 and accelerator 51, so the host 63 needs to bring the data into its memory "piece by piece". Due to this "piece by piece" nature, there needs to be a synchronization mechanism between the gateway 52 and host 63 controlling when data is available for gateway 52 initiated RDMA reads (gateway data import). Likewise, for the gateway 52 initiated RDMA writes (i.e. gateway data export), a similar synchronization is needed. The challenge for the total AI appliance is to have data streaming continuously in and out of the gateway/accelerator, so such a synchronization mechanism is vital to AI performance. The system needs a well-designed solution with minimal overhead for this to scale to large AI fabrics.

The streaming engine 123 has several modes of operation for moving data between gateway and host.

In a first mode of operation, the streaming engine 124 runs as a slave of the host 63 under commands from the host 63. In a second mode of operation, the streaming engine 124 executes based on pre-compiled instructions stored in its code memory.

In the first mode of operation, the streaming engine 124 acts as a slave of the host 63 and performs the operations of storing data in memory 114, and retrieving said data from memory 114 for delivery to the accelerator 51, under the control of the host 63.

In the second mode of operation, the streaming engine 124 prefetches data from the host 63 or remote storage 151 in dependence upon a pre-complied executable file derived from the compiler that is used to generate the code of a complete system composed of accelerators and gateways. Since the compiler is used to generate code for the gateway 52, which fetches the data to be delivered to the accelerator 51, and the accelerator 51, which processes the data, the host 63, the gateway 52 and the accelerator 51 are able to act in sync with one another. The gateway 52 file anticipates the data needed by the accelerator 51, prepares that data for deployment in advance of the associated compute phase by storing it in memory 114. The gateway 52 prepares the data for transfer to the accelerator 51 at the appropriate time in dependence upon the code generated by the compiler. The DME 122 transfers it to the accelerator 51 in a latency optimized manner at precisely the right time for the accelerator 51, in response to a sync request 56 from the accelerator 51. The DME 122 sits close to the accelerator 51 for latency optimised delivery.

In a third mode of operation, the accelerator 51 informs the gateway 52 in advance of the next N barriers what data to prepare for transfer to the accelerator 51 from memory 114 for the corresponding N barriers. In this mode of operation, the accelerator compiler can foresee future I/O operations and thus schedule such commands to the gateway 52 so that the gateway 52 has adequate time for delivery of the data.

A compiler produces a set of computer code instructions that are executed by the accelerator 51. These sets of computer code instructions may be referred to as executable images. In some embodiments (e.g. in the second mode of operation described above), the compiler may also produce a related set of streaming engine data movement/processing commands that are fulfilled by the gateway 52.

The compiler produces one executable image per streaming engine. The executable image references a flat contiguous XPU Virtual Address (XVA) space as seen from an accelerator. This XVA space covers internal accelerator memory as well as "Streaming Engine sandbox" memory mapped via memory management unit (MMU) mappings into the same XVA space. The execution image also references a "host sandbox" virtual address (HSVA) space that covers the required host memory accessible to the streaming engine 122. This HSVA space is relevant in the GW operational model: "GW push model" and the "Advanced XPU pull model".

Within these two virtual address spaces (XVA and HSVA), the compiler is responsible for defining the existence of buffer resources and addressable elements needed by the streaming engine 122, accelerator 51 and host 63.

The compiler is also responsible for defining reuse of gateway buffers in memory 114 between iterations and sequences of WDs as it sees fit and when needed due to limited gateway memory 114. Buffer reuse optimizations are not required as long as there is enough memory assigned to the gateway 52.

For a gateway 52 configured to communicate with two or more accelerators, it is currently not possible for one accelerator to access the streaming engine sandbox assigned to other accelerators. This is enforced by MMU setup inside each accelerator or accelerator support chip. The XVA space of the different accelerators doesn't overlap in physical gateway memory. Streaming engines run in their separate "XPU sandboxes" and all access is runtime enforced to stay within its own sandbox. Due to the accelerator's on-board MMU, it may be possible to construct a common memory region that is shared between these streaming engines.

Referring again to the transfer of data to the accelerator illustrated in FIG. 7, in some examples, the gateway 52 receives the data from the host 63 or remote storage 151 and stores it in memory 114 before making it available in a fast gateway transfer memory 127 for transfer to the accelerator 51. The DME 122 pre-loads the fast gateway transfer memory 127 from memory 114 in dependence upon the DME instructions. The contents of the gateway transfer memory 127 are transferred to the accelerator 51 in response to the completion of a handshake request. This pre-loading into the gateway transfer memory 127 is used in the push model described above. Similarly, in the pull model, pre-loading into the gateway transfer memory 1610 is carried out. In some examples, the pre-loading of the either or both of the gateway transfer memories 127/1610 is carried out only if the number of ESP credits is greater than zero.

Figure 14:
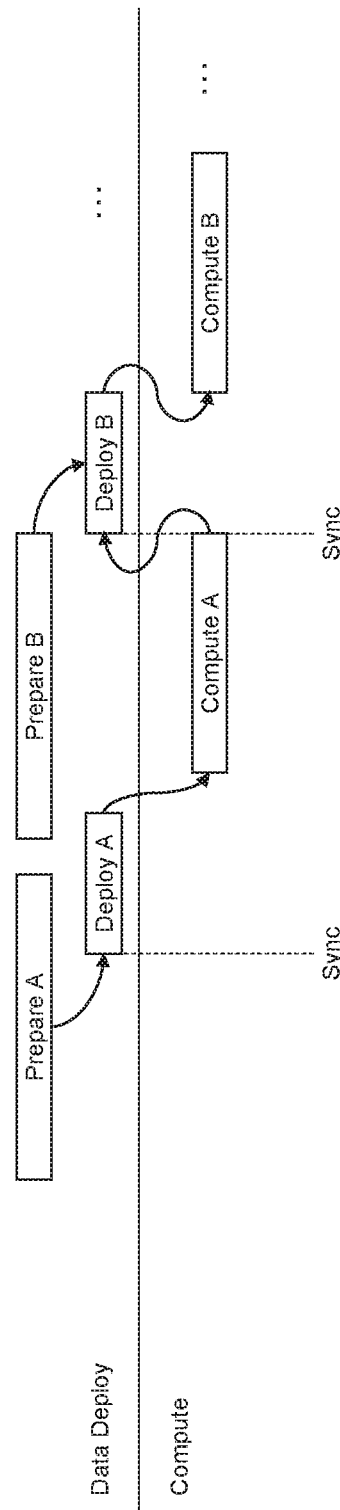
FIG. 14 illustrates an example method of deploying and computing data.

Reference is made to FIG. 14, which illustrates how the preparation of data, its exchange between the gateway 52 and accelerator 51 and the processing of this data are related. The prepare and deploy stages are performed by the gateway 52, whereas the compute stages are performed by the accelerator 51. Data is prepared by the gateway 52 in advance of the associated compute phase. The data is stored as closely as possible to the accelerator 51. When the accelerator 51 is able to accept the data and indicates as such by sending a sync request 56 to the gateway 52, the gateway 52 deploys the data using the full capacity of the port/s linked to the accelerator 51 with no external dependencies. As the deployed data is being processed by the accelerator 51, the gateway 52 prepares the next phase of data to be deployed. The engine scales its operation across all available gateway data centre ports.

The gateway 52 is able to receive data from the host 63 or remote storage 151 and perform storage and augmentation of data that is needed by additional gateways. This data may be transferred to the additional gateways. The data transferred to the additional gateways may then be provided to accelerators associated with those additional gateways. This may be useful for avoiding bottlenecks. For example, instead of each gateway independently retrieving data from a remote storage 151, and hence causing a bottleneck at the access to the remote storage 151, one gateway 52 may retrieve data from the remote storage 151 and provide said data to a plurality of gateways. This may address the problem of a bottleneck when accessing the remote storage 151.

When the gateway 52 receives the data from the host 63 or remote storage 151, prior to providing this data to the accelerator 51, the gateway 52 processes the data. This processing may be carried out by the streaming engine 124. The processing may comprise one or more of: data augmentation (noise injection), decompression, decoding (e.g. of image and video data, such as JPEG format images and H264 format video). This processing is not carried out in the simple accelerator pull model discussed above.

To keep memory usage minimal, data is compressed when it is loaded into the gateway 52 and decompressed at the latest possible time before delivery to the accelerator 51. The gateway 52 may provide a latency optimized hardware decompression engine (not shown) for certain types of compression. Additionally, decompression can be implemented in gateway software to provide extended support for any arbitrary compression algorithm.

By performing data augmentation (e.g. noise injection) in the gateway 52, the original data can be stored once, in its original format, and fetched once. That data can then be replicated to multiple accelerators with different augmentation settings applied, by the gateway 52, to each replicated copy. The gateway 52 provides a set of augmentation methods in hardware and provides the ability for gateway software to implement different algorithms for said augmentation.

In one embodiment, the streaming engine 124 provides two data acceleration features. The streaming function provides a replicate feature and a replicate and transpose feature. This allows training data to be replicated from one gateway to many other gateway, thus reducing the IO connectivity need.

The data is received at the gateway 52 from the host 63 or remote storage 151 and is stored (after traversing path 120) in the memory 114 by the PPE 123. The DME 122 retrieves the data to be sent along path 121 from the memory 114 and causes the data to be sent to the accelerator 51. The data is sent to the accelerator 51 from the memory 114 via the indicated accelerator ports. Data transfer along the path 121 is triggered by the sync signals as described already.

The gateway 52 allows the provision of data to the accelerator 51 (which involves transfer of the data over the path 121) to be decoupled from the retrieval of the data from the host 63 or remote storage 151. In other words, the gateway 52 enables the transfer of data from the host 63 or remote storage 151 to proceed ahead of the computation performed by the accelerator 51.

FIG. 8 illustrates two further data paths that allow exchange of data between the gateway 52 and further gateways. The gateway 52 includes a path 125 from which data may be transferred between the accelerator 51 (coupled to the gateway 52 by the accelerator ports shown) and a further accelerator (not shown) via a further gateway 128 (coupled to the gateway 52 by the fabric ports shown). The gateway 52 and the further gateway 128 act as switches on this path 125 and enable an extended data exchange fabric between accelerators. The further gateway 128 may be configured to transfer data to/from a further host to which it is connected. The data transfer along this path 125 may be unicast (i.e. data directed to a single accelerator), broadcast (data transmitted without being directed to specified accelerators) and multicast (data directed to multiple specified accelerators). In broadcast mode, packets sent on the fabric port contain a Multicast Group ID. Each gateway has a table which contains a list of destinations for each multicast group ID. When the gateway receives such a packet, it looks up in the table, the list of destinations corresponding to the multicast group ID included in the packet and transmits the packet to those destinations.

In one embodiment the XPU Ports are a custom Root Complex implementation providing specialized data movement capabilities. In addition to transferring packets to/from the gateway memory 114, the XPU Ports also provide a peer-to-peer capability to/from the Fabric Ports. Packets which are targeting memory space mapping to a remote accelerator are detected at the XPU Port and directed towards the appropriate fabric port. The receiving Fabric Port will direct the packet to the correct destination accelerator port. Also, gateways can forward packets from one fabric port to another fabric port. This allows arbitrarily large fabrics to be traversed. In this way, full accelerator to accelerator exchange is enabled through the gateway fabric.

FIG. 8 also illustrates a data path 126 for exchanging data between the gateway 52 and a further gateway. The data path 126 is used for the exchange of synchronisation and management messages between the gateway 52 and the further gateway 128. Additionally, the data path 126 is used to exchange data between the memory 114 associated with gateway 52 and a memory associated with the further gateway 128. The data exchanged via data path 126 is exchanged as part of the pre-work, when pre-work instructions are executed by the PPE 123.

Data may be transferred from the memory of the further gateway 128 to the memory 114 in response to the execution of pre-work instructions by the PPE 123. This data is then available in memory 114 for transfer (e.g. by a PCIe read operation from the accelerator or by the execution of a DMOV instruction by the DME 122) to the accelerator 52 at the upcoming ESP. When the PPE 123 completes execution of the pre-work instructions for transferring data into its memory 114, it increments its set of ESP credits.

As noted earlier, a sync zone/group may include a plurality of gateways. In such a case, instead of, or as well as, a sync request being received from the associated accelerator 51, a sync request may be received at the gateway 52 from a further gateway 128. In this case, this other gateway 128 may be referred to as a "downstream gateway".

Figure 15:
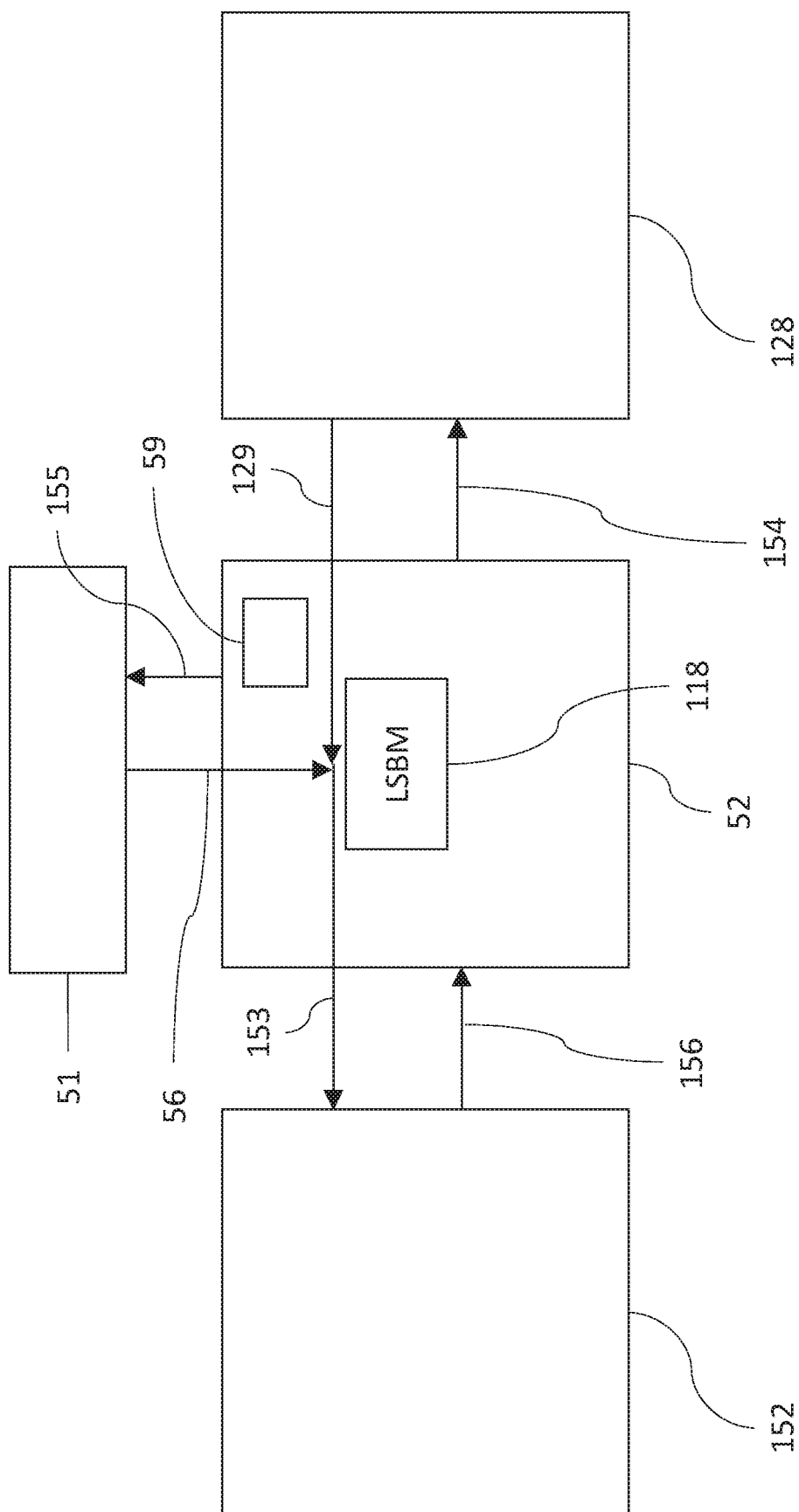
FIG. 15 is a schematic illustration of the exchange of sync requests and acknowledgments between three gateways.

Reference is now made to FIG. 15, which shows the gateway 52 in communication with the further gateway 128 and, additionally, a third gateway 152. When the sync request 129 is received from the further gateway 128, the gateway 52 may allow the synchronisation barrier to be passed by transmitting a sync request 153 upstream to a third gateway in the case that the gateway 52 is not a sync master (i.e. the gateway 52 is a sync slave). The sync request 129 may first be aggregated with one or more sync requests (e.g. sync request 56) received from the local accelerators (e.g. accelerator 51). In this case, it is this aggregated sync request 153 that is transmitted upstream to the third gateway.

Alternatively, and for example when gateway 152 is not part of the sync zone of gateway 52 when the sync request 129 is received from the other gateway 128, the gateway 52 may allow the synchronisation barrier to be passed by sending a sync acknowledgment 154 to the further gateway 128 in the case that the gateway 52 is the master gateway. In the case that the gateway 52 is the master gateway, any sync requests received from the local accelerators (e.g. accelerator 51) are also acknowledged (e.g. by transmitting acknowledgement 155) given that sync-requests are received from all configured down-stream gateways.

The ESP credits in the LSBM 118 held by the gateway 52 may be used to control the synchronisation request forwarding between the gateway 52 and the further gateway 128. As with the barrier between the accelerator 51 and the gateway 52, the ESP credits are only used to control the synchronisation request forwarding between the gateway 52 and the further gateway 128 in the case that gateway involvement is indicated by a local accelerator (e.g. accelerator 51) that sends a sync request 155 to the gateway 52. This indication may be stored in register 59 as described earlier. If no gateway involvement is indicated in register 59, when the sync request 129 is received, the sync request 153 is sent upstream and when a sync acknowledgment 154 is returned, the synchronisation barrier is passed without requested an ESP credit from LSBM 118.

Assuming gateway involvement by the accelerator 51 is indicated, if the number of the ESP credits associated with the accelerator 51 is non-zero, and the gateway 52 has received sync request 129 from a downstream gateway 128, if the gateway 52 is not the sync master gateway (i.e. is a sync slave gateway), the barrier is passed upstream. The sync request 129 is aggregated with a sync request 56 from the accelerator 51 to form sync request 153 which is transmitted to an upstream gateway 152. The ESP credits in each LSBM 118 in the sync chain are decremented upon receiving a sync ack 156 corresponding to the sync request 153 for a synchronisation requiring gateway involvement.

Assuming gateway involvement by the accelerator 51 is indicated, if the number of the ESP credits associated with the accelerator 51 is non-zero, and the gateway 52 has received sync request 129 from a downstream gateway, if the gateway 52 is the sync master gateway it will send a sync acknowledgment 154 to the downstream gateway 128 and to its own streaming engine(s) 124. Upon reception of the sync acknowledgment, the streaming engine 124 decrements the number of ESP Credits held by the LSBM 118.

Thus, the LSPM 117 of the gateway 52 can prevent propagation of sync requests and acknowledgments to other gateways (i.e. LSPMs) in the absence of ESP credits in the LSBM 118. This ensures that when an acknowledgement is finally generated by the sync master, all accelerators will start to execute their superstep at the same time.

The gateway 52 includes a plurality of interfaces, e.g. an interface to the accelerator 51, an interface to the further gateway 128, an interface to the third gateway 152. These interfaces are part of sync propagation modules. The gateway 52 includes a register indicating the directionality of each of these interfaces for sync purposes, i.e. whether the entity such as the further gateway 128 is upstream or downstream of the gateway 52. Hence, the register indicates to which interfaces, sync requests are to be sent over by the gateway 52 in response to the gateway 52 receiving a sync request from a downstream entity. In the case that the register 59 indicates that none of the interfaces are for transmission of the sync request, this indicates that the gateway 52 is the sync master. In this case, the gateway 52 transmits sync acknowledgments over all of the interfaces over which it has received sync requests.

In the case that the gateway 52 functions as a slave gateway, it may receive one or more sync requests from the accelerators (e.g. accelerator 51) that are associated with it. These sync requests are aggregated by the gateway 52 which then passes them upstream to the further gateway 128 (assuming there are ESP credits available for each local accelerator indicating gateway involvement from it receives sync requests). Assuming the further gateway 128 is also a slave, that further gateway gathers that request, and all sync requests from its own local accelerators and then forwards a new aggregated sync request to the next gateway (assuming there are ESP credits available for each local accelerator indicating gateway involvement from it receives sync requests). This happens in parallel across the sync network. Eventually the master gateway receives sync requests from all downstream gateways and its own associated accelerators. Then, and only then, is the sync completed and the sync acknowledgments generated by the master gateway (assuming there are ESP credits available for each local accelerator indicating gateway involvement from it receives sync requests) and sent downstream to the entities (i.e. local accelerators or downstream gateways) from which it received sync requests. Each gateway downstream which receives a sync ack will transmit a sync ack to the entities from which it received sync requests.

As noted, sync requests may be received at gateway 52 from a plurality of local accelerators (not just the example accelerator 51). Each accelerator is associated with a different set of ESP credits. Only if all the ESP credits for each accelerator from which a sync request (and which indicates gateway involvement) has been received is non-zero will the gateway 52 pass the aggregated sync request upstream (in the case that it is a slave) or acknowledge the sync request (in the case that it is the master).

As previously, if gateway involvement is indicated in the register 59, following transmission of a sync acknowledgment to the accelerator 51, the gateway 52 is configured to exchange data with the accelerator 51.

Figure 18:
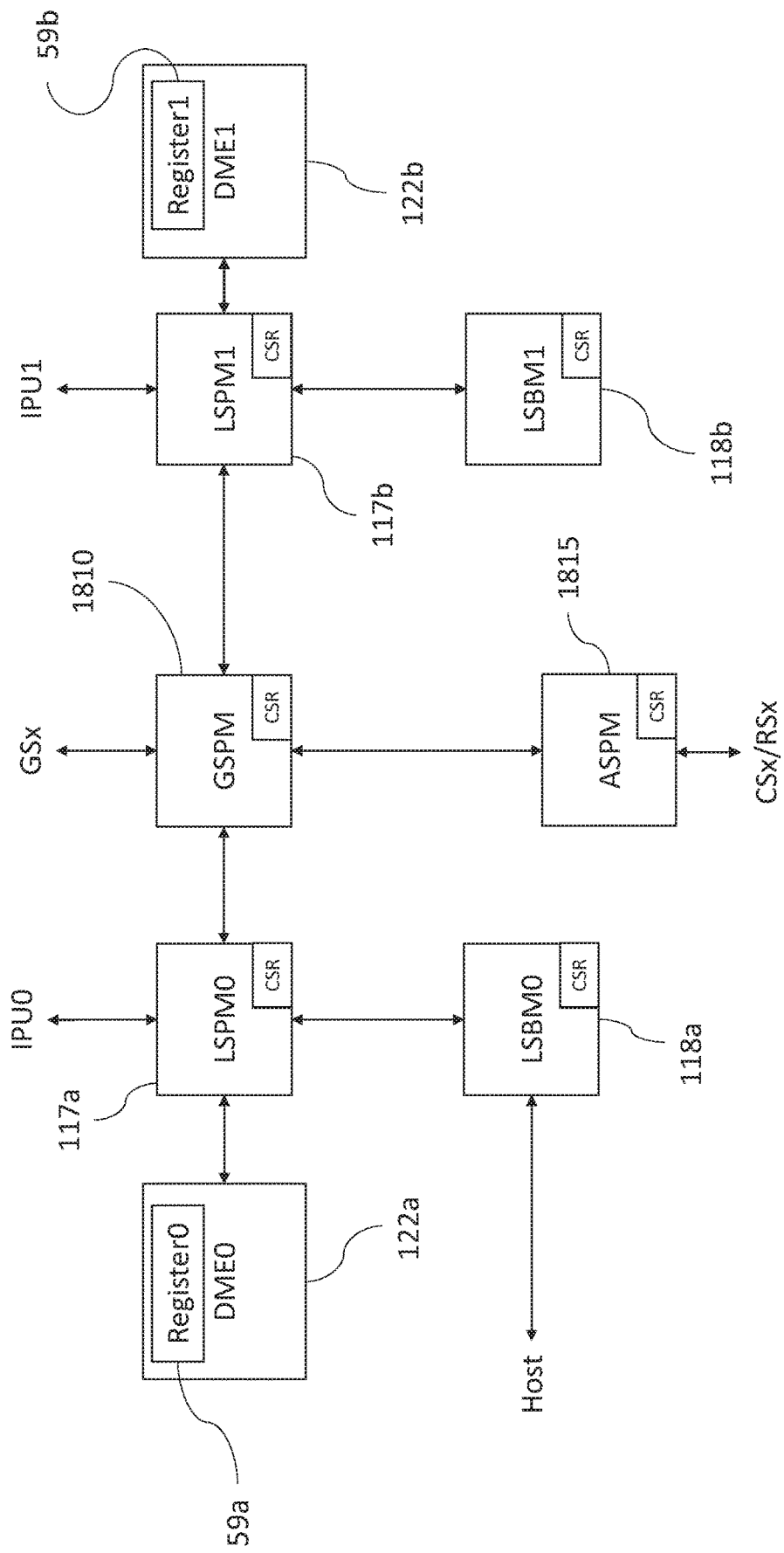
FIG. 18 is a schematic illustration of different components in a gateway that may be used during the synchronisation process according some embodiments.

Reference is made to FIG. 18, which illustrates in more detail, the sync propagation modules that form part of the gateway and which are used to control the propagation of sync requests and acknowledgments. Whilst earlier Figures have illustrated a single accelerator 51 in communication with a gateway 52, this Figure illustrates an example in which a gateway is configured to interface with two different accelerators. However, it would be appreciated by the skilled person that in some embodiments, the gateway may be configured to communicate with only a single accelerator. In this case, reference to the LSPMs, LSBMs, and gateway status registers in the following description may be understood to refer to single such modules only that are associated with a single accelerator only.

FIG. 18 illustrates the Data Mover Engines (DMEs) 122a, 122b, which have been discussed previously. Each of these is part of a separate streaming engine associated with a different accelerator for exchanging data with the associated accelerator.

FIG. 18 also illustrates the Local Barrier Sync Modules (LSBMs) 118a/118b associated with each accelerator. As already discussed, these hold the ESP credits for controlling the barrier when data exchange between the gateway and the respective accelerator is requested.

The other components in FIG. 18 that are part of the gateway are sync propagation modules. The sync propagation modules shown in FIG. 18 include the Local Sync Propagation Modules (LSPM) 117a/117b which have already been discussed, the Global Sync Propagation Module (GSPM) 1810 and the Appliance Sync Propagation Modules (ASPM) 1815. Each of these sync propagation modules is provided by an appropriate circuit. The sync propagation modules may, therefore, be referred to as sync propagation circuits. The circuits providing each module may be hardware processing units comprising, for example, FPGAs or ASICs. The circuits providing each module may be processors configured to execute computer readable instructions that are stored on a non-transitory computer readable medium.

Each of the sync propagations modules, and additionally the accelerators and DMEs, shown in FIG. 18 is configured to operate as one of three different types of node. A first type is a slave node. This type of node is the bottommost leaf in the synchronisation network. A slave node does not receive sync requests, but only generates and passes sync requests to other nodes.

A second type of node is a master node. This type of node is the trunk of the sync network. This type of node does not pass sync requests to other nodes, but only receives sync requests from other nodes. All interfaces that are connected to the master node will (unless they are disabled) pass sync requests to the master node. The master node is configured to, once it has received all of the expected sync requests for an upcoming ESP, return sync acknowledgements to the nodes from which it received the sync requests.

A third type of node is a propagation node. This type of node is neither a leaf, nor a trunk of the sync network, but is a branch between them. A propagation node will receive one or more sync requests, aggregate the sync requests (if there is more than one) and pass a single aggregated sync request upstream towards the master node. A propagation node will, therefore, have 1 to N interfaces configured to receive sync requests from 1 to N downstream nodes (which may themselves be sync nodes or other propagation nodes) and a single interface configured to send a single sync request to an upstream node (which may be the master node or another propagation node). When the master node sends a sync ack to a propagation node, the propagation node receives the sync ack and sends it to the one or more downstream nodes from which it received the sync request/s.

Each sync group comprises at least one slave node, one master node, and, optionally, one or more propagation nodes. The sync group operates using a sync/ack handshake. All slave nodes in a sync group will execute asynchronously until they reach a point in their execution at which they are required to sync. They will each independently reach that sync point at separate times. When they do, they will each send a sync request upstream towards the master node and then stall until they receive a sync ack. The gateway sync propagation modules in the sync network are responsible for aggregating received requests, forwarding the aggregated request upstream towards the master node, and forwarding sync acknowledgments downstream towards the one or more slave nodes. When the slaves receive their expected sync acks, they will deassert their sync request line and can continue execution. When a sync propagation module has forwarded a sync request, it waits for a corresponding sync acknowledgment before it will process a further sync request which it has received.

In the system which has been described, the accelerator (e.g. accelerator 51 shown in FIG. 7) and the DME (e.g. DME 122 shown in FIG. 8) are both configured to always act as slave nodes. On the other hand, the sync propagation modules (LSMPs, GSPM, and ASPM) shown in FIG. 18 can be configured to act as one of a master, propagation or slave node in the sync network. How each sync propagation module is configured defines the synchronisation group/zone for the accelerators.

As will be explained in more detail, whether the sync propagation modules are configured to act as masters, slaves, or propagation nodes is dependent upon the values (sync propagation settings) in the gateway status registers (Register0 59*a* and Register1 59*b*). Following the writing of an indication of the sync propagation settings to at least one of the gateway status registers 59*a*, 59*b*, the gateway stores in dependence upon these sync propagation settings, control settings in registers (control and status registers (CSRs)) of each sync propagation module. Each of the sync propagation modules (e.g. LSPM, GSPM, and ASPM) comprises a control and status register (CSR) that controls how the sync propagation module propagates the sync requests and/or acknowledgments that it receives. The settings stored in the CSR of each sync propagation module control, for each of its interfaces, whether or not that interface is enabled/disabled and (if enabled) the directionality of the interface. Therefore, the settings stored in the CSR of each propagation module, control whether that module functions as master node, sync propagation node, or slave node.

Therefore, by writing to these registers 59*a*, 59*b* to control the propagation of sync requests and acknowledgements, the accelerators are able to select the sync group to be used for the synchronisation at the upcoming ESP. Each gateway sync register 59*a*, 59*b* is, therefore, a mechanism for controlling the sync group and gateway I/O requirements for a sync involving the respective accelerator. There is one such register 59*a*, 59*b* per accelerator and they are located at programmable memory locations in the gateway PCIE address space. Prior to initiating a sync request, an accelerator performs a write indicating a sync group to its associated sync register 59*a*, 59*b* across the PCIE. This write may contain one or more configuration settings for the sync propagation modules, with the gateway being configured to store the received settings in register 59*a* and apply the receive configuration settings for an upcoming sync. Alternatively, the register 59*a* may store a plurality of fixed sets of configuration settings. In this case, the write contains an indication of a selection of one of the plurality of sets of configuration settings held in the register 59*a* of the gateway, with the gateway being configured to apply the settings selected in dependence upon the indication.

Each of the one or more configuration settings is associated with a sync propagation module, and indicates how its associated sync propagation module is configured to respond to received sync requests (i.e. by propagating or acknowledging them) and acknowledgments. Each of the one or more configuration settings that applies for the upcoming sync is copied by the gateway from the gateway sync register 59*a*, 59*b* to the CSR of the associated sync propagation module. Each sync propagation module then propagates sync requests in accordance with the settings stored in its CSR. These one or more configuration settings, therefore, collectively define the sync group to be used for the upcoming sync.

In the case in which the accelerator writes the configuration settings to the gateway register 59*a*, 59*b*, the gateway copies the received settings to the relevant sync propagation modules. In the case in which the accelerator writes an indication selecting a set of configuration settings held in the gateway register 59*a*, the gateway copies the selected settings to the relevant sync propagation modules. In either case, once the sync request received from an accelerator has been acknowledged (i.e. the sync ack is transmitted to the accelerator), the configuration settings in the CSRs of the relevant sync propagation modules are automatically cleared by the gateway. In the case that the accelerator writes the configuration settings themselves to the gateway register 59*a*, once a sync request received from an accelerator has been acknowledged, the one or more configuration settings in the corresponding sync register 59*a* are automatically cleared by the gateway.

Additionally, the write from an accelerator to its corresponding register 59*a*, 59*b* will also specify whether data is to be exchanged between the gateway and the accelerator at the upcoming sync. Each accelerator is able to request two different types of sync. A first type of sync is a standard sync in which data is exchanged only between the tiles of accelerators in the sync group. In this standard sync, the gateway does not exchange data with the accelerators and is only involved in propagating the sync requests and the acknowledgments. A second type of sync is an I/O sync in which, in addition to the data exchanged between the tiles of accelerators in the sync group, data is also exchanged between the gateway and the connected accelerators.

Prior to the sending of a sync request, an accelerator is configured to write to its associated gateway sync register (e.g. register 59*a*), an indication of the type of sync (i.e. whether data exchange with the gateway is required) in addition to an indication of the sync group.

Therefore, according to embodiments of the application, the indication of the sync group comprises a write or a selection of one or more configuration settings for the sync propagation modules in the gateway. The configuration settings indicate, for one or more of the sync propagation modules, how sync requests received at each module are to be forwarded, aggregated and acknowledged. These configuration settings are copied by at least one processor of the gateway to the CSRs of one or more of the sync propagation modules of the gateway, which then use the settings to determine how sync requests received at each module are to be forwarded, aggregated and acknowledged. By controlling the configurations settings of the sync propagation modules, a sync group may be defined for the upcoming sync.

In the case that the accelerator writes configuration settings directly to the gateway, any arbitrary group of settings can be used for the sync, and thus, any number of sync groups can be used by the compiler. Therefore, the compiled code executing on the accelerator has a great degree of control and flexibility over an upcoming synchronisation.

The functions of the different components, including the sync propagation modules, in the sync network will now be explained in more detail. The described system includes a first accelerator (shown as IPU0 in FIG. 18) and a second accelerator (shown as IPU1 in FIG. 18), both of which are connected to the gateway. The gateway in FIG. 18 may be the gateway 52, described earlier. Some of the functions of the components of the gateway are described only for the components (e.g. LSPM0 117*a*) associated with the first accelerator. However, the teaching applies equally well to the components (e.g. LSPM1 117*b*) associated with the second accelerator also.

The gateway comprises an LSPM for each accelerator. The gateway comprises a first LSPM (LSPM0) 117*a* associated with the first accelerator and a second LSPM (LSPM1) 117*b* associated with the second accelerator. Both of these LSPMs is configured to interface with their respective accelerator and with the respective DME for that accelerator in the gateway. Both of these LSPMs receive, propagate, and acknowledge sync requests from either their respective accelerator or their respective DME. The LSPMs receive, propagate, and acknowledge sync requests in accordance with the settings stored in their CSR.

Prior to the data exchange for a sync, the first accelerator sends a sync request to the first LSPM 117*a*. The LSPM 117*a* is also configured to receive a sync request from its associated DME (DME0 122*a*). The DME0 122*a* is connected to the sync network through the LSPM 117*a* and acts as a slave node in the sync network. The conditions required for the DME0 122*a* to send its sync request to the LSPM 117*a* differ depending upon the mode in which the streaming engine comprising DME0 122*a* is operating.

DME0 122*a* is configured to send the sync request to the LSPM 117*a* in response to at least one condition being met. A first condition that must be met for DME0 122*a* to send a sync request to the LSPM 117*a* is that a write to the register 59*a* providing an indication of the sync group and type of sync to be performed at the upcoming ESP has been performed by the first accelerator. In the case that the streaming engine is operating in push mode, if the indication written to the register 59*a* indicates that the upcoming sync is an I/O sync (i.e. one requiring data transfer between accelerator and gateway), then a second requirement must also be met, which is that data buffers (e.g. in memory 114) in the gateway are prepared for exchanging data with the first accelerator.

Therefore, in the case that the second requirement must be met, DME0 122*a* will not send the sync request to the LSPM 117*a* until data buffers in the gateway are prepared for exchanging data with the first accelerator. The DEMO 112*a* will then transmit a sync request to the LSPM 117*a* in response to determining that the operations performed by the PPE (e.g. PPE 123) of the relevant streaming engine to prepare data buffers for the exchange of data with the first accelerator at the upcoming ESP are complete. This preparation of data buffers may comprise loading into the memory of the gateway from external storage any data for transfer to the first accelerator at the upcoming ESP. If operating in the pull model, the gateway prepares read buffers containing the data to be fetched by the first accelerator. If the operating in the push model, the gateway prepares data to be pushed towards the accelerator by the DME0 122*a*. The preparation of data buffers may also comprises preparing data buffers for receiving data from the first accelerator at the upcoming ESP.

In the case that the streaming engine is operating in push mode, if the indication written to the register 59*a* indicates that the type of sync is a standard sync (i.e. no data transfer between the gateway and accelerators is to take place), then the DME0 122*a* is configured to send the sync request to the LSPM 117*a* in response to the write to the register 59*a*. In this case, there is no requirement for data buffers to be prepared prior to sending the sync request to the LSPM 117*a*.

In the case in which the streaming engine is not operating in push mode (i.e. is operating in a pull mode where the DME0 122*a* is not responsible for data transfer to the first accelerator), the DME0 122*a* is configured to send the sync request to the LSPM 117*a* upon receiving the write of the indication for the upcoming sync to the register 59*a*. In this case, there is no requirement for data buffers to be prepared prior to sending the sync request to the LSPM 117*a*.

Once the at least one condition is met, the DME0 122*a* sends the sync request to the LSPM 117*a* and waits for a sync acknowledgment from the LSPM 117*a*. When the sync is an I/O sync, the sync request that is received at the LSPM 117*a* from the DME0 122*a* will provide an indication to the LSPM 117*a* that at least one ESP credit must be present in the LSBM 118*a* prior to completing the sync. The sync request sets an lsbm_required bit that is stored in memory of the LSPM 117*a*. In response to such an indication, the LSPM 117*a* is configured to request an ESP credit from the LSBM 118*a* prior to acknowledging its received sync requests. If the number of ESP credits is non-zero, then the LSPM 117*a* will send sync acknowledgments to both the first accelerator and the DME0 122*a*.

If the streaming engine is operating in push mode and data is prepared in gateway memory for sending to the first accelerator, then the DME0 122*a* is configured to trigger the queued I/O operation for sending the prepared data to the first accelerator in response to receipt of the sync acknowledgement from the LSPM 117a. It will then withhold making the next sync request until after the I/O operation has completed.

If the streaming engine is not operating in push mode, but the sync is an I/O sync, then the first accelerator will pull the data from the prepared data buffers in gateway memory in response to receiving the acknowledgment from the LSPM 117a.

The LSPM 117a, therefore, implements the sync functionality required to operate a single accelerator. Additionally, the LSPM 117a is configured to connect the first accelerator to an arbitrary larger network. By connecting the first accelerator to an arbitrary larger network, the first accelerator may be part of a larger sync group when performing a sync, with data being synchronised between the first accelerator and one or more further accelerators. Some of the one or more further accelerators may be connected to the same gateway as the first accelerator, whereas others may be connected to other gateways.

The LSPM 117a has connections to the first accelerator, to the DME0 122a, to the LSBM (LSBM0) 118a, and to the Gateway Sync Propagation module (GSPM) 1810. The communication between the LSPM 117a and each of the first accelerator, DME0 122a and the LSBM 118a has already been discussed. In the embodiment illustrated in FIG. 18, the GSPM 1810 allows two local accelerators (i.e. the first accelerator and the second accelerator) to be part of the same sync group and to exchange sync requests and acknowledgments between each other. Furthermore, the GSPM 1810 allows accelerators connected to different gateways within the same machine/chassis to be part of the same sync group and to exchange sync requests and acknowledgments between each other. A machine/chassis provides work acceleration for a single appliance and comprises two gateways and four accelerators. The GSPM 1810, therefore, enables the exchange of sync requests and acknowledgments amongst four different accelerators by sending and receiving sync requests and sync acknowledgments with the GSPM 1810 on the other gateway of the machine/chassis. The interface between the GSPM 1810 and the GSPM on the other gateway is labelled as GSx in FIG. 18.

The GSPM 1810 is configured to communicate with an Appliance Sync Propagation Module (ASPM) 1815. The ASPM 1815 allows the two local accelerators to exchange and receive sync requests and acknowledgments with accelerators belonging to different chassises. The ASPM 1815, therefore, enables the exchange of sync requests and acknowledgments amongst many different accelerators by sending and receiving sync requests with ASPMs on gateways in different chassises. The ASPM 1815 has five different interfaces (labelled in FIG. 18 as CSx/RSx) to five different gateways in different chassises.

The ASPM 1815 is configured to operate in two different modes. In a first mode, the ASPM 1815 is configured to send and receive sync requests/acknowledgments to gateways belonging to different chassises but that are part of the same chassis group. In this first mode, the ASPM 1815 is referred to as a chassis sync master/slave and is configured to communicate over interfaces labelled as CSx in FIG. 18. In a second mode, the ASPM 1815 is configured to send and receive sync requests/acknowledgment to gateways belonging to different chassis groups. In this second group, the ASPM 1815 is referred to as a rack sync master/slave and is configured to communicate over interfaces labelled as RSx in FIG. 18.

Each of the sync propagation modules (LSPM, GSPM, and ASPM), therefore, comprise interfaces over which sync requests can be received and forwarded and over which sync acknowledgments can be received and forwarded. Whether or not particular interfaces are enabled and the directionality of these interfaces is controlled by the configuration settings held in the registers (i.e. CSRs) of each module. The configuration settings are selected or written by the first and/or second accelerators to the respective registers 59a, 59b, prior to the first and/or second accelerators issuing sync requests. Alternatively, the indication of the sync group (which comprises the write or selection of the configuration settings) may be included in the sync requests themselves. The indication of the sync group written to one of the registers 59a, 59b by the associated accelerator indicates for each propagation module involved in an upcoming sync involving the accelerator, whether the sync interface for each propagation module is enabled and (if enabled) the directionality of the interface. The gateway copies the settings relating to a particular sync propagation module in the applicable configuration settings in register 59a or 59b to the CSR of the particular sync propagation module. These settings are then used to control whether each of the interfaces of the particular sync propagation module are enabled and their directionality.

Therefore, each sync interface can be individually controlled as to whether it is enabled, and in which direction it operates (request in, or request out). By writing either the configuration settings or a selection of configuration settings to registers 59a, 59b to control the propagation of sync requests/acks, the accelerators are able to set the sync group to be used for the sync. The registers 59a, 59b in the gateway are control status registers (CSRs) of the Data Mover Engines (DME0 122a and DME1 122b).

Each of the LSPMs 117, GSPM 1810, and ASPM 1815 are configured to operate in the same fundamental way. They each have a number of sync ports at their interfaces. The sync ports may be internal to the gateway (e.g. for interfacing the LSPM 117a with the GSPM 1810). The sync ports may alternatively be external to the gateway (e.g. for interfacing the GSPM 1810 with the GSPM on the other gateway of the chassis). By configuring the directionality of each port, each module is configured to operate as either a slave node, master node, or propagation node.

As an example, the first accelerator may, in advance of an upcoming ESP, write an indication to the register 59a, that the interface of the LSPM 117a for interfacing with the GSPM 1810 is disabled. This indication is written to the CSR of the LSPM 117a by the gateway. Therefore, for this upcoming sync, the LSPM 117a is configured to act as the master node. In response to receiving the sync requests from the first accelerator and the DME0 122a, the LSPM 117a (after, if the sync is an I/O sync, requesting an ESP credit from the LSBM 118a) provides sync acknowledgments to the first accelerator and to the DME0 122a, without propagating the sync request to GSPM 1810. In response to the receipt of the sync acknowledgment, the data exchange for the sync then takes place. This data exchange may be only between the tiles of the first accelerator (if the sync is a standard sync) or may involve data exchange between the gateway memory and the first accelerator (if the sync is an I/O sync).

In another example, the first accelerator writes an indication to the register 59a that the interface of the LSPM 117a for interfacing with the GSPM 1810 is enabled, and that the directionality is such that a sync request received at the LSPM 117a will propagate from LSPM 117a and GSPM

1810. This indication is copied to the CSRs of the LSPM 117*a* and the GSPM 1810 by the gateway. The first accelerator also writes an indication to the register 59*a* that the interfaces GSx and CSx/RSx of the GSPM 1810 are disabled. This indication is copied to the CSRs of the GSPM 1810 and the ASPM 1815 by the gateway. Similarly, the second accelerator writes an indication to the register 59*b* that the interface of the LSPM 117*b* for interfacing with the GSPM 1810 is enabled, and that a sync request will propagate from LSPM 117*b* and GSPM 1810. This indication is copied to the CSRs of the LSPM 117*a* and the GSPM 1810 by the gateway. The second accelerator also writes an indication to the register 59*b* that the interfaces GSx and CSx/RSx of the GSPM 1810 are disabled. This indication is copied to the CSRs of the GSPM 1810 and the ASPM 1815 by the gateway. In this case, the LSPMs 117*a*, 117*b* are configured to act as a propagation node, whereas the GPSM 1810 is configured to act as the master node. In this case, both the first and second accelerator are configured to write indications of the configurations for the sync propagation modules to the registers 59*a*, 59*b*, which together define the sync group. The compiler is configured to ensure consistency between the indications of the sync group provided by both accelerators. The compiler is, furthermore, configured to ensure that the indications of the sync group provided by both accelerators make sense in the context of the larger sync network.

After the writing of the indication of the sync group, in response to receiving the sync requests from the first accelerator and the DME0 122*a*, the LSPM 117*a* (after, if the sync is an I/O sync, requesting an ESP credit from the LSBM 118*a*) provides an aggregated sync request to the GSPM 1810 in accordance with the configuration settings indicated by the indication of the sync group. Similarly, in response to receiving a sync request from the second accelerator and the DME1 122*b*, the LSPM 117*b* (after, if the sync is an I/O sync, requesting an ESP credit from the LSBM 118*b*) provides an aggregated sync request to the GSPM 1810 in accordance with the indicated configuration settings. In response to the receipt of both of the aggregated sync requests, the GSPM 1810 is configured to provide sync acknowledgements to the LSPMs 117*a*, 117*b* in accordance with the indicated configuration settings. The LSPMs 117*a*, 117*b* then provide sync acknowledgments downstream to their respective accelerators and to their respective DMEs 122*a*, 122*b*. In response to the receipt of the sync acknowledgments at the accelerators and DMEs 122*a*, 122*b*, the data exchange for the sync then takes place. This data exchange may involve data exchange between the accelerators, by the sending of addressed data packets by the accelerators to the gateway which are delivered to the other respective accelerator. The data exchange may involve data exchange between gateway memory (e.g. memory 114) and one or both of the accelerators (if the sync is an I/O sync).

In another example, the first accelerator writes an indication to the register 59*a* that the interface between the LSPM 117*a* and the GSPM 1810 is enabled, and that the directionality of the interface is such that a sync request received at the LSPM 117*a* will be propagated to the GSPM 1810. This indication is copied to the CSRs of the LSPM 117*a* and the GSPM 1810 by the gateway. The first accelerator also writes an indication to the register 59*a* that the interface GSx is enabled and that the directionality of the GSx interface is such that a sync request will be received at the GSPM 1810 from over the GSx. This indication is copied to the CSR of the GSPM 1810 by the gateway. The first accelerator also writes an indication to the register 59*a* that the interface between the GSPM 1810 and the ASPM 1815 is disabled. This indication is copied to the CSRs of the GSPM 1810 and the ASPM 1815 by the gateway In this case, the LSPMs 117*a*/117*b* are configured to act as propagation nodes, whereas the GSPM 1810 is configured to act as a master node. Also part of the same sync group is the GSPM on the other gateway (not shown) with which the GSPM 1810 is configured to communicate over interface GSx. This other GSPM is configured to act as a propagation node, which passes a sync request upstream to GSPM 1810.

In response to receiving the sync requests from the first accelerator and the DME0 122*a*, the LSPM 117*a* (after, if the sync is an I/O sync, requesting an ESP credit from the LSBM 118*a*) provides an aggregated sync request to the GSPM 1810. The GSPM 1810 also receives a sync request from the GSPM on the other gateway. In response to the receipt of both of the aggregated sync requests, the GSPM 1810 provides sync acknowledgements to the LSPM 117*a* and to the GSPM on the other gateway. The LSPM 117*a* then provides sync acknowledgments downstream to the first accelerator and to the DME0 122*a*. A similar process of forwarding the sync acknowledgments to the slave nodes will also be carried out on the other gateway. In response to the receipt of the sync acknowledgment at the accelerators and DMEs, the data exchange for the sync then takes place. This data exchange may involve data exchange between the accelerators of the two gateways, by the sending of addressed data packets by the accelerators to their respective gateway which are delivered to the other gateway and then to the other accelerators. The data exchange may involve data exchange between gateway memory and one or both of the accelerators.

In further examples, the interface between the GSPM and the ASPM and at least one of the interfaces (CSx/RSX) between the ASPM and other ASPMs on other gateways may be enabled so as to provide sync groups comprising accelerators belonging to different chassises.

Therefore, by controlling the configurations for each interface of each sync propagation module, the accelerators can define different sync groups for upcoming syncs.

Figure 18A:
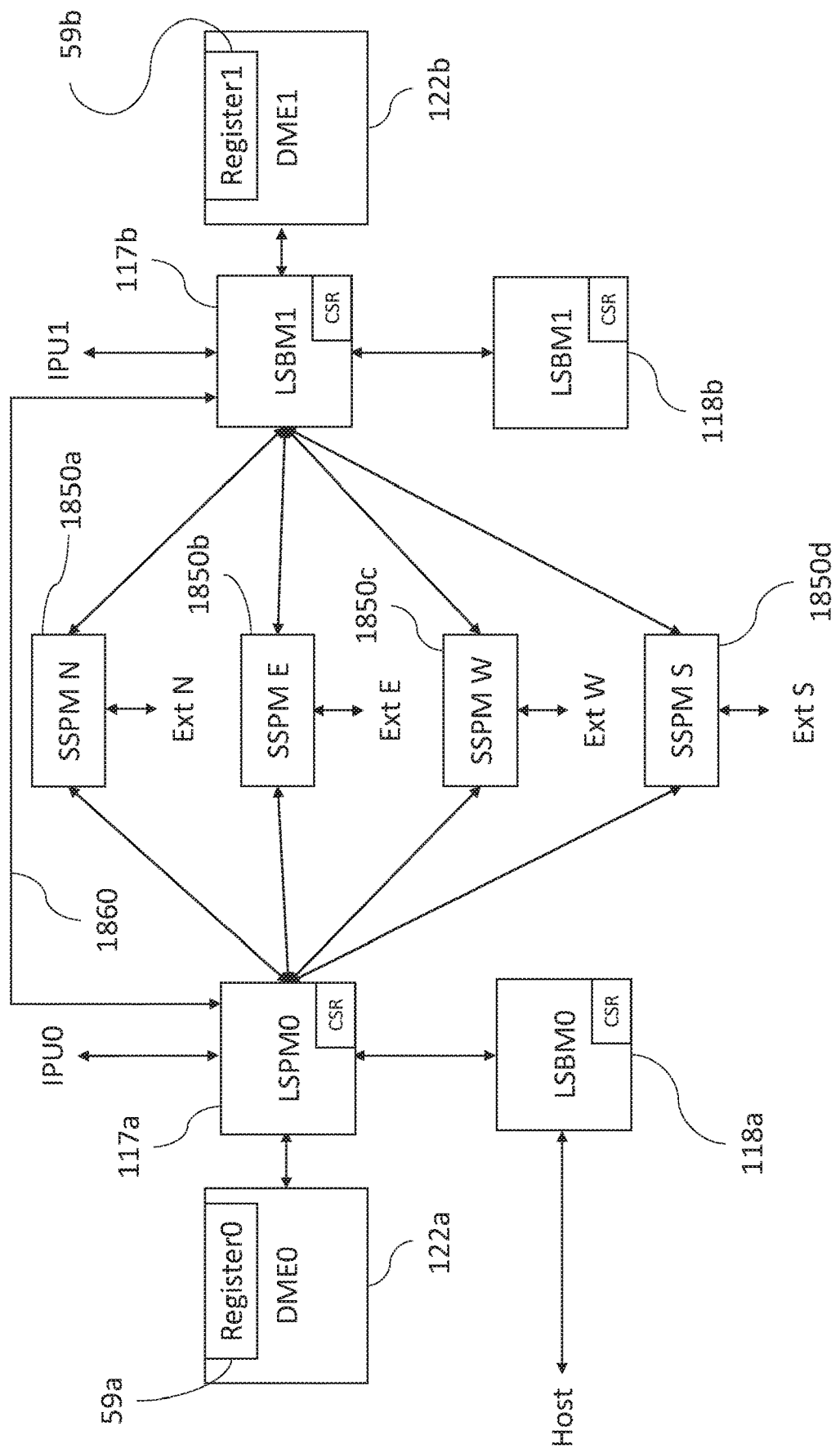
FIG. 18A is a schematic illustration of different components in a gateway that may be used during the synchronisation process according some embodiments.

References is made to FIG. 18A, which illustrates a further example arrangement of sync propagation modules according to embodiments of the application. Like elements to those described above with respect to FIG. 18 are labelled with like reference numerals. Similarly to FIG. 18, FIG. 18A illustrates an example in which a gateway is configured to interface with two different accelerators. However, it would be appreciated by the skilled person that in some embodiments, the gateway may be configured to communicate with only a single accelerator or any number of accelerators. In this case, reference to the LSPMs, LSBMs, and gateway status registers in the following description may be understood to refer to single such modules only that are associated with a single accelerator only.

Unlike the example of FIG. 18, in the example of FIG. 18A, the GSPM and ASPM are replaced with a different type of sync propagation module, the Scaleout Sync Propagation Module (SSPM). FIG. 18A illustrates four SSPMs 1850*a*, 1850*b*, 1850*c*, 1850*d* (collectively referred to herein as SSPMs 1850). Like the other sync propagation modules, each of the SSPMs is provided by an appropriate circuit and may, therefore, be referred to as a sync propagation circuit. The circuits providing each SSPM may be hardware processing units comprising, for example, FPGAs or ASICs. The circuits providing each SSPM may be processors configured to execute computer readable instructions that are stored on a non-transitory computer readable medium.

Each of the SSPMs 1850 has an interface to an SSPM on a neighbouring gateway. Each of the SSPMs 1850 interfaces with a different gateway. For example, the SSPM 1850*a* interfaces over Ext N with a further gateway to the "north". SSPM 1850*b* interfaces over Ext E with a different gateway to the "East". In this way, a grid of gateways are connected together via interfaces at the SSPMs. The arrangement shown in FIG. 18A is one manner in which the hardcoded propagation modules (i.e. the SSPMs) could be employed for communication between gateways, however, other configurations making use of hardcoded propagation modules are also possible.

Unlike the other sync propagation modules (i.e. LSPM, ASPM, GSPM), the SSPM sync propagation settings are not configurable by the accelerators. The SSPMs 1850 are hard configured. Each of the SSPMs 1850 are configured to pass any sync requests they receive from an LSPM 117*a*/117*b* upstream to a corresponding SSPM on a neighbouring gateway. Each of the SSPMs 1850 are configured to pass any sync requests they receive from a corresponding SSPM on a neighbouring gateway, upstream to the LSPMs 117*a*, 117*b*. Each of LSPMs 117*a*, 117*b* may or may not receive and process these sync requests in dependence upon whether or not the configuration settings in their CSR indicate that their respective interface with the SSPM is disabled. Each of the SSPMs 1850 are configured to pass any sync acknowledgments that they receive from an LSPM 117*a*/117*b*, downstream to a corresponding SSPM on a neighbouring gateway. Each of the SSPMs 1850 are configured to pass any sync acknowledgments they receive from a corresponding SSPM on a neighbouring gateway downstream to the LSPMs 117*a*, 117*b*. Each of LSPMs 117*a*, 117*b* may or may not receive and process these sync acknowledgments in dependence upon whether or not the configuration settings in their CSR indicate that their respective interface with the SSPM is disabled. Therefore, each of the SSPMs is configured to act as a propagation node. Although the configuration settings of the SSPM are hardcoded, the participation of each SSPM interface in a particular sync group is effectively controlled by the configuration settings of each LSPM. Therefore, the participation of each SSPM interface in a particular sync group is controlled by the indication of the sync group written by the accelerator.

In order to pass sync requests between the first and second accelerator, a further connection between the LSPM 117*a* and LSPM 117*b* is used. This may be useful in the case of a sync group comprising the first and second accelerator but not comprising accelerators connected to any other gateway. In this case, a sync request may be passed between LSPM 117*a* and LSPM 117*b*, without being forwarded to SSPMs 1850 where they would be forwarded to different gateways according to the hard configuration of the SSPMs 1850.

In an example of the arrangement of sync propagation modules shown in FIG. 18A, the first accelerator writes an indication to the register 59*a* that the interface between the LSPM 117*a* and the SSPM 1850*b* is enabled, and the directionality is such that a sync request will propagate from LSPM 117*a* to SSPM 1850*b*. This indication is copied to the CSR of the LSPM 117*a* by the gateway. The first accelerator also writes indications to the register 59*a* that the interfaces between the LSPM 117*a* and the remaining SSPMs 1850*a*, 1850*c*, and 1850*d* are disabled. This indication is copied to the CSR of the LSPM 117*a* by the gateway. The second accelerator writes an indication to the register 59*b* that the interface between the LSPM 117*b* and the SSPM 1850*b* is enabled, and that the directionality is such a sync request will propagate from LSPM 117*b* to SSPM 1850*b*. This indication is copied to the CSR of the LSPM 117*b* by the gateway. The second accelerator also writes indications to the register 59*b* that the interfaces between the LSPM 117*b* and the remaining SSPMs 1850*a*, 1850*c*, and 1850*d* are disabled. This indication is copied to the CSR of the LSPM 117*b* by the gateway. In this case, the LSPM 117*a*, LSPM 177*b* and SSPM 1850*b* are configured to act as propagation nodes. Also part of the same sync group is an SSPM on another gateway (not shown) with which the SSPM 1850*b* is configured to communicate over interface Ext E.

In response to receiving the sync requests from the first accelerator and the DME0 122*a*, the LSPM 117*a* (after, if the sync is an I/O sync, requesting an ESP credit from the LSBM 118*a*) provides an aggregated sync request to the SSPM 1850*b*. Similarly in response to receiving the sync requests from the second accelerator and the DME0 122*b*, the LSPM 117*b* (after, if the sync is an I/O sync, requesting an ESP credit from the LSBM 118*a*) provides an aggregated sync request to the SSPM 1850*b*. In response to the receipt of both of the aggregated sync requests, the SSPM 1850*b* is configured to provide a further aggregated sync request to an SSPM on a further gateway. A process of forwarding the sync requests upstream and receiving sync acknowledgments will be carried out on the other gateway. After sending the further aggregated sync request, the SSPM 1850*b* receives a sync acknowledgment from the SSPM on the other gateway. This sync acknowledgment is then provided downstream to the LSPMs 117*a*, 117*b*. The LSPMs 117*a*, 117*b* then provides sync acknowledgments downstream to their associated accelerator and to their associated DME 122*a*/122*b*. In response to the receipt of the sync acknowledgment at the accelerators and DMEs 122*a*, 122*b*, the data exchange for the sync then takes place. This data exchange may involve data exchange between the accelerators of the two gateways, by the sending of addressed data packets by the accelerators to their respective gateway which are delivered to the other gateway and then to the other accelerators. The data exchange may involve data exchange between gateway memory and one or both of the accelerators. The data exchange may involve data exchange between the first and second accelerator.

In another example using the arrangement of sync propagation modules shown in FIG. 18A, the first accelerator writes an indication to the register 59*a* that all of the interfaces between the LSPM 117*a* and the SSPMs 1850 are disabled. This indication is copied to the CSR of the LSPM 117*a* by the gateway. The first accelerator also writes an indication to the register 59*a* that the interface between the LSPM 117*a* and the LSPM 117*b* is enabled, and the directionality of the interface is such that a sync request will propagate upstream from LSPM 117*a* to LSPM 117*b*. This indication is copied to the CSR of the LSPM 117*a* by the gateway. The second accelerator writes an indication to the register 59*b* that all of the interfaces between the LSPM 117*b* and the SSPMs 1850 are disabled. This indication is copied to the CSR of the LSPM 117*b* by the gateway. The second accelerator also writes an indication to the register 59*b* that the interface between the LSPM 117*a* and the LSPM 117*b* is enabled, and the directionality of the interface is such that a sync request will propagate upstream from LSPM 117*a* to LSPM 117*b*. This indication is copied to the CSR of the LSPM 117*b* by the gateway. In this case, the LSPM 117*a* is configured to act as a propagation node, whilst the LSPM 117*b* is configured to act as a master node.

In response to receiving the sync requests from the first accelerator and the DME0 122*a*, the LSPM 117*a* (after, if the sync is an I/O sync, requesting an ESP credit from the LSBM 118*a*) provides an aggregated sync request to the LSPM 117*b*. The LSPM 117*b* will stall until it receives the aggregated sync request from the LSPM 117*a*. In response to receiving the sync requests from the second accelerator, the DME0 122*b*, and the LSPM 117*a*, the LSPM 117*b* (after, if the sync is an I/O sync, requesting an ESP credit from the LSBM 118*a*) provides sync acknowledgments to each of the second accelerator, the DME0 122*b*, and the LSPM 117*a*. The LSPM 117*a* then provides sync acknowledgments downstream to the first accelerator and to the DME 122*a*. In response to the receipt of the sync acknowledgment at the accelerators and DMEs 122*a*, 122*b*, the data exchange for the sync then takes place. The data exchange may involve data exchange between gateway memory and one or both of the accelerators. The data exchange may involve data exchange between the first and second accelerator, via addressed packets sent via the gateway.

As noted earlier, in some examples of a gateway, different set of ESPs are stored in the gateway for different sync groups and each sync group is associated with an ESP. According to embodiments of the application (illustrated in both FIGS. 18 and 18A)—when the accelerator writes configuration settings to the gateway sync register, hence defining arbitrary sync groups—the sets of ESP credits are dynamically associated with different sync groups at run time. For example, the LSBM 118*a* associated with the first accelerator is configured to store a predefined number of credit sets (or credit counters). The gateway sync register 59*a* stores, in addition to the configuration settings defining a sync group, an indication of the particular credit set in the LSBM 118*a* that is associated with that sync group. The indication of the particular credit set may be written by the gateway or by the first accelerator. When the sync request is received from the gateway, if the sync is an I/O sync, the particular credit set associated with the sync group specified in the register is decremented prior to proceeding past the sync barrier. Credit sets are, therefore, dynamically allocated for sync groups and used to control the passing of sync barriers for that sync group. A new credit set may be allocated for a sync group each time the first accelerator writes the configuration settings defining that sync group to the register 59*a*.

Figure 19:
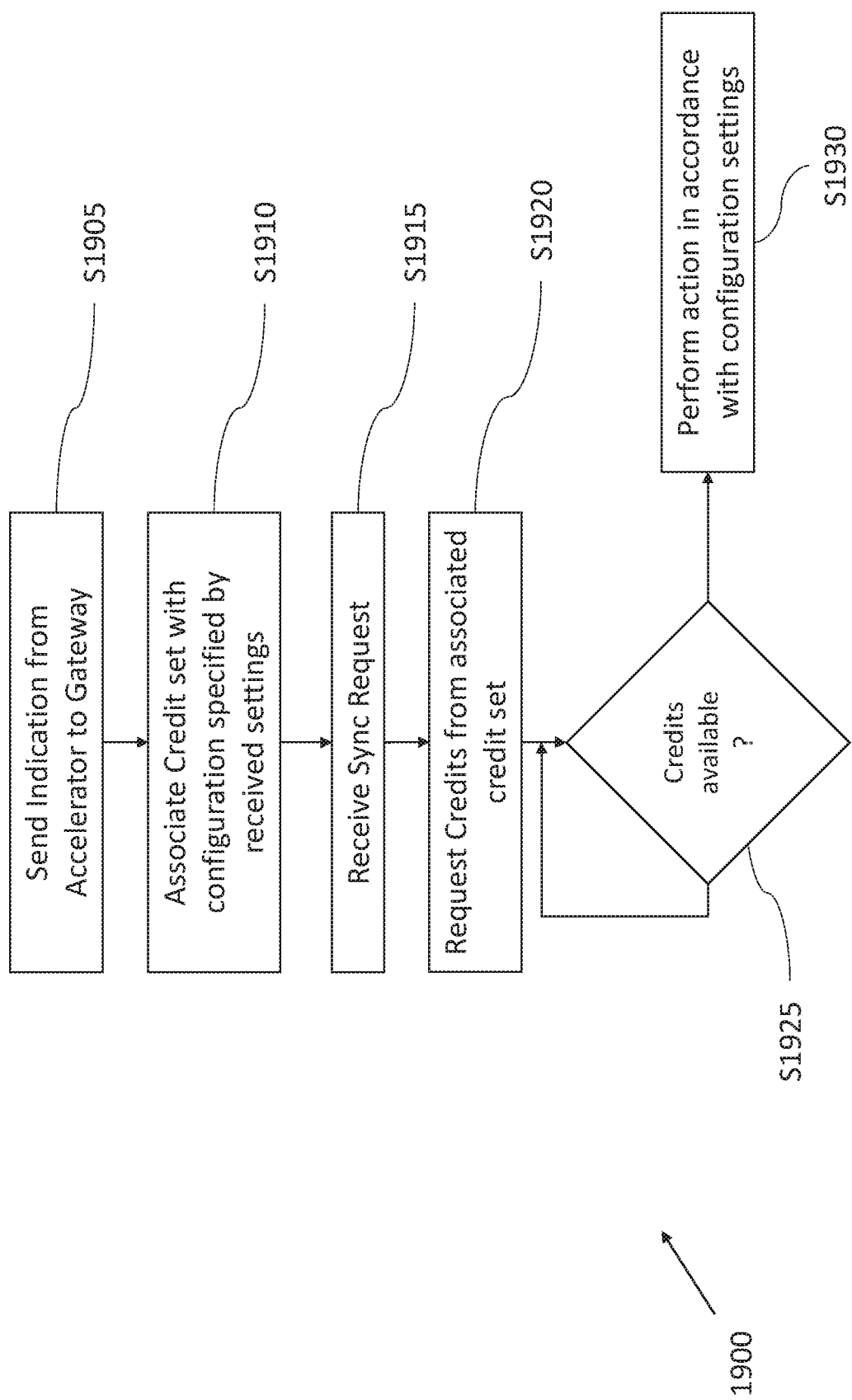
FIG. 19 illustrates a method according to embodiments of the application.

Reference is made to FIG. 19, which illustrates a method 1900 for controlling the sync groups according to embodiments of the application.

At S1905, the accelerator sends an indication of a sync group to be used for an upcoming sync. The sync group comprises the accelerator. The indication of the sync group comprises either one or more configuration settings to the gateway or an indication of a selection of one or more configuration settings for the indicated sync group. The accelerator also sends an indication of whether the sync is a standard sync (i.e. no data transfer between gateway and accelerator) or an I/O sync (i.e. data transfer between gateway and accelerator). These settings are written to at least one register in the gateway.

At S1910, if the indication of the sync group comprises one or more configuration settings, the gateway associates the configuration (i.e. sync group) specified by the one or more configuration settings with a set of credits of the plurality of credit sets stored in the relevant LSBM. In the case that the indication of the sync group comprises a selection of a set of configuration settings from a plurality of predefined sets of configuration settings held in the gateway register, each of the predefined sets is already associated with a set of credits. Therefore, S1910 is omitted in this case.

At S1915, the sync request is sent from the accelerator to the gateway.

At S1920, in response to receiving the sync request, the LSPM is configured to request credits from the associated credit set in the LSBM.

At S1925, if the sync is an I/O sync, it is determined whether the number of credits in the associated credit set is non-zero. If so, the method proceeds to S1930. If not, the synchronisation process stalls until a credit is made available in this set.

At S1930, actions are performed by the one or more sync propagation modules in accordance with the indication of the sync group provided by the accelerator. Such actions include at least one of propagating received sync requests (with or without aggregating the sync requests) and acknowledging the received sync requests.

Figure 10:
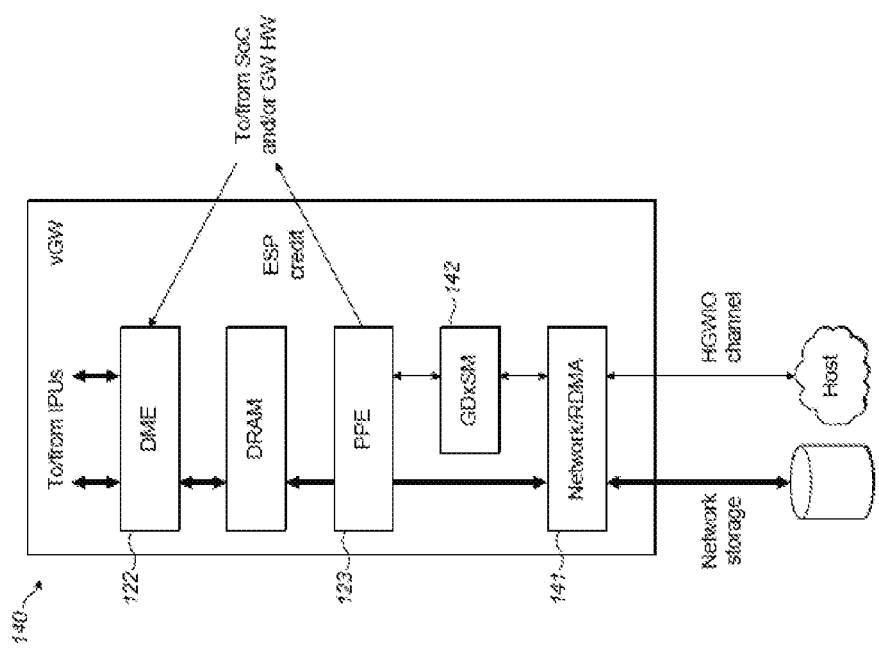
FIG. 10 is a schematic illustration of the data flow through a gateway.

Reference is made to FIG. 10, which illustrates the gateway function that is implemented by the streaming engine 124. The PPE 123 executes in parallel with the DME 122, but as the DME 122 depends upon the results of the PPE 123, the PPE 123 needs to provide its results before a DME operation is scheduled. This is handled in either the executable image, that is pre-compiled, or through user program sequencing of commands delivered to the gateway 52 from the accelerator 51.

As shown in FIG. 10, there is a module 142 (shown as a GDxSM module) that sits between the PPE 123 and the network stack 141. The GDxSM module 142 comprises two modules, i.e. a GW data import synchronisation module (GDISM) and a GW data export synchronisation module (GDESM). Both modules handle synchronization of I/O buffer elements between the gateway and host.

The synchronization is flow-controlled, and ensures GW data consistency and readiness for IO operations at the exchange synchronization points (ESPs).

The first set of credits (which has already been discussed in detail) are the ESP credits. The ESP credits govern the passing of the synchronisation barriers either between the accelerator 51 and the gateway 52 or between the gateway 52 and the further gateway 128. Using the ESP credits, a barrier credit mechanism is used to control the transfer of data between the gateway 52 and the accelerator 51. Availability of one ESP credit implies that a data exchange operation can be executed for one barrier.

A second set of credits governs the transfer of data to the gateway 52 (either from the host 63, remote storage 151 or further gateway 128). These credits are stored by the GDxSM 142. More specifically, these credits are stored in the GDISM of the GBxSM 142. The second set of credits may be referred to as GDISM credits. The skilled person would understand that the term "GDISM credits" is a name only, and that the credits are not limited in their nature by this name.

The gateway 52 executes pre-work instructions to retrieve data from the host 63, remote storage 151 or a further gateway 128 in response to determining that there are a non-zero number of GDISM credits available. The gateway 52 does not retrieve the data if it determines that there are zero GDISM credits available. The host 63 sends an instruction to update/increment the GDISM credits using RDMA to send the instruction. When the streaming engine 124 is notified via an RDMA write from host 63 of an update to the GDISM credits register, it will update the credits register accordingly. The gateway 52 decrements the number of GDISM credits stored in response to pre-work being completed by the PPE 123. The pre-work being to transfer data to the gateway 52 from an external storage.

The GDISM credit control mechanism may prevent the pre-work (PRW) instructions from being executed too early. The GDISM controls how many WDs ahead of the currently executing ESP, the pre-work (PRW) engine is allowed to work.

The host 63 may be configured to perform the same credit update for the GDISM credits for a group of gateways. The credit update is performed using RDMA and a protocol on top of RDMA to make a reliable broadcast. This may be needed in the case that a sync group includes a plurality of gateways. In this case, the group of gateways may need to have the same number of GDISM credits available, otherwise one of the accelerators may stall and hence stop all of the other accelerators.

In some examples, GDISM credits are also used for controlling the transfer of data from the gateway to the host. The same set of GDISM credits (i.e. the second set described above) that is used for the transfer of data from the external storage to the gateway 52 may be used to control the transfer of data from the gateway 52 to the external storage (e.g. host 63, remote storage 151). In response to the gateway 52 sending the data to the external storage, these GDISM credits that represent both import and export credits are decremented when the PPE 123 completes its commands in a WD. The gateway 128 will only transmit data to the external storage if the number of GDISM credits is non-zero.

In this way, the GDISM credits may be used to throttle the POW instructions as well as the PRW instructions. A POW instruction cannot be executed if the number of GDISM credits is non-zero. In the case that GDISM credits control transfer of data both to and from the external storage, a single GDISM credit is consumed only when all the POW instructions and PRW instructions are completed for a given ESP.

In some examples, a third set of credits governs the transfer of data from the gateway 52 to the host 63 or the remote storage 151. These credits are stored by the GDxSM 142. More specifically, these credits are stored in the GDESM of the GBxSM 142. The third set of credits may be referred to as GDESM credits. The skilled person would understand that the term "GDESM credits" is a name only, and that the credits are not limited in their nature by this name.

The gateway 128 will only transmit data to the external storage if the number of GDESM credits is non-zero. In response to the gateway 52 sending the data to the external storage, the GDESM credits are decremented. In this way, the GDESM credits may be used to throttle the POW instructions. A POW instruction cannot be executed if the number of GDESM credits is non-zero. The gateway 52 decrements the number of GDESM credits in response to the completion of a POW instruction.

The host 63 sends an instruction to update/increment the GDISM credits using RDMA to send the instruction. When the streaming engine 124 is notified via an RDMA write from host 63 of an update to the GDISM credits register, it will update the credits register accordingly.

There is a relationship between the GDISM credits and ESP credits. A GDISM credit gives the gateway 52 an allowance to transfer data from host memory to gateway memory 114 for one super-step. When the gateway 52 has loaded the data for this super-step into its memory 114, then it will decrement the GDISM credits and add one credit to the ESP credits. Now, the accelerator 51 can either perform a pull for this data (including a pull according to any pull model) or the gateway 52 can do a push of the data to the accelerator 51 (a push according to any push models) since the LSPM 117 and/or LSBM 118 will acknowledge the sync request when the number of ESP credits is >0.

Figure 9:
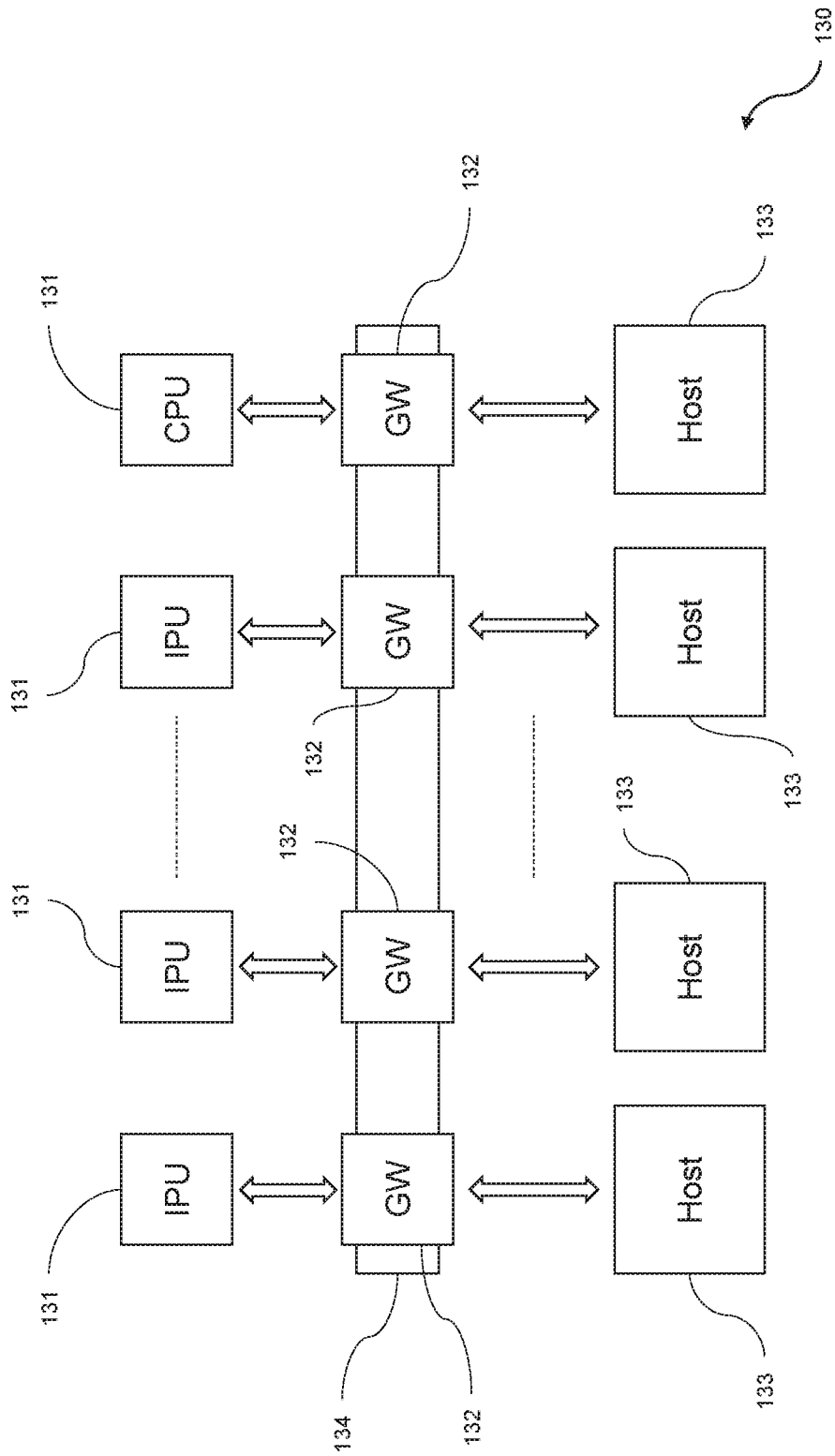
FIG. 9 schematically illustrates the aggregation of accelerators, and hosts using the gateways.

Reference is made to FIG. 9, which shows an example of a system 130 comprising a plurality of accelerators 131, a plurality of gateways 132 and a plurality of hosts 133. Since the gateways 132 communicate with one another, collectively the gateways 132 form an Ethernet network 134. The communication between the gateways 132 enables the disaggregation of the accelerators and the hosts. In other words, any host 133 in the system 130 is able to communicate with any accelerator 131.

Although FIG. 9 shows each gateway 132 being associated with a host 133 with which it communicates, in some embodiments, there is not one host per gateway. In some embodiments, only one of the gateways 132 shown in FIG. 9 may directly communicate with a host 133. That one host 133 could control a plurality of gateways 134. The gateway coupled to the host may distribute data from the host to the remaining gateways 134. Alternatively, the plurality of gateways 134 may retrieve data from the remote storage 151.

In the case that only one gateway 134 communicates with a host 133, that one gateway 134 may be the only gateway 134 of the plurality of gateways 134 that includes a network interface device. This has the advantage of reducing costs, by reducing the number of components required to construct the remaining gateways. When the remaining gateways provide data to the host, they may first perform data augmentation operations on the data before providing that data to the gateways comprising the network interface device for communicating with the host.

In some embodiments, there are no external hosts 133 in the system 130, but rather the host system runs on one or more of the gateways 134. In this case, the compiler runs on the gateway 134.

In some examples, a gateway 132 receives data from a host 133 and distributes this data to one or more other gateways 132. In other examples, a subset of gateways 132 receive data from one or more hosts 133 and distribute the received data to one or more other gateways. Each of the one or more other gateways 132 may provide the distributed data to its associated accelerator 131. By doing so not all of the gateways 132 need receive data from a host 133. This method could reduce costs since, in this case, not all of the gateways need be provided with full bandwidth. It could also improve efficiency. In some example, each accelerator 131 in a group of accelerators receives and processes identical data. In this case, the data need only be fetched once from a host 133. Therefore, a gateway 132 receives said data from the host 133 and distribute copies of this data to one or more gateways 132, which are each configured to distribute data to their associated accelerator 131. Hence, efficiency gains are realised since the same data need not be fetched from the hosts 133 multiple times. Additionally, this can be combined with the use of the remote storage 151 for retrieval of data by the gateways. The use of the remote storage 151 for retrieval means that the cost reduction can be achieved and the Gateways can have full bandwidth. A host may send storage descriptors to many gateways, which in parallel may act on these descriptors and pull/push data from the remote storage 151 over independent network connections per gateway. This technique scales I/O as a function of the number of gateways.

In some cases, the data that is distributed from a gateway 132 to one or more other gateways 132, is modified at the one or more other gateways 132. For example, the one or more other gateways 132 applies data augmentation to the one or more other gateways 132. This data augmentation is performed by the DME/s in the respective gateway/s. When each of the one or more other gateways 132 has modified the data that it has received, the data is transferred pushed to its associated accelerator 131. Gateways operating in the push model are configured to execute DMOV instructions to push the data to their associated accelerator 131. Gateways operating in the pull model receive read requests from their associated accelerators so that the data is pulled to their associated accelerator 131.

The pre-compiled gateway software specifies which accelerators 52 get which of the data held in memory 114 by a gateway 132 and from which host. The compiler of the accelerator code determines how to apportion data between the accelerators so as to apportion work between them. The gateway 132 load balances the I/O traffic across the two PCIe ports it has towards each accelerator.

The gateway and accelerator layers of the system are duplicated in such a way so as to allow for scaling of the system. Reference is made to FIG. 12, which shows an example of an apparatus 161 comprising a plurality of accelerators 162 and a plurality of gateways 163. The apparatus 161 is referred to as a machine 161. The machine 161 comprises four accelerators 162 and two gateways 163. Each of the gateways 163 are also coupled to one or more hosts (not shown).

Figure 13:
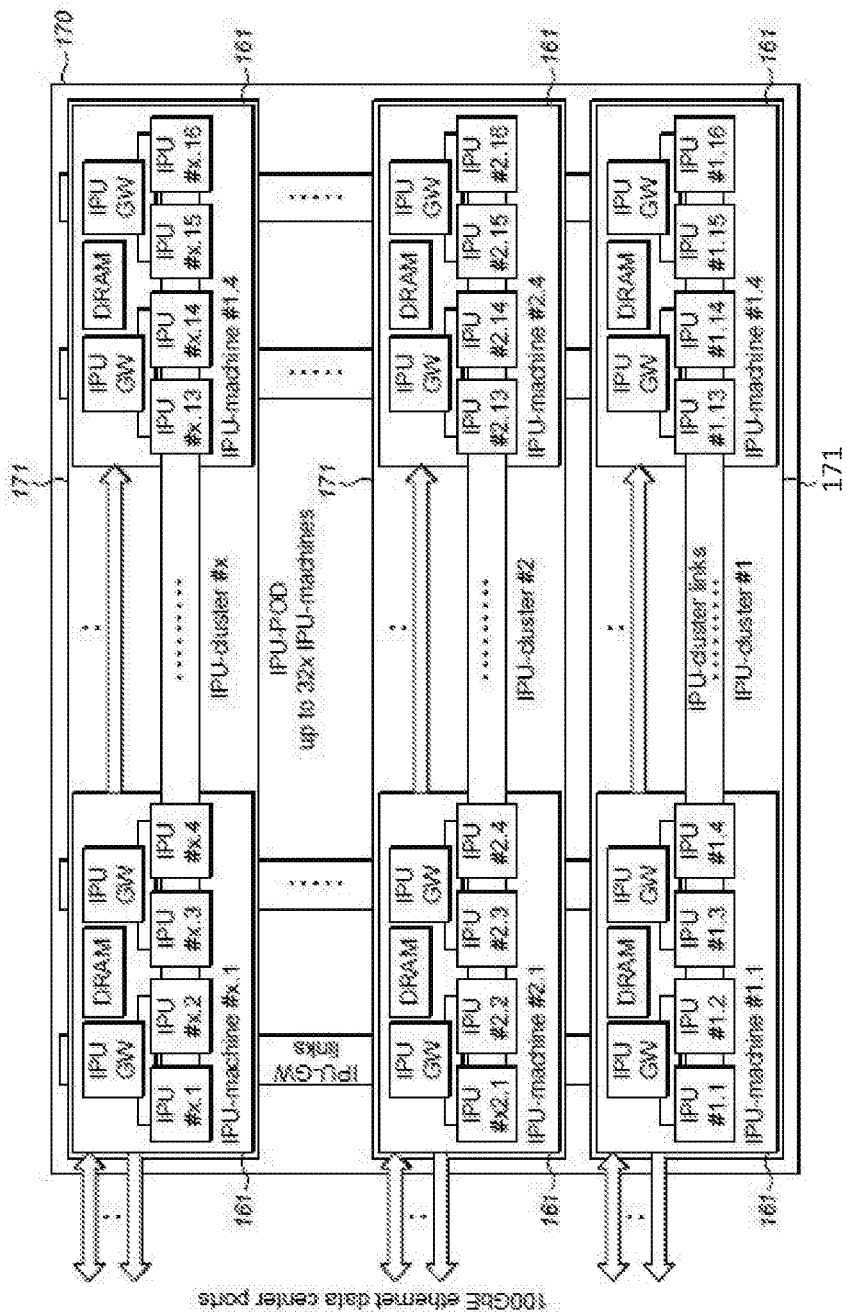
FIG. 13 is a schematic illustration of a pod including a plurality of machines.

Reference is made to FIG. 13, which shows an example of an apparatus 170, comprising a plurality of machines 161 as illustrated in FIG. 12. A plurality of machines 161 are arranged into an apparatus 171, which is referred to as a cluster 171. Each cluster 171 comprises up to 4 machines 161. A plurality of clusters 171 are arranged into an apparatus 170, which is referred to as a pod 171. Each pod 171 comprises up to 32 machines 161. By scaling the system in this manner, a resulting pod 171 comprises 128 accelerators, resulting in system with 16 PFLops and 8 TB of DRAM.

In this model illustrated by FIGS. 12 and 13, each gateway 163 provides a low latency bridge between two or more groups of accelerators 162, allowing accelerators 162 attached to different gateways 163 to communicate with each other as if they were connected on the same internal fabric. Packets are received from an accelerator 162 at the XPU ports (shown in FIG. 8) of a gateway 163. Packets which are targeting memory space that maps to a remote accelerator are detected at the XPU Ports and directed towards the appropriate fabric port (shown in FIG. 8) of the gateway 163. The packet receives at the appropriate accelerator port will be forwarded to the appropriate gateway. From there the gateway will forward the packet to the remote accelerator that is indicated by the memory space targeted by the packet.

Each gateway 163 includes PCIe ports. 4 of these PCIe ports are configured to pass packets to and from accelerators 162. Each PCIe Port (shown in FIG. 12) can be configured to use a different accelerator specific protocol. A custom gateway transaction layer then converts between that protocol and the gateway internal protocol. The custom gateway layer implements the address map, and provides collective and broadcast/multicast offload support. Each gateway 163 provides an address mapping scheme, exposing all participating accelerators 162 in a global address space. The packets received at the gateway 163 from the accelerator 162 contain a gateway ID, identifying the destination gateway to which the packet is to be routed.

The global address space encompasses all accelerators 162 belonging to the pod 170 as well as all of the gateway's 163 memory resources. Accelerators may dispatch packets specifying addresses in the global address space. Some parts of the address are used to select the resources on the target gateway. Some parts of the address are used to identify the gateway which is being addressed. Some other parts are used to identify addresses in the gateway memory or memory in an associated accelerator's tile memory. The accelerator's tile memory is addressable by a tile index and a memory offset. The address may include this tile index and memory offset to identify a location in the accelerator at which data of the data packet is to be stored.

When a packet is received, the identification of the gateway in the address is compared against this gateway's global ID. If there is a match, the request is targeting a resource belonging to this gateway (a local accelerator or local memory). Otherwise, the part of the address are used to index a routing table. The contents of the routing table indicate the target port in the system. Some bits of the address will be matched against the gateway routing table to determine where to route the packet.

The ingress packet pipeline is intended to be a cut-through pipeline with no buffering other than pipeline stages necessary to implement the required features. Packets are first classified by type: multicast/broadcast, collective and unicast/Memory Writes. These are then split out to individual blocks for processing. The gateway 52 may comprise a unicast module for processing unicast packets and a multicast grouping table. The unicast packet routing table is used by the gateway 52 to perform routing of unicast packets, i.e. those directed to a single accelerator. The incoming address is decoded and selected bits are used to determine the destination. This is a two-step process: first the gateway ID bits are used to determine if this packet targets this gateway. If not, then the gateway ID bits are used to index a routing table which returns the output fabric port for this packet.

If the packet is targeting the gateway 52, then local address bits in the packet address are used to lookup in a set of local gateway base address registers (BARS) consisting of a plurality of regions, i.e. one BAR for gateway memory and one BAR for each accelerator port. If the local address bits indicate that the packet is for storage in gateway memory, e.g. memory 114, the packet is stored in the Gateway memory according to the address in the BAR for gateway memory. If the local address bits indicate that the packet is for delivery to the accelerator, then the packet is forwarded to the DME 122 of the gateway 52. From there the data packet may be forwarded to the accelerator according to the address in the BAR for the relevant accelerator port.

Packets specifying the multicast/broadcast service are processed at the multicast group table. Each Fabric port has its own table with a list of ports which will get a copy for each group (including broadcast). There are three sets of destinations. Firstly, packets are sent to the local accelerators if, and only if, the packet belongs to the same vFabric as the Gateway. Secondly, all incoming broadcast/multicast packets are checked against the Fabric table to see if they must be forwarded. Thirdly, a copy will be sent to local DRAM. Once the destination port vector is built, the vector and the packet are forwarded to the switch interconnect, which provides the replication service.

The systems, i.e. gateway and computer subsystem, described for implementing embodiments of the application comprise required data processing apparatus and functions that may be provided by means of one or more data processors. The different components of the gateway, such as the streaming engine and sync propagation modules, may be provided by such data processors. The data processors may be of any type suitable to the local technical environment, and may include one or more of, microprocessors, application specific integrated circuits (ASIC), field programmable gate arrays (FPGAs) and processors based on multi core processor architecture, as non-limiting examples. The data processing may be distributed across several data processing modules.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

It will be appreciated that the above embodiments have been described by the way of example only.

Other variants and/or applications of the disclosed techniques may be apparent to the skilled person once given the disclosure herein. The scope of the disclosure is not limited by the described embodiments, but only by the accompanying claims.

It will be appreciated that the above embodiments have been described by way of example only. More generally, according to one aspect disclosed herein, there is provided a computer system comprising: (i) a computer subsystem acting as a work accelerator, and (ii) a gateway connected to the computer subsystem, the gateway enabling the transfer of data to the computer subsystem from external storage at at least some pre-compiled data synchronisation points attained by the subsystem, wherein the computer subsystem comprises at least one processor configured to: send to the gateway an indication of a synchronisation group comprising the computer subsystem; and send to the gateway a synchronisation request for a synchronisation to be performed at an upcoming pre-compiled data exchange synchronisation point, wherein the gateway comprises: at least one register configured to store said indication; and the one or more sync propagation circuits each configured to receive at least one synchronisation request and perform an action with respect to said at least one synchronisation request, each action being selected in dependence upon said indication, wherein each action selected comprises at least one of: propagating the received at least one synchronisation request to at least one further sync propagation circuit; and acknowledging the received at least one synchronisation request.

In some embodiments, the indication comprises one or more configuration settings indicating each of the actions to be performed by the each of the one or more sync propagation circuits.

In some embodiments, the at least one register is configured to store a plurality of sets of configuration settings, and the indication comprises an indication of which of the plurality of sets of configuration sets applies for the at least one synchronisation request.

In some embodiments, the at least one further sync propagation circuit comprises at least one of: a further sync propagation circuit of the gateway; and a further sync propagation circuit of a further gateway connected to the gateway via a gateway interface.

In some embodiments, the one or more sync propagation circuits configured to propagate the received at least one synchronisation request to the at least one further sync propagation circuit are configured to propagate the received at least one synchronisation request to one or more further sync propagation circuits selected in dependence upon the indication.

In some embodiments, each of the one or more sync propagation circuits comprises a plurality of interfaces to further components, wherein the indication of the synchronisation group comprises for each of the one or more sync propagation circuits: an indication of configuration settings for each of at least one of the respective plurality of interfaces.

In some embodiments, for each of the one or more sync propagation circuits, the configuration settings for each of at least one of the respective interfaces comprises an indication of whether or not each of the at least one of the respective plurality of interfaces is enabled.

In some embodiments, for each of the one or more sync propagation circuits, the configuration settings for each of at least one of the respective interfaces comprises an indication of the directionality of propagation of sync requests for each of at least one of the respective plurality of interfaces.

In some embodiments, the gateway comprises a memory configured to store at least one set of credits, wherein at least one of the one or more sync propagation circuits is configured to: request a credit from one of the at least one set of credits for performing data exchange between the gateway and the subsystem; and in response to determining that the one of the at least one set of credits comprises a non-zero number of credits, acknowledge the synchronisation request.

In some embodiments, the indication comprises one or more configuration settings indicating each of the actions to be performed by the each of the one or more sync propagation circuits, wherein the at least one set of credits comprises a plurality of sets of credits, wherein the gateway is configured to, in response to receiving the one or more configuration settings, associate one of the plurality of sets of credits with a configuration specified by the received one or more configuration settings, wherein the one of the at least one set of credits from which the request is made comprises the one of the plurality of sets of credits associated with the configuration specified by the received one or more configuration settings.

In some embodiments, the at least one processor of the subsystem is configured to: send to the gateway an indication as to whether or not data exchange is to take place between the gateway and subsystem at the upcoming pre-compiled data exchange synchronisation point.

In some embodiments, the at least one processor of the subsystem is configured to: send to the gateway an indication as to whether or not data exchange is to take place between the gateway and subsystem at the upcoming pre-compiled data exchange synchronisation point, wherein the one of the one or more sync propagation circuits is configured to perform the requesting a credit of the at least one set of credits for performing data exchange between the gateway and the subsystem in response to receiving the indication from the subsystem that data exchange is to take place between the gateway and subsystem at the upcoming pre-compiled data exchange synchronisation point.

In some embodiments, the gateway is connected to a further computer subsystem, wherein the gateway is configured to receive from the further computer subsystem, a second synchronisation request for synchronisation to be performed at the upcoming pre-compiled data exchange synchronisation point, wherein one of the one or more sync propagation circuits is configured to, responsive to at least one indication of a synchronisation group comprising the computer subsystem and the further computer subsystem stored in at least one register of the gateway: acknowledge the synchronisation request received from the computer subsystem; and acknowledge the second synchronisation request received from the further computer subsystem, wherein the indication of the synchronisation group comprising the computer subsystem and the further computer subsystem comprises at least one of: an indication received at the gateway from the computer system; and an indication received at the gateway from the further computer subsystem.

In some embodiments, in response to receiving an acknowledgment for the synchronisation request from the gateway, the at least one processor of the computer subsystem is configured to cause data to be exchanged between the computer subsystem and the further computer subsystem via the gateway.

In some embodiments, the synchronisation request received from computer subsystem and the second synchronisation request are received at the one of the one or more sync propagation circuits from others of the one or more sync propagation circuits.

In some embodiments, the gateway comprises at least one further sync propagation circuit configured to forward synchronisation requests and synchronisation acknowledgments without dependence upon the indication of the synchronisation group comprising the computer subsystem.

In some embodiments, the gateway is connected to a further gateway, wherein the gateway is configured to receive from the further gateway, a third synchronisation request for synchronisation to be performed at the upcoming pre-compiled data exchange synchronisation point, wherein at least one of the one or more sync propagation circuits is configured to, responsive to the indication of the synchronisation group comprising the computer subsystem stored in the at least one register: acknowledge the synchronisation request received from the computer subsystem; and acknowledge the third synchronisation request received from the further gateway, wherein the synchronisation group further comprises the further gateway.

In some embodiments, in response to receiving an acknowledgment for the sync request from the gateway, the at least one processor of the computer subsystem is configured to cause data to be exchanged between the computer subsystem and a third computer system for acting as a work accelerator connected to the further gateway.

In some embodiments, the one or more sync propagation circuits comprise a circuit configured to: receive and acknowledge the synchronisation request from the computer system; and receive and acknowledge a synchronisation request from a streaming engine of the gateway for a synchronisation to be performed at the upcoming pre-compiled data exchange synchronisation point.

In some embodiments, wherein the streaming engine is configured to: prepare one or more data buffers for exchange of data with the computer subsystem at the pre-compiled data exchange synchronisation point; and send the synchronisation request to the circuit in response to completion of the preparation of the one or more data buffers.

In some embodiments, receiving the at least one synchronisation request at at least one of the one or more sync propagation circuits comprises at least one of: receiving the synchronisation request sent by the computer subsystem; and receiving a synchronisation request that is an aggregate of the synchronisation request sent by the computer subsystem and a further synchronisation request.

In some embodiments, the at least one register comprises a first register configured to store said one or more received configuration settings received from the computer subsystem, wherein the at least one register comprises control registers of each of the sync propagation circuits, wherein the gateway comprises at least one processor configured to, following storage of the one or more configuration settings in the first register, copy each of the one or more configuration settings to at least one of the control registers of each of the sync propagation circuits, wherein each of the one or more sync propagation circuits is configured to select its respective action in dependence upon the configuration settings stored in its respective control register.

According to a second aspect, there is provided a computer implemented method using a computer subsystem acting as a work accelerator and a gateway connected to the computer subsystem, the gateway enabling the transfer of data to the computer subsystem from external storage at at least some pre-compiled data synchronisation points attained by the subsystem, the method comprising: the computer subsystem sending to the gateway an indication of a synchronisation group comprising the computer subsystem; and the computer subsystem sending to the gateway, a synchronisation request for a synchronisation to be performed at an upcoming pre-compiled data exchange synchronisation point, storing in at least one register of the gateway, said indication; receiving at each of the one or more sync propagation circuits, at least one synchronisation request; and performing an action with respect to said at least one synchronisation request, each action being selected in dependence upon said indication, wherein each action selected comprises at least one of: propagating the received at least one synchronisation request to at least one further sync propagation circuit; and acknowledging the received at least one synchronisation request.

According to a third aspect, there is provided a non-transitory computer readable medium comprising computer readable medium which when executed by at least one processor of a computer perform the method of the second aspect.

The invention claimed is:

1. A computer system comprising:
   (i) a computer subsystem acting as a work accelerator, and
   (ii) a gateway connected to the computer subsystem, the gateway enabling the transfer of data to the computer subsystem from external storage at least some pre-compiled data synchronisation points attained by the subsystem, wherein the computer subsystem comprises at least one processor configured to:
   send to the gateway an indication of a synchronisation group comprising the computer subsystem; and send to the gateway a synchronisation request for a synchronisation to be performed at an upcoming pre-compiled data exchange synchronisation point,
wherein the gateway comprises:
at least one register configured to store said indication; and
the one or more sync propagation circuits each configured to receive at least one synchronisation request and perform an action with respect to said at least one synchronisation request, each action being selected in dependence upon said indication, wherein each action selected comprises at least one of:
propagating the received at least one synchronisation request to at least one further sync propagation circuit; and
acknowledging the received at least one synchronisation request.

2. A computer system as claimed in claim 1, wherein the indication comprises one or more configuration settings indicating each of the actions to be performed by the each of the one or more sync propagation circuits.

3. A computer system as claimed in claim 1, wherein the at least one register is configured to store a plurality of sets of configuration settings, and the indication comprises an indication of which of the plurality of sets of configuration sets applies for the at least one synchronisation request.

4. A computer system as claimed in claim 1, wherein the at least one further sync propagation circuit comprises at least one of:
a further sync propagation circuit of the gateway; and
a further sync propagation circuit of a further gateway connected to the gateway via a gateway interface.

5. A computer system as claimed in claim 1, wherein the one or more sync propagation circuits is configured to propagate the received at least one synchronisation request to the at least one further sync propagation circuit are configured to propagate the received at least one synchronisation request to one or more further sync propagation circuits selected in dependence upon the indication.

6. A computer system as claimed in claim 1, wherein each of the one or more sync propagation circuits comprises a plurality of interfaces to further components, wherein the indication of the synchronisation group comprises for each of the one or more sync propagation circuits:
an indication of configuration settings for each of at least one of the respective plurality of interfaces.

7. A Computer system as claimed in claim 6, wherein for each of the one or more sync propagation circuits, the configuration settings for each of at least one of the respective interfaces comprises an indication of whether or not each of the at least one of the respective plurality of interfaces is enabled.

8. A computer system as claimed in claim 6, wherein for each of the one or more sync propagation circuits, the configuration settings for each of at least one of the respective interfaces comprises an indication of the directionality of propagation of sync requests for each of at least one of the respective plurality of interfaces.

9. A computer system as claimed in claim 1, wherein the gateway comprises a memory configured to store at least one set of credits, wherein at least one of the one or more sync propagation circuits is configured to:
request a credit from one of the at least one set of credits for performing data exchange between the gateway and the subsystem; and in response to determining that the one of the at least one set of credits comprises a non-zero number of credits, acknowledge the synchronisation request.

10. A computer system as claimed in claim 9, wherein the indication comprises one or more configuration settings indicating each of the actions to be performed by the each of the one or more sync propagation circuits, wherein the at least one set of credits comprises a plurality of sets of credits, wherein the gateway is configured to, in response to receiving the one or more configuration settings, associate one of the plurality of sets of credits with a configuration specified by the received one or more configuration settings,
wherein the one of the at least one set of credits from which the request is made comprises the one of the plurality of sets of credits associated with the configuration specified by the received one or more configuration settings.

11. A computer system as claimed in claim 1, wherein the at least one processor of the subsystem is configured to: send to the gateway an indication as to whether or not data exchange is to take place between the gateway and subsystem at the upcoming pre-compiled data exchange synchronisation point.

12. A computer system as claimed in claim 9, wherein the at least one processor of the subsystem is configured to: send to the gateway an indication as to whether or not data exchange is to take place between the gateway and subsystem at the upcoming pre-compiled data exchange synchronisation point, wherein the one of the one or more sync propagation circuits is configured to perform the requesting a credit of the at least one set of credits for performing data exchange between the gateway and the subsystem in response to receiving the indication from the subsystem that data exchange is to take place between the gateway and subsystem at the upcoming pre-compiled data exchange synchronisation point.

13. A computer system as claimed in claim 1, wherein the gateway is connected to a further computer subsystem, wherein the gateway is configured to receive from the further computer subsystem, a second synchronisation request for synchronisation to be performed at the upcoming pre-compiled data exchange synchronisation point,
wherein one of the one or more sync propagation circuits is configured to, responsive to at least one indication of a synchronisation group comprising the computer subsystem and the further computer subsystem stored in at least one register of the gateway:
acknowledge the synchronisation request received from the computer subsystem; and
acknowledge the second synchronisation request received from the further computer subsystem,
wherein the indication of the synchronisation group comprising the computer subsystem and the further computer subsystem comprises at least one of:
an indication received at the gateway from the computer system; and
an indication received at the gateway from the further computer subsystem.

14. A computer system as claimed in claim 13, wherein in response to receiving an acknowledgment for the synchronisation request from the gateway, the at least one processor of the computer subsystem is configured to cause data to be exchanged between the computer subsystem and the further computer subsystem via the gateway.

15. A computer system as claimed in claim 12, wherein the synchronisation request received from computer subsystem and the second synchronisation request are received at the one of the one or more sync propagation circuits from others of the one or more sync propagation circuits.

16. A computer as claimed in claim 1, wherein the gateway comprises at least one further sync propagation circuit configured to forward synchronisation requests and synchronisation acknowledgments without dependence upon the indication of the synchronisation group comprising the computer subsystem.

17. A computer system as claimed in claim 1, wherein the gateway is connected to a further gateway, wherein the gateway is configured to receive from the further gateway, a third synchronisation request for synchronisation to be performed at the upcoming pre-compiled data exchange synchronisation point,
wherein at least one of the one or more sync propagation circuits is configured to, responsive to the indication of the synchronisation group comprising the computer subsystem stored in the at least one register:
acknowledge the synchronisation request received from the computer subsystem; and
acknowledge the third synchronisation request received from the further gateway,
wherein the synchronisation group further comprises the further gateway.

18. A computer system as claimed in claim 17, wherein in response to receiving an acknowledgment for the sync request from the gateway, the at least one processor of the computer subsystem is configured to cause data to be exchanged between the computer subsystem and a third computer system for acting as a work accelerator connected to the further gateway.

19. A computer system as claimed in claim 1, wherein the one or more sync propagation circuits comprise a circuit configured to:
receive and acknowledge the synchronisation request from the computer system; and
receive and acknowledge a synchronisation request from a streaming engine of the gateway for a synchronisation to be performed at the upcoming pre-compiled data exchange synchronisation point.

20. A computer system as claimed in claim 19, wherein the streaming engine is configured to:
prepare one or more data buffers for exchange of data with the computer subsystem at the pre-compiled data exchange synchronisation point; and
send the synchronisation request to the circuit in response to completion of the preparation of the one or more data buffers.

21. A computer system as claimed in claim 1, wherein receiving the at least one synchronisation request at at least one of the one or more sync propagation circuits comprises at least one of:
receiving the synchronisation request sent by the computer subsystem; and
receiving a synchronisation request that is an aggregate of the synchronisation request sent by the computer subsystem and a further synchronisation request.

22. A computer system as claimed in claim 2, wherein the at least one register comprises a first register configured to store said one or more received configuration settings received from the computer subsystem,
wherein the at least one register comprises control registers of each of the sync propagation circuits,
wherein the gateway comprises at least one processor configured to, following storage of the one or more configuration settings in the first register, copy each of the one or more configuration settings to at least one of the control registers of each of the sync propagation circuits,
wherein each of the one or more sync propagation circuits is configured to select its respective action in dependence upon the configuration settings stored in its respective control register.

23. A computer implemented method using a computer subsystem acting as a work accelerator and a gateway connected to the computer subsystem, the gateway enabling transfer of data to the computer subsystem from external storage at pre-compiled data synchronisation points attained by the subsystem, the method comprising:
receiving, from the computer subsystem, an indication of a synchronisation group comprising the computer subsystem; and
storing the indication at the gateway;
receiving a synchronisation request for a synchronisation to be performed at an upcoming pre-compiled data exchange synchronisation point, wherein the synchronisation request is received by a first sync propagation circuit of the gateway; and
performing an action with respect to the synchronisation request, each action being selected in dependence upon the indication and from the list consisting of:
propagating the received synchronisation request to a second sync propagation circuit of the gateway; and
acknowledging the received synchronisation request.

24. The computer implemented method of claim 23, wherein each of the first sync propagation circuit and the second sync propagation circuit comprises a plurality of interfaces to further components, wherein the indication of the synchronisation group comprises for each of the first sync propagation circuit and the second sync propagation circuit:
an indication of configuration settings for at least some of the interfaces.

25. The computer implemented method of claim 23, wherein the indication comprises configuration settings indicating each of the actions to be performed by the sync propagation circuit.

26. The computer implemented method of claim 23, wherein the indication is stored in a register in the gateway, further wherein the register is configured to store a plurality of sets of configuration settings, and the indication comprises an indication of which of the plurality of sets of configuration sets applies for the synchronisation request.

27. A non-transitory computer readable medium comprising computer executable code which when executed by at least one processor of a computer causes the computer to:
receive at a gateway, from a work accelerator, an indication of a synchronisation group comprising the work accelerator; and
store the indication at the gateway;
receive a synchronisation request for a synchronisation to be performed at an upcoming data exchange synchronisation point, wherein the synchronisation request is received by a first sync propagation circuit, the gateway enabling transfer of data to the work accelerator from external storage the data synchronisation point;
perform an action with respect to the synchronisation request, each action being selected in dependence upon the indication and from the list consisting of:
propagating the received synchronisation request to a second sync propagation circuit at the gateway; and
acknowledging the received synchronisation request.

* * * * *